(12) United States Patent
Murata et al.

(10) Patent No.: US 6,284,205 B1
(45) Date of Patent: Sep. 4, 2001

(54) OZONIZING UNIT OZONE GENERATOR AND OZONE-PROCESSING SYSTEM

(75) Inventors: Takaaki Murata; Shinji Kobayashi; Ichiro Yamanashi; Yuuji Okita; Shigeru Kawaguchi; Yasuhiro Ogura, all of Yokohama; Sueo Ando, Hiratsuka; Michihiko Inaba, Yokohama, all of (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/377,485

(22) Filed: Aug. 20, 1999

(30) Foreign Application Priority Data

Aug. 21, 1998 (JP) .................................................. 10-236023
Aug. 21, 1998 (JP) .................................................. 10-236066
Aug. 25, 1998 (JP) .................................................. 10-238902
Jul. 12, 1999 (JP) .................................................. 11-198036

(51) Int. Cl.[7] .................................................. B01J 19/08
(52) U.S. Cl. .................................................. 422/186.11
(58) Field of Search ........................... 422/186.07, 186.11

(56) References Cited

U.S. PATENT DOCUMENTS 3,801,791 * 4/1974 Schaefer .......................... 422/186.07
4,626,876 * 12/1986 Miyagawa et al. .............. 422/186.07
4,652,318 * 3/1987 Masuda et al. ...................... 422/186
4,783,716 * 11/1988 Nagase et al. ........................ 422/186
5,154,895 * 10/1992 Moon ............................... 422/186.07
5,272,414 * 12/1993 Iwanaga ........................... 422/186.11
5,407,639 * 4/1995 Watanabe et al. .............. 422/186.07

FOREIGN PATENT DOCUMENTS 0 787 680    8/1997  (EP) .
9-286604    11/1997  (JP) .

OTHER PUBLICATIONS

Patent abstract of Japanese 03 150206, vol. 015, No. 373, Jun. 1991.
Patent abstract of Japanese 02 137705, vol. 014, No. 377, May 1990.
Derwent Publication, XP 002125873 re SU 1 564 113, May 1990.
Senichi Masuda et al., Production of Ozone by Surface and Glow Discharge at Cryogenic Temperatures, IEEE Transactions on Industry Applications, vol. 24, No. 5, pp. 928–933, Sep./Oct. 1988.

* cited by examiner

*Primary Examiner*—Kathryn Gorgos
*Assistant Examiner*—Thao Tran
(74) *Attorney, Agent, or Firm*—Finnegan, Henderson, Farabow, Garrett & Dunner, L.L.P.

(57) ABSTRACT

A pair of electrodes (1a, 1b) are formed on one surface of a dielectric substrate (2). A dielectric layer (18) is formed on the surface of the dielectric substrate (2) so as to cover the pair of electrodes (1a, 1b). The pair of electrodes (1a, 1b) have linear electrode elements, respectively. The respective linear electrode elements are arrange at equal intervals.

29 Claims, 38 Drawing Sheets

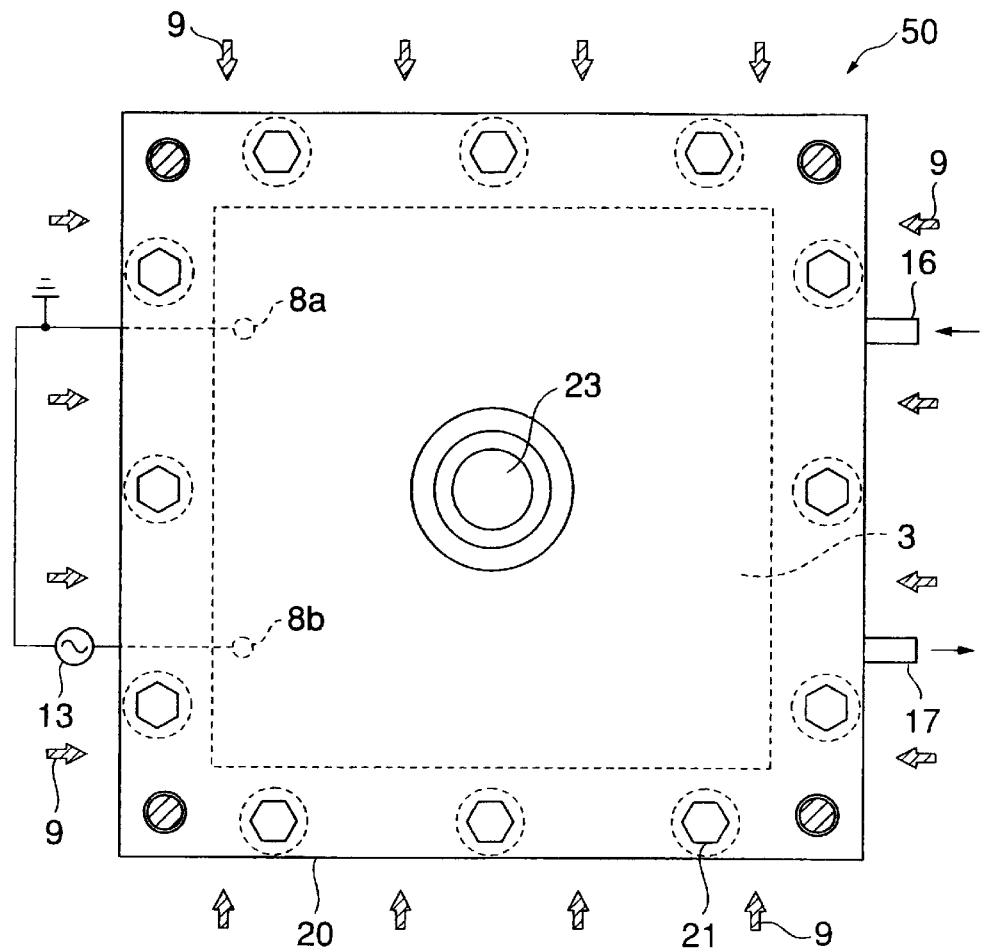
F I G. 1
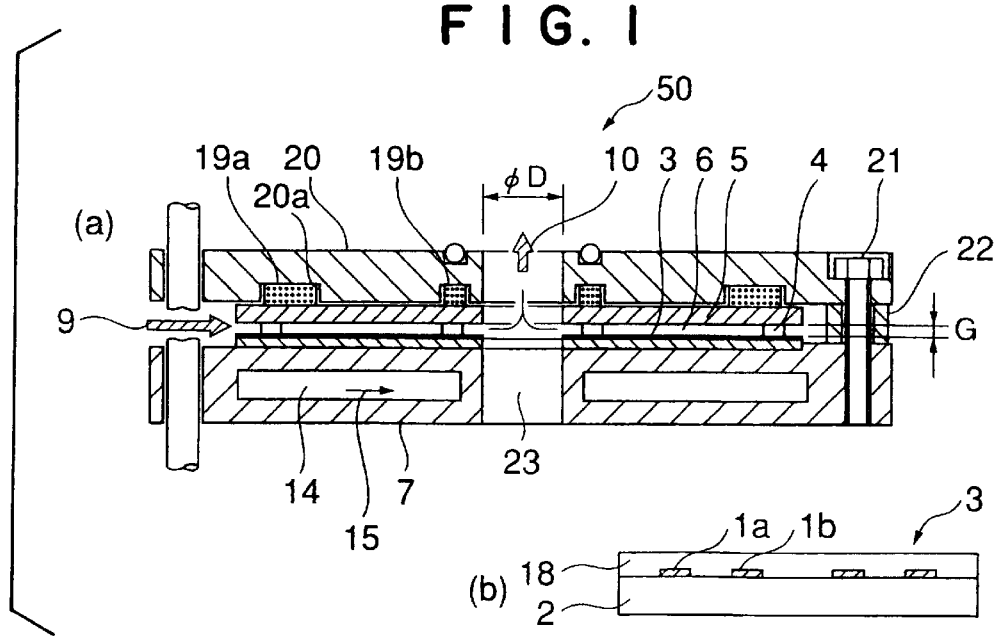
F I G. 2

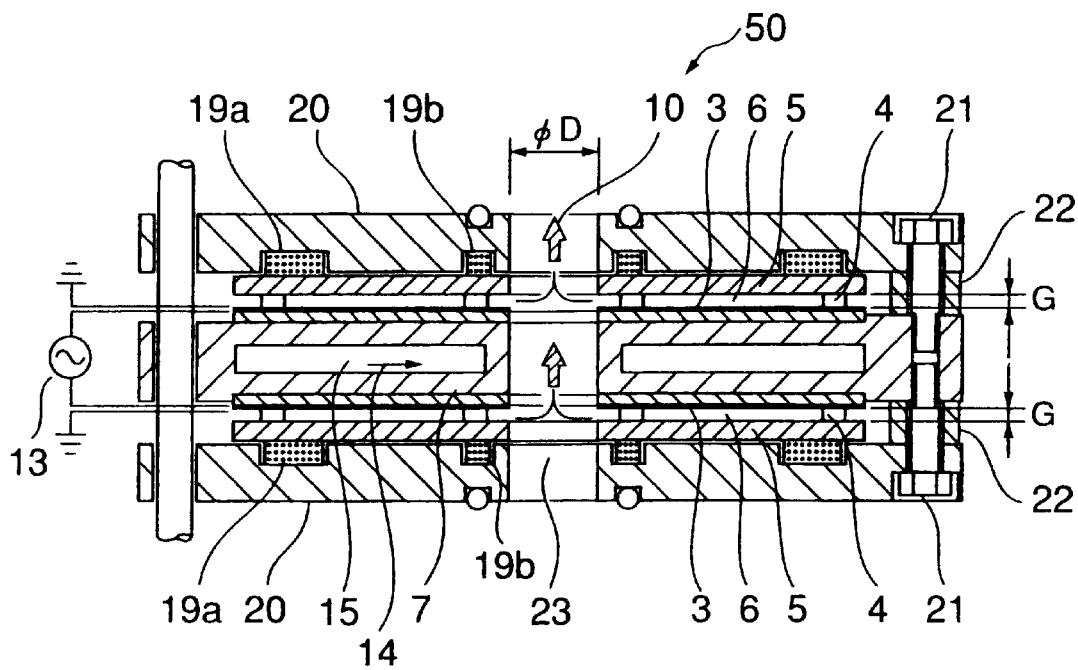
F I G. 3
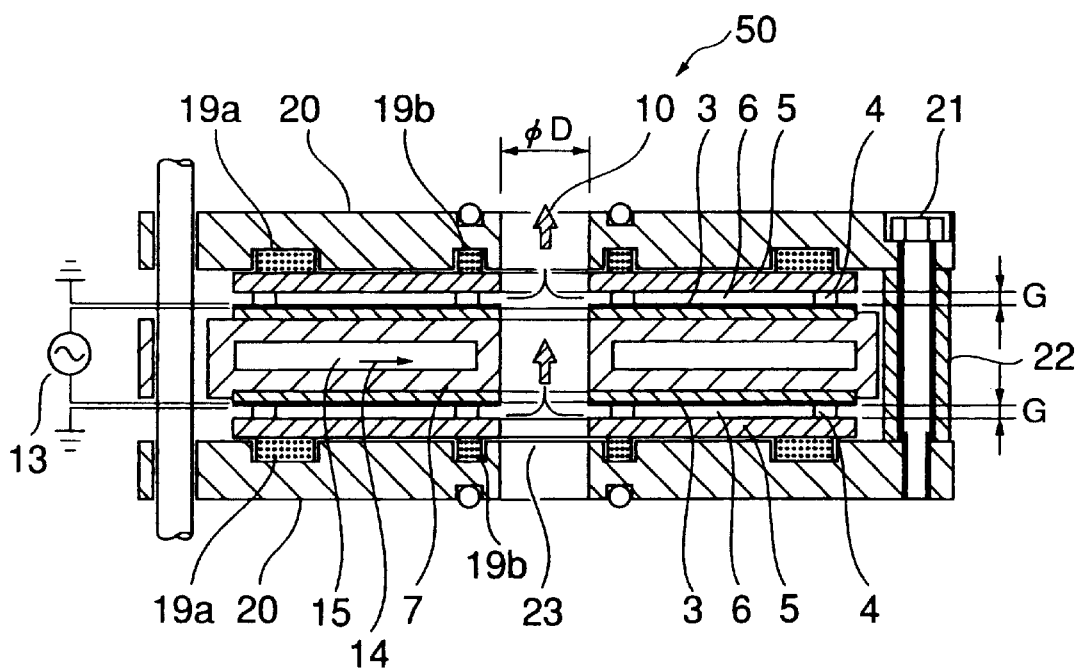
F I G. 4

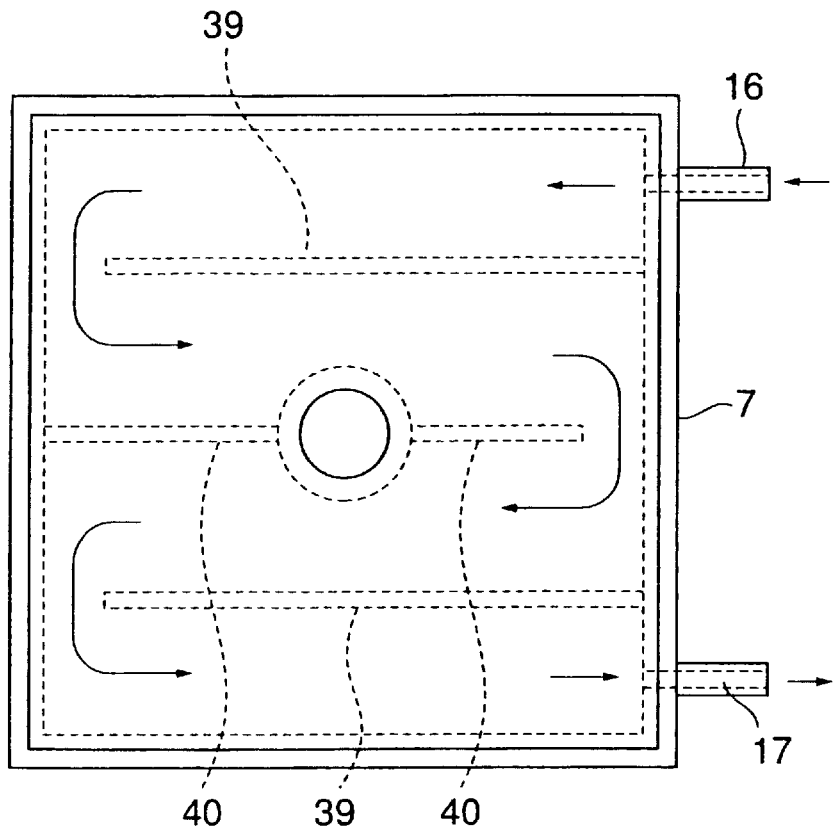
F I G. 14
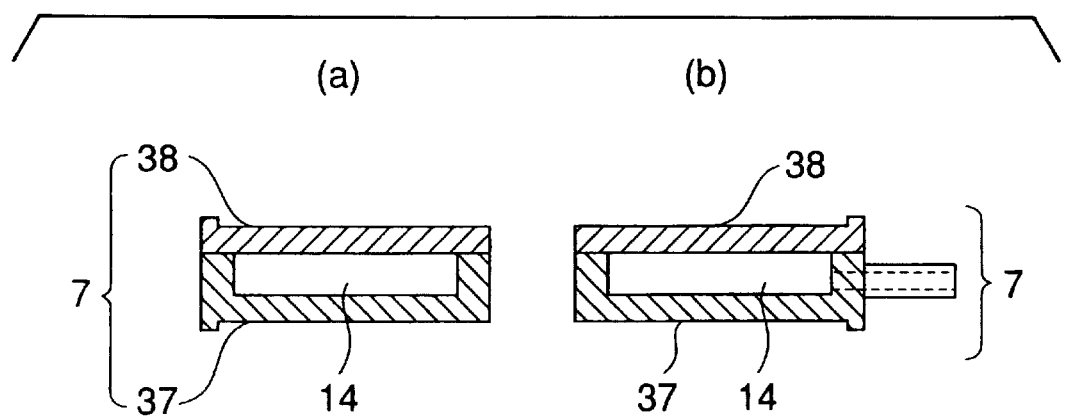
F I G. 15

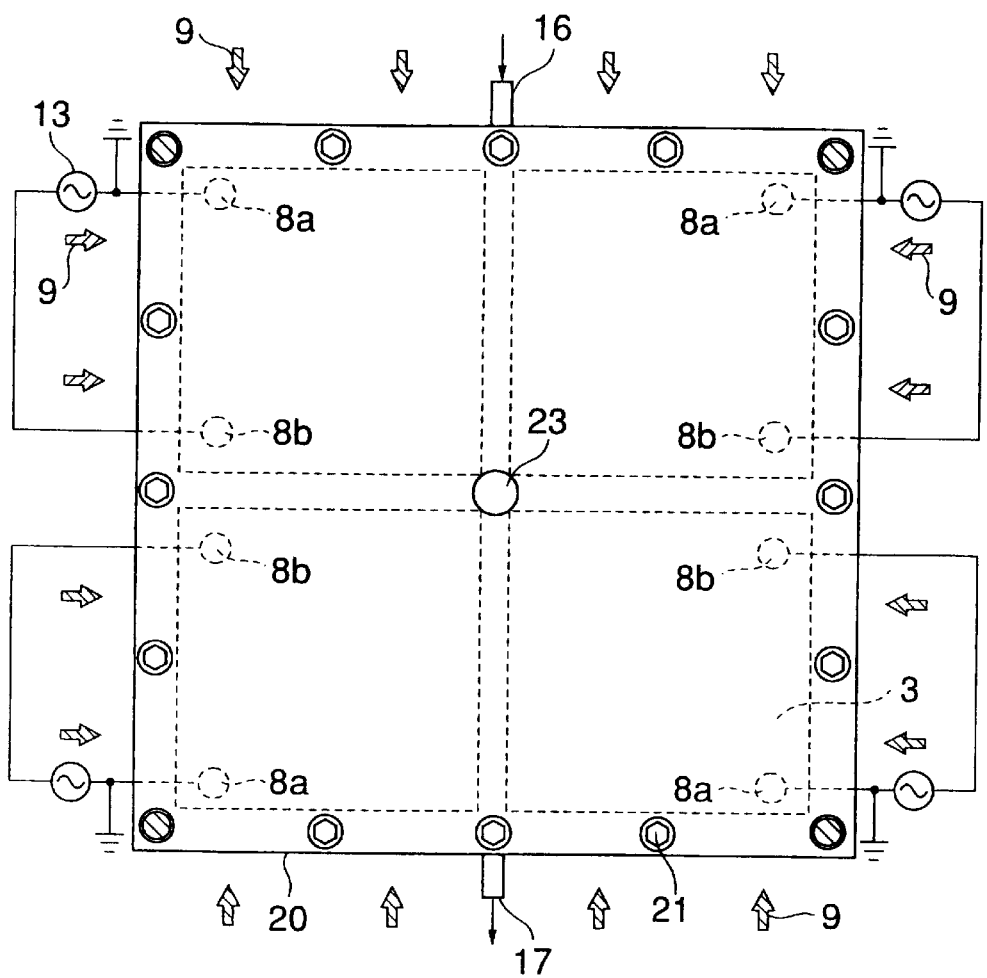
F I G. 25
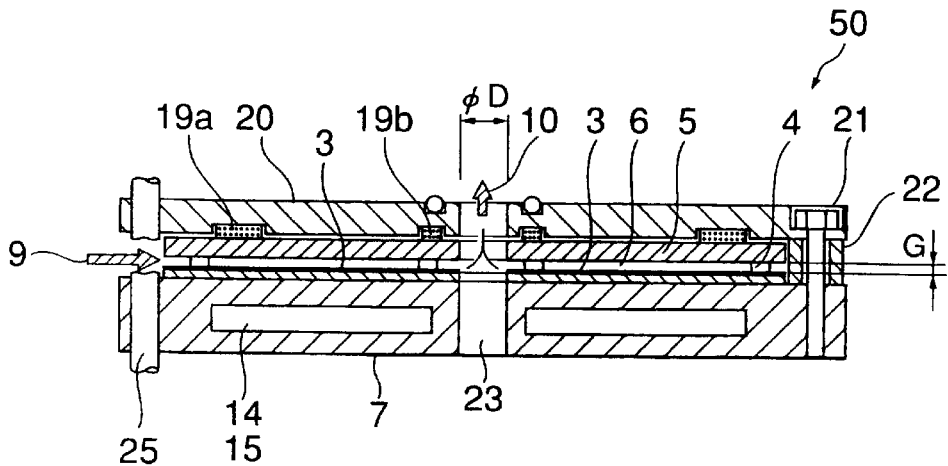
F I G. 26

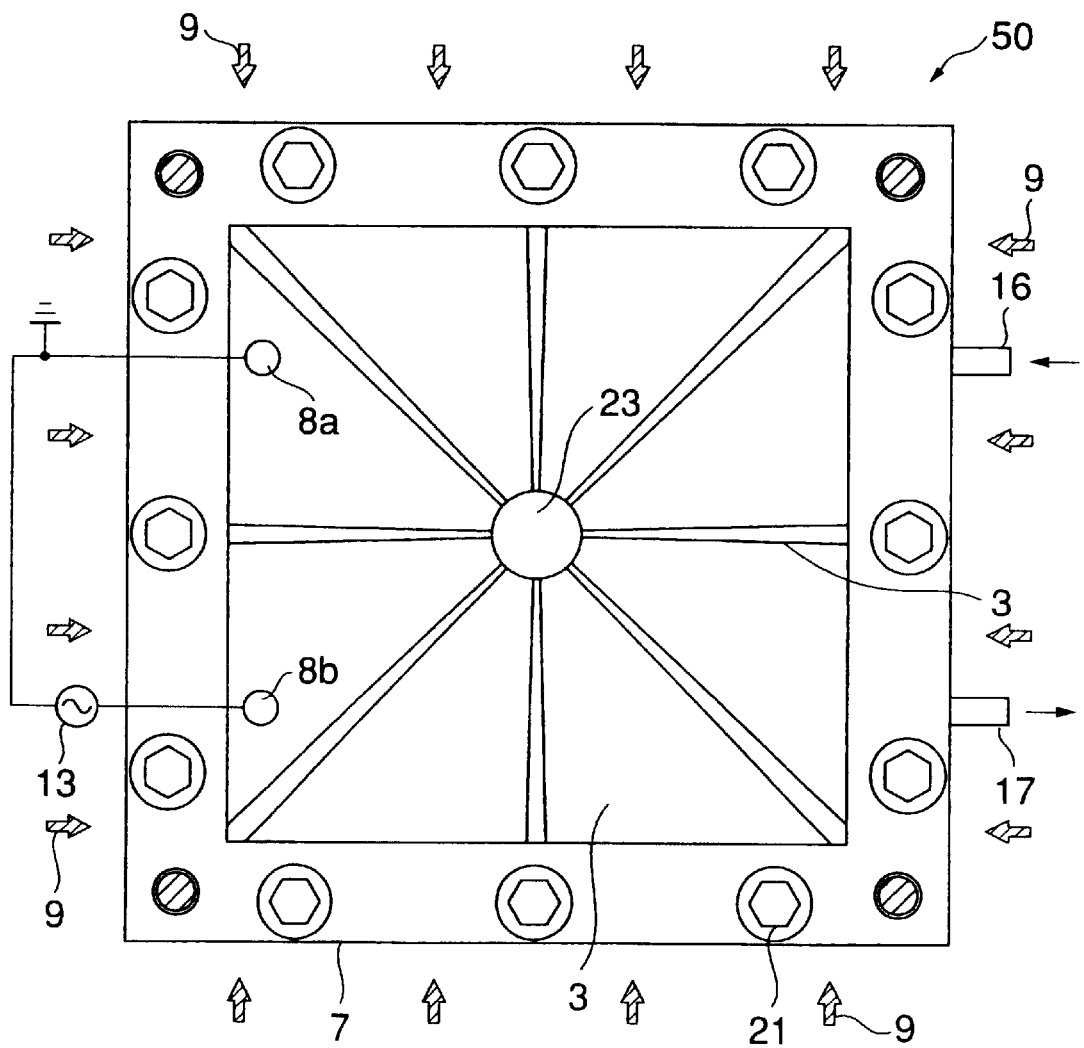
F I G. 27

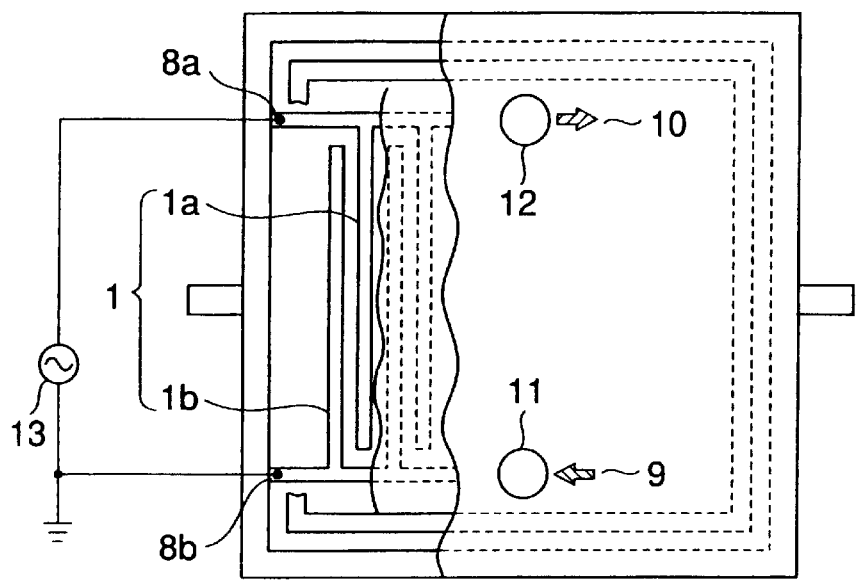
F I G. 31
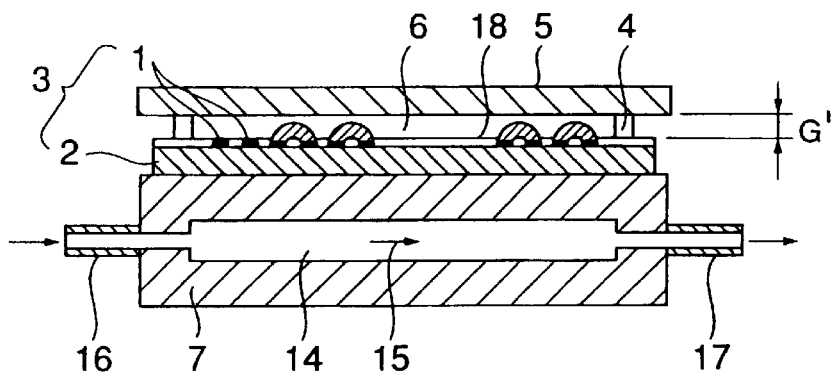
F I G. 32
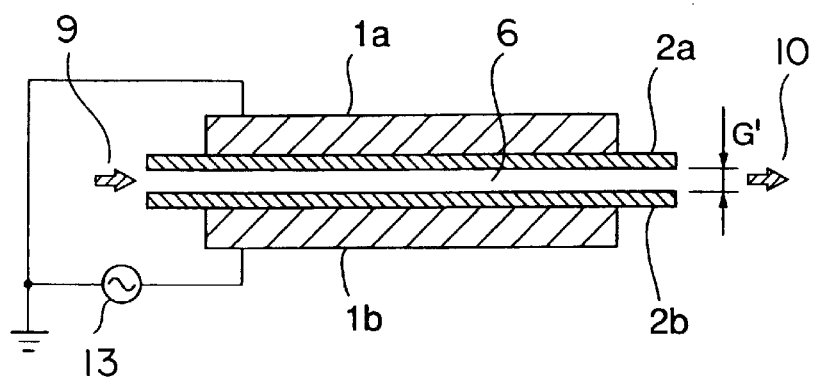
F I G. 33

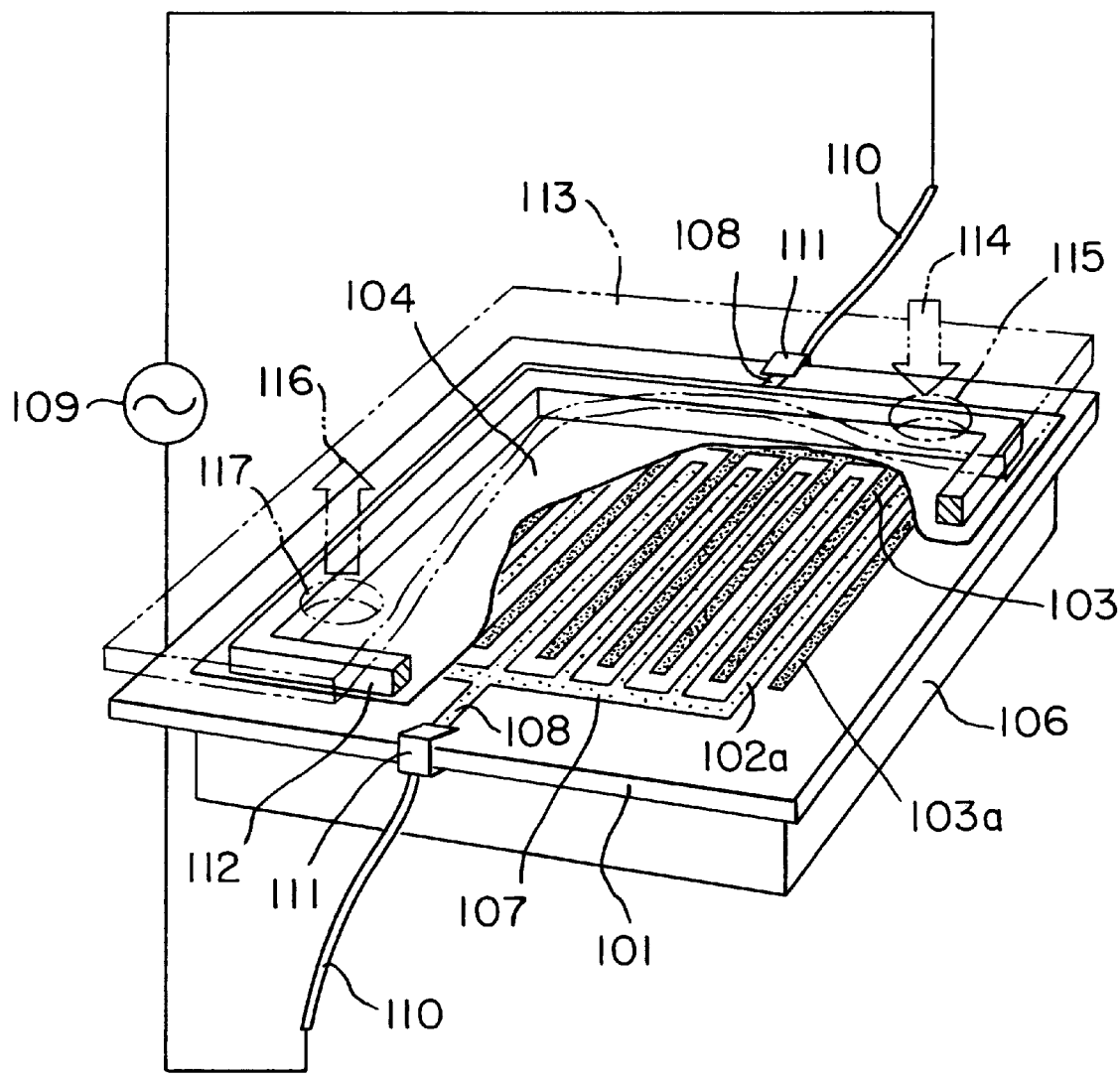
F I G. 34

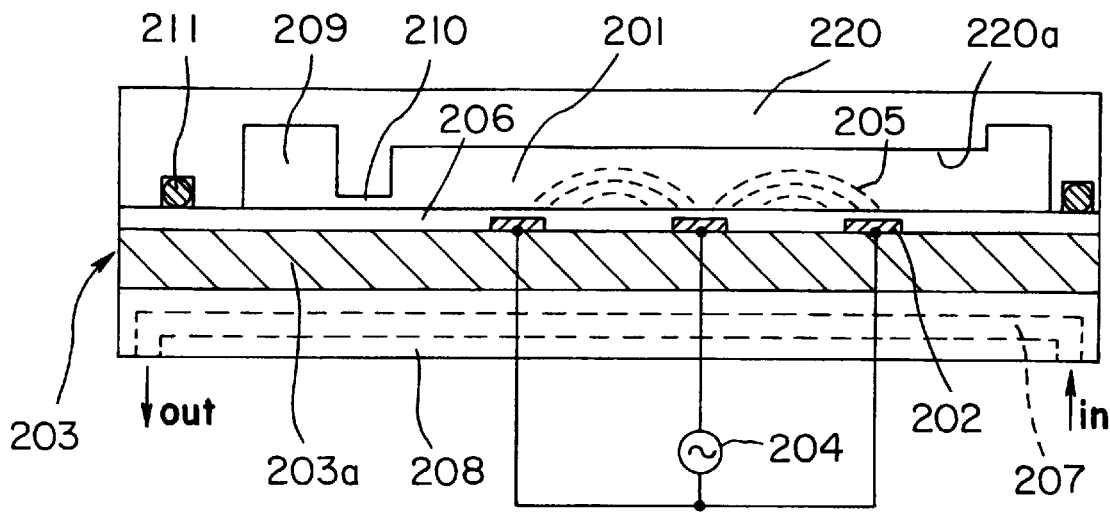
F I G. 38
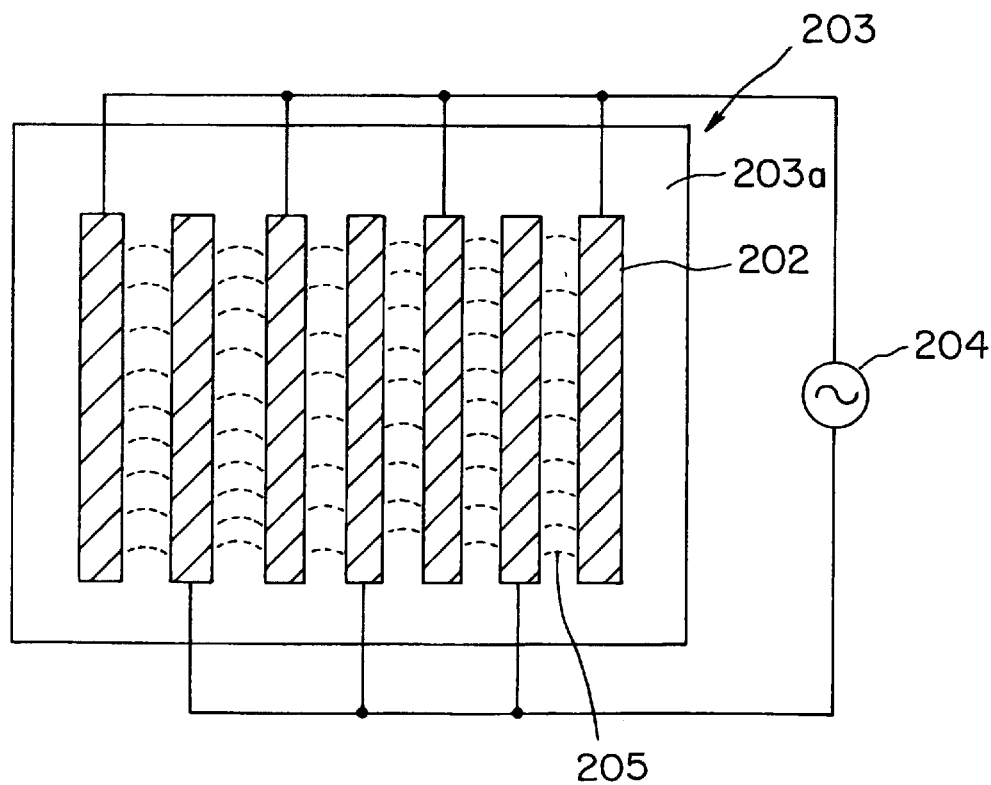
F I G. 39

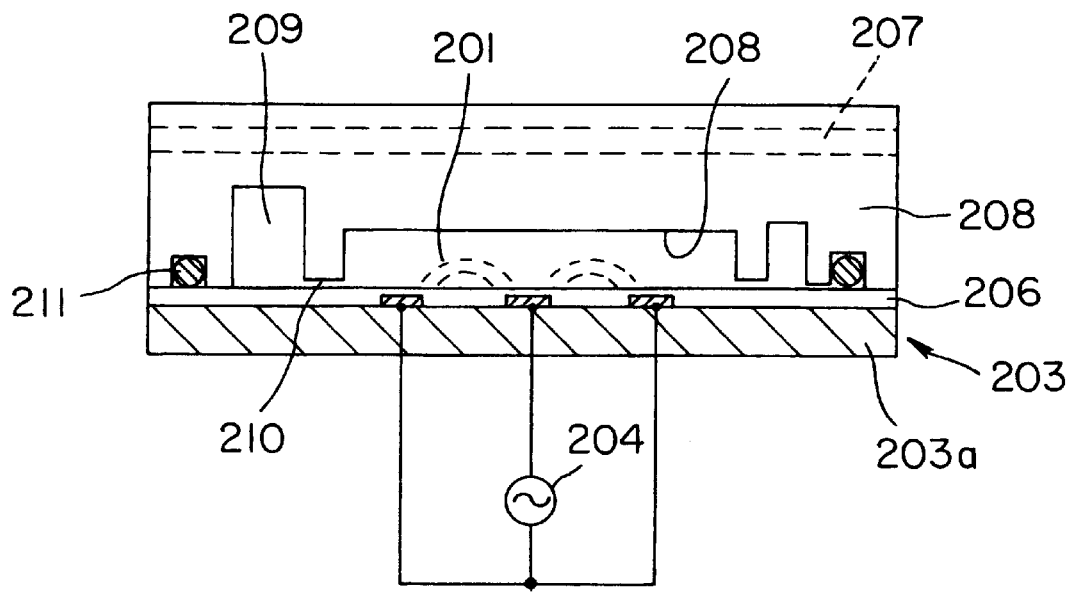
F I G. 41
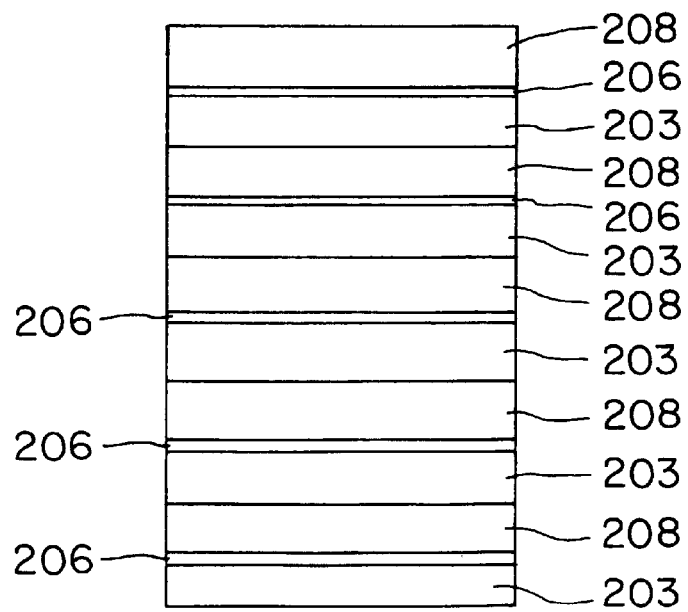
F I G. 42

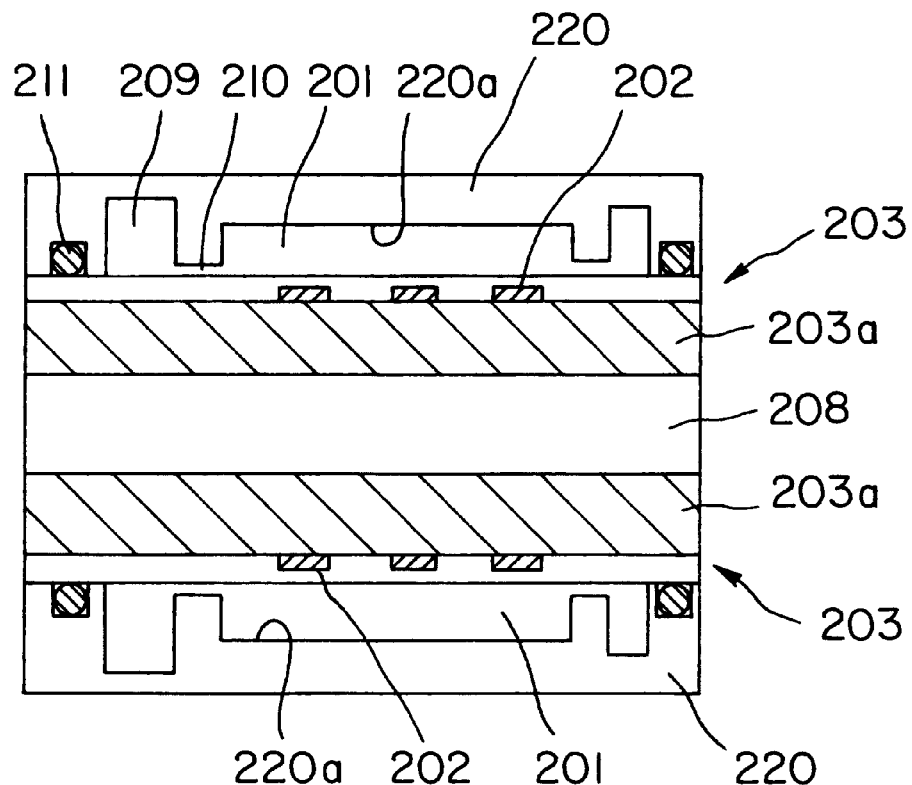
F I G. 43
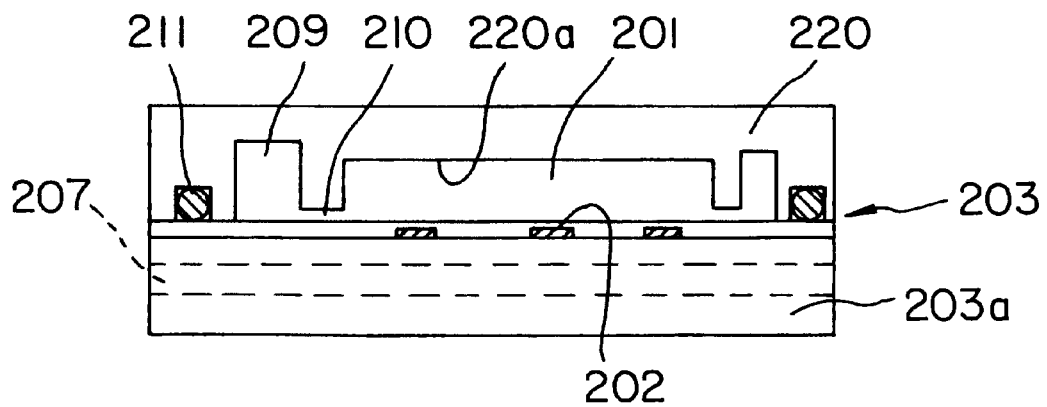
F I G. 44

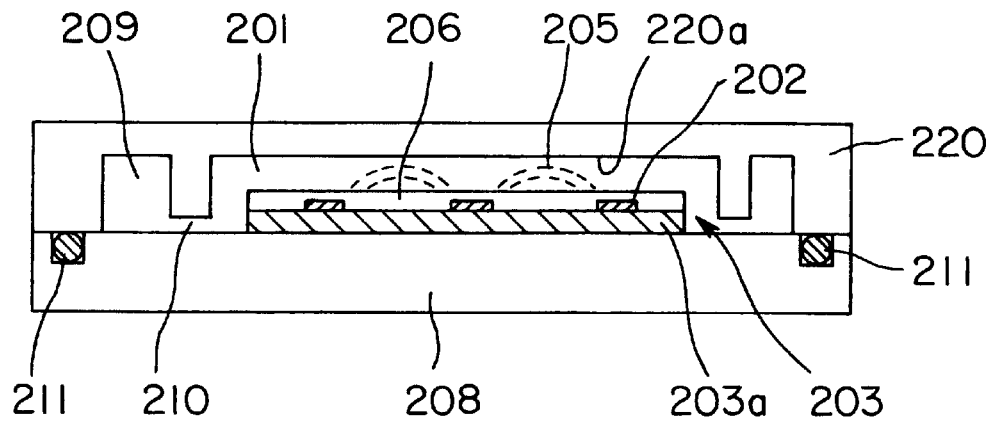
F I G. 45
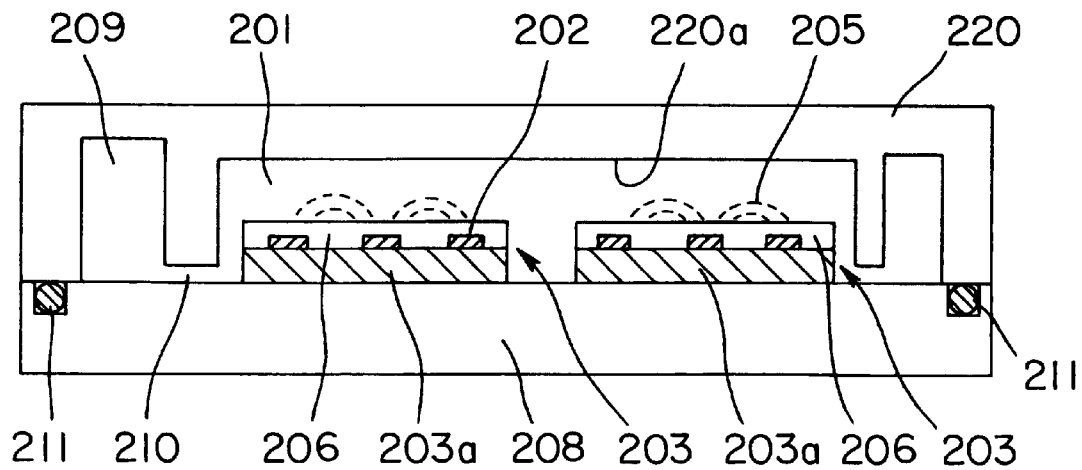
F I G. 46

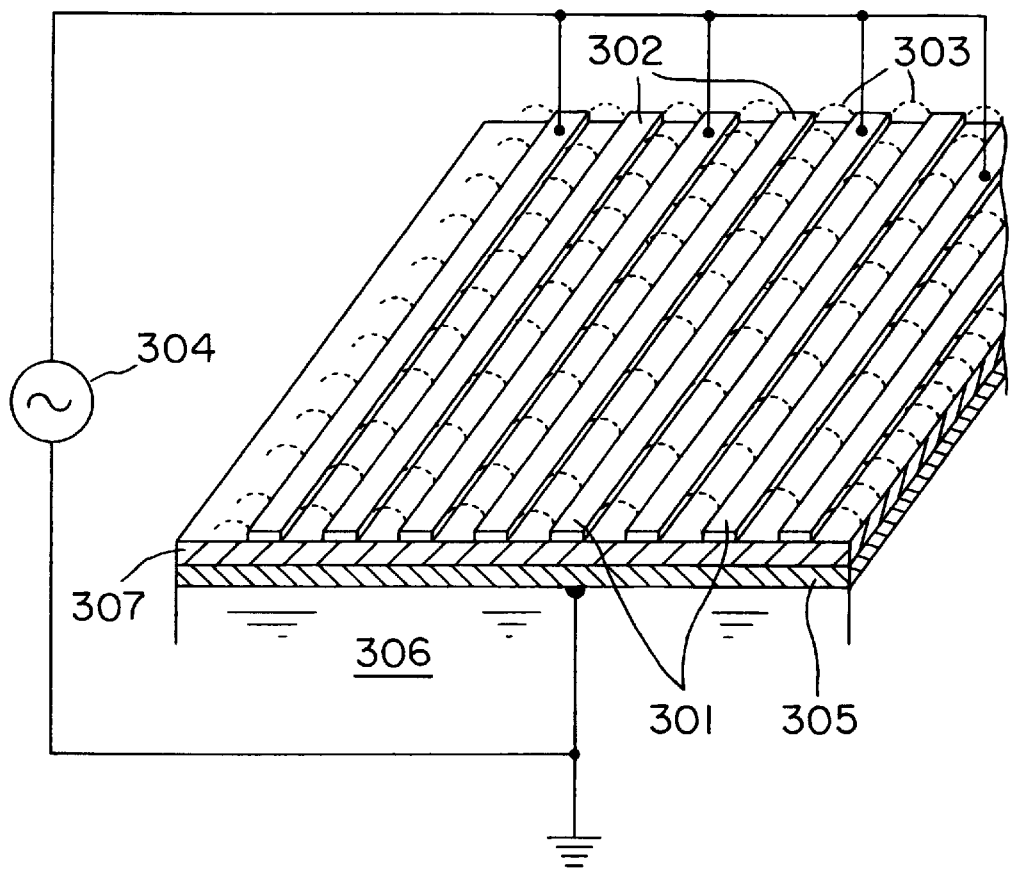
F I G. 50
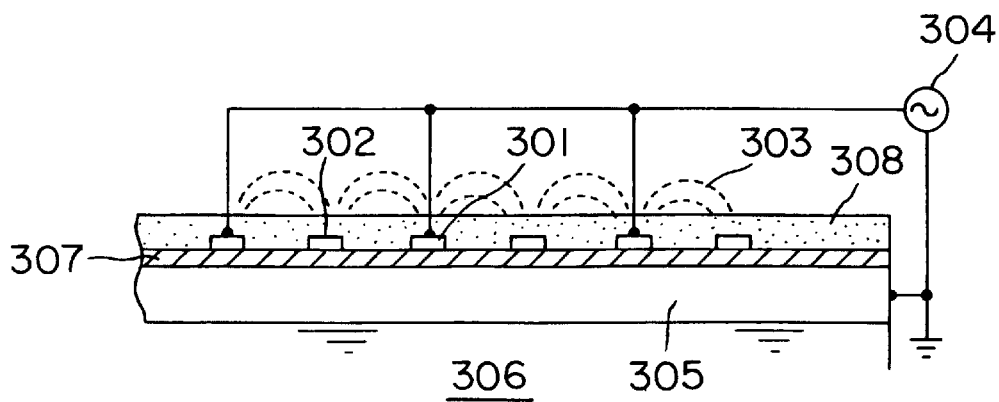
F I G. 51

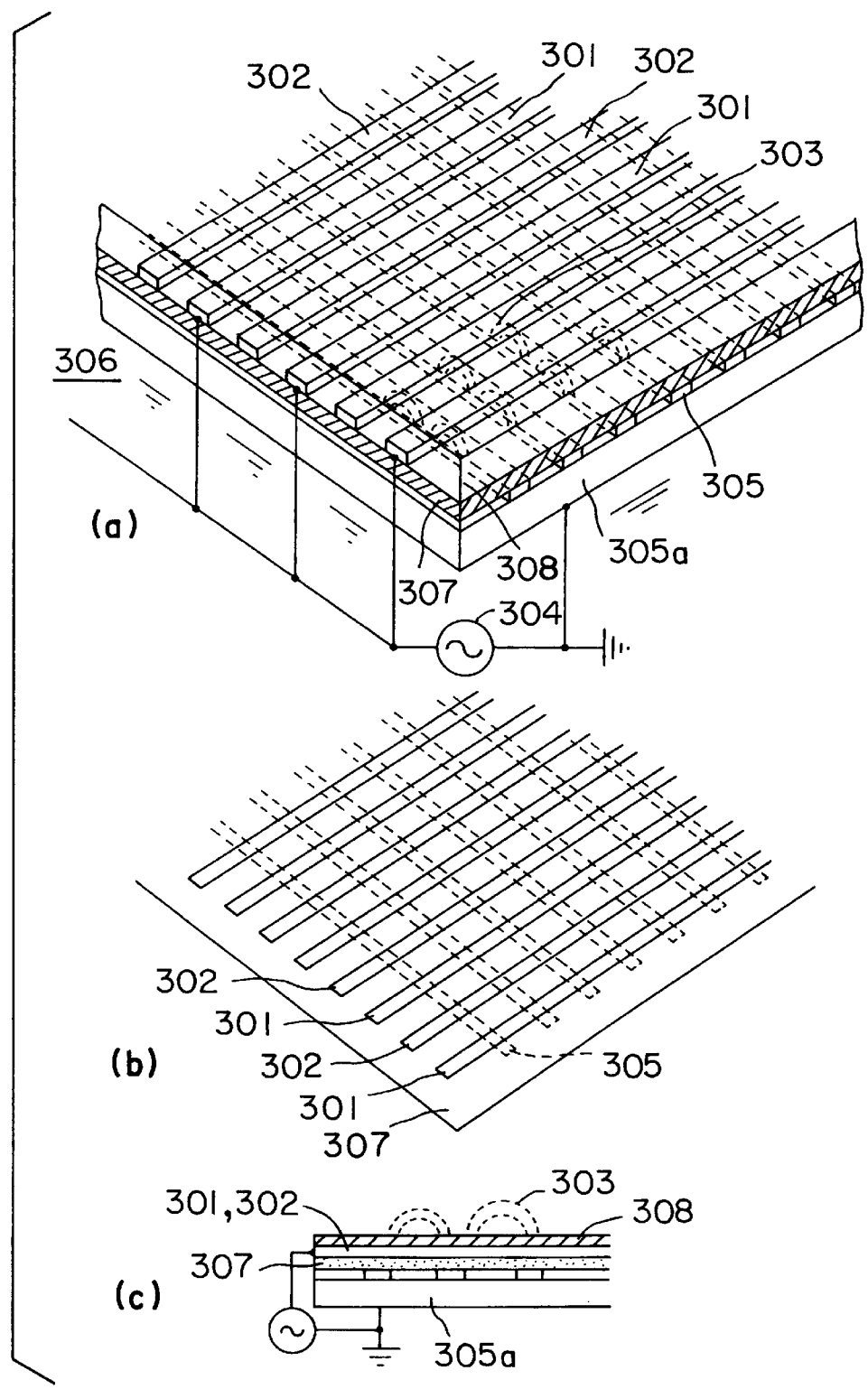
F I G. 53

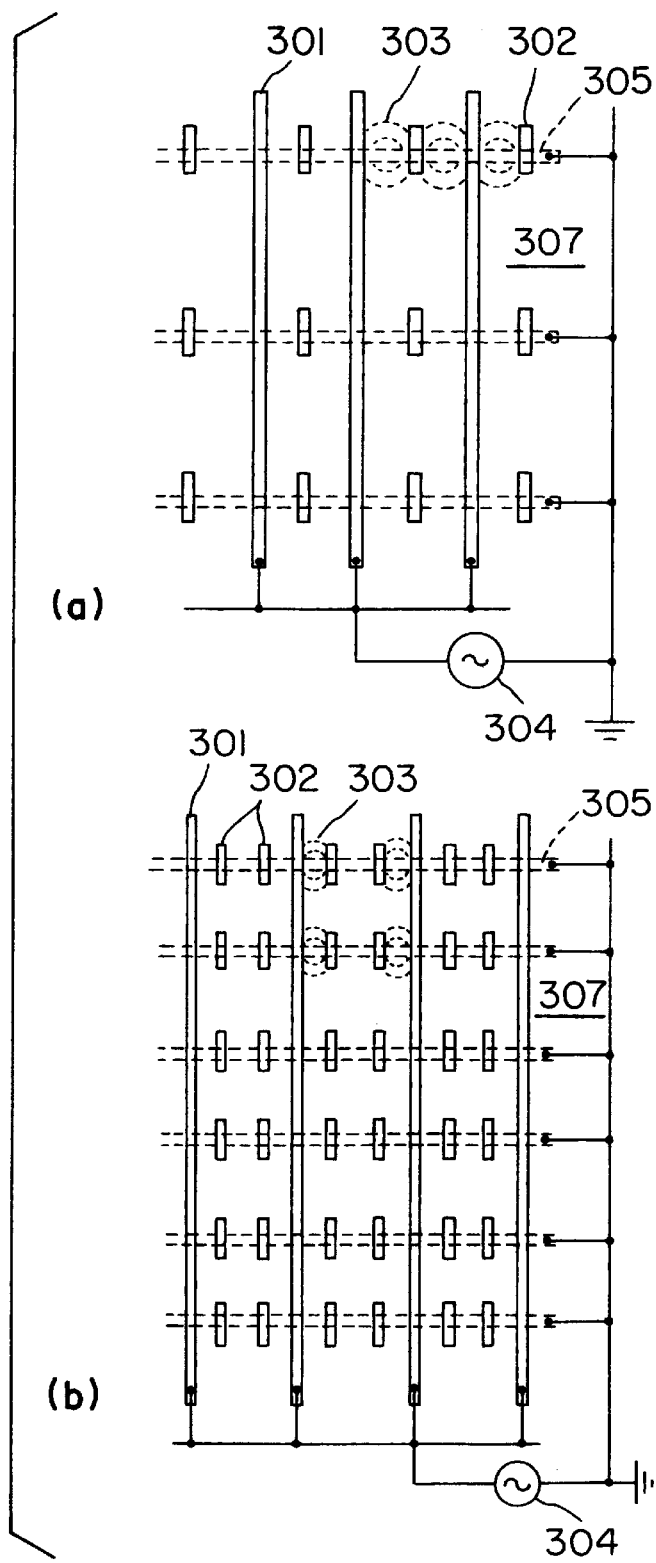
F I G. 56

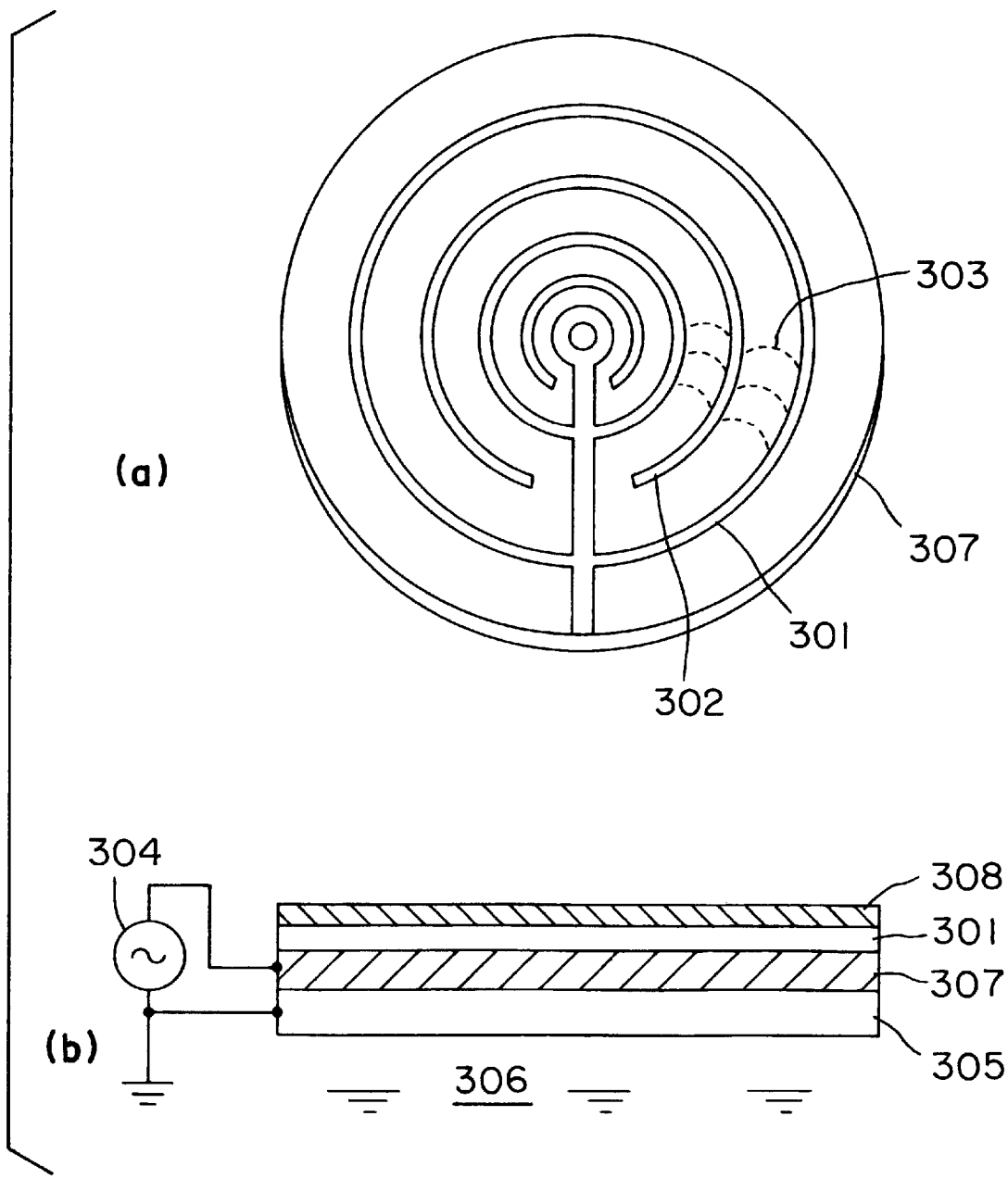
F I G. 58

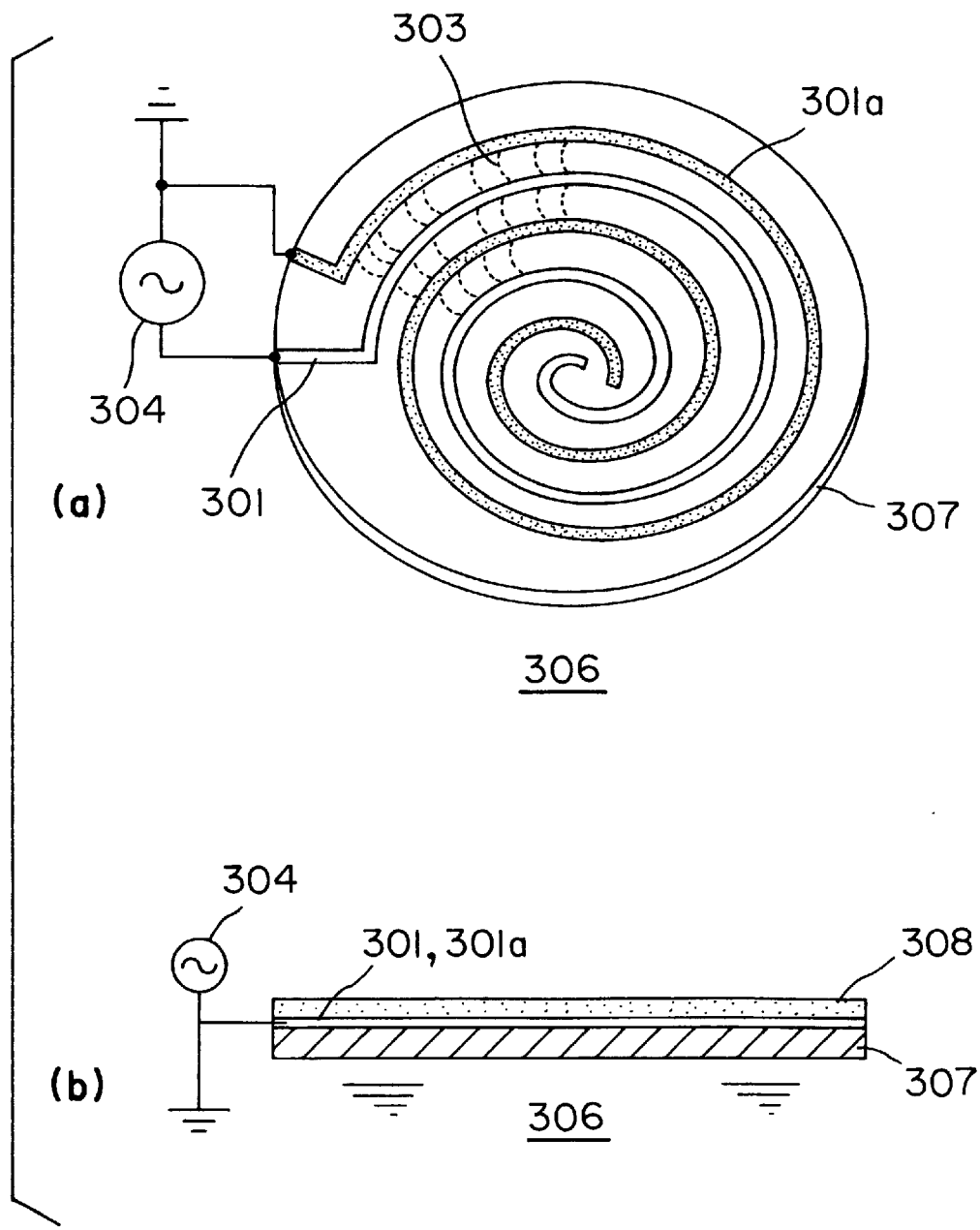
F I G. 59

OZONIZING UNIT OZONE GENERATOR AND OZONE-PROCESSING SYSTEM

BACKGROUND OF THE INVENTION

1. Field of the Invention

The present invention relates to an ozonizing unit that generates ozone by subjecting a gas, such as oxygen gas or air, to surface discharge (creeping discharge), an ozone generator and an ozone-processing system.

2. Description of the Related Art

Ozone has been used for the sterilization, deodorization and bleaching of service water and sewage, for the deodorization and bleaching of industrial waste water, for the bleaching of pulp and for the sterilization of medical implements. A known surface discharge ozone generator is provided with a plurality of electrodes arranged on the surface of a dielectric substrate, and generates ozone from an ozone source gas by subjecting the ozone source gas to silent discharges between the plurality of electrodes.

The conventional ozone generator generates ozone by generating silent discharges between the plurality of electrodes. A large ozone generator provided with electrodes arranged at a small interval are desired to generate ozone of high concentration. However, it is difficult to space the large electrodes having a large area uniformly at a small interval.

The electrodes of the surface discharge ozone generator arranged on the surface of the dielectric substrate deteriorate due to sputtering and the life thereof is not long enough.

The present invention has been made in view of the foregoing problems and it is therefore an object of the present invention to provide an ozonizing unit capable of generating high-concentration ozone with high reliability and having a large ozone generating capacity and a long life, an ozone generator, and an ozone-processing system.

SUMMARY OF THE INVENTION

According to the present invention, an ozonizing unit has an electrode plate having a dielectric substrate and a pair of electrodes formed on a first surface of the dielectric substrate. A dielectric layer is formed on the first surface of the dielectric substrate so as to cover the pair of electrodes.

Since the pair of electrodes are covered with the dielectric layer, the pair of electrodes are not deteriorated by sputtering.

According to the present invention, an ozonizing unit comprises an electrode plate having a dielectric substrate and at least a pair of electrodes formed on a first surface of the dielectric substrate at a predetermined interval and serving as surface discharge electrodes; a gas guide spaced from a surface of the electrode plate by spacers so as to define a discharge space extending over the electrodes of the electrode plate into which a source gas is supplied; and a cooling structure having a cooling water chamber and disposed on a surface of the electrode plate on the opposite side of the surface of the same facing the gas guide; in which a holding plate is disposed through an elastic member on a surface of the gas guide on the opposite side of the electrode plate, and the cooling structure and the holding plate are fastened together by fastening means at positions thereon outside the electrode plate and the gas guide.

In this ozonizing unit, the electrode plate, the spacers and the gas guide can indirectly be held and fixed, and the ozonizing unit integrally provided with the cooling structure and the holding plate can easily be constructed.

According to the present invention, an ozonizing unit comprises a cooling structure having a cooling water chamber; a pair of electrode plates disposed on the opposite surfaces of the cooling structure, respectively, and each having a dielectric substrate and at least a pair of electrodes serving as surface discharge electrodes and arranged at a predetermined interval on a first surface of the dielectric substrate; gas guides each disposed through spacers on the surface of the electrode plate provided with the electrodes so as to define a discharge space; and holding plates each disposed through an elastic member placed on a surface of the gas guide on the opposite side of the electrode plate.

The discharge spaces can effectively be disposed relative to the cooling structure, and the ozonizing unit can be constructed in an efficient and compact construction.

In the ozonizing unit according to the present invention, the pair of holding plates are fastened together by fastening means at positions thereon outside the cooling structure, the pair of gas guides and the pair of electrode plates.

In the ozonizing unit, the electrode plates, the spacers and the gas guides can indirectly be held and fixed, and the ozonizing unit integrally provided with the cooling structure and the holding plates can simply and easily be constructed.

In the ozonizing unit according to the present invention, the pair of holding plates and the cooling structure are fastened together by fastening means at positions thereon outside the pair of gas guides and the pair of electrode plates.

Thus, the electrode plates, the spacers and the gas guides can indirectly be held and fixed, and the ozonizing unit integrally provided with the cooling structure and the holding plates can simply and easily be constructed.

The ozonizing unit may have a cylindrical ozone discharging space formed in a central part of an assembly of the cooling structure, the electrode plates, the gas guides and the holding plates, the source gas may be supplied through all sides of the ozonizing unit into the discharge spaces, and ozone generated by surface discharge may be discharged into the ozone discharging space.

In this ozonizing unit, any parts for forming a source gas passage for supplying the source gas are not necessary, and ozone can easily and simply be discharged and collected.

Spaces between the gas guides and the corresponding holding plates formed near the cylindrical ozone discharging space may be sealed in a gas-tight fashion by sealing members.

When those spaces are thus sealed, ozone is unable to leak from the ozonizing unit and can easily be collected from the ozone discharging space formed in the central part of the ozonizing unit.

The source gas may be supplied through one side of the discharge space of the ozonizing unit, an ozone discharging space having the shape of a quadrangular prism and an ozone discharging opening may be formed in one end part of the holding plate opposite a source gas supply side, the source gas may be supplied through one side of the ozonizing unit, and ozone generated by surface discharge may be discharged into the ozone discharging space.

In the ozonizing unit, any parts for forming a source gas supply passage for supplying the source gas are not necessary and an ozone discharging and collecting structure can easily and simply be constructed. The source gas can easily be supplied so as to flow at a constant flow rate through the discharge space and surface discharge can be stabilized.

A plurality of ozonizing units like that integrally provided with the holding plates may be stacked, a plurality of stud bolts may be extended through the plurality of ozonizing units, and the opposite ends of the stacked ozonizing units may be fastened together by fastening means to build an ozone generator.

An ozone generator having a large ozone generating capacity can easily be constructed by thus stacking the plurality of ozonizing units, and ozone can easily be collected and the ozone generator has a simple construction because the ozone discharging spaces of the ozonizing units are connected continuously to form a cylindrical common ozone passage. The ozonizing units may be standardized.

When the ozone generated by supplying a source gas into the discharge spaces of the integrally stacked ozonizing units and exposing the same to surface discharge in the discharge spaces of the ozonizing units is discharged into the cylindrical common ozone passage, the dimensional relation expressed by the following expressions may be satisfied.

$$A_1 = n \times \pi \times D \times G$$

$$A_2 = \pi \times (D/2)^2$$

$$\alpha = (A_2/A_1) \geq 2$$

where n is the number of the discharge spaces, G is the width of the discharge spaces, D is the diameter of the cylindrical common ozone passage, A1 is the total area of openings of the discharge spaces opening into the cylindrical common ozone passage, A2 is the sectional area of the cylindrical common ozone passage and α is the ozone discharging space ratio.

When the ozone generator is thus constructed, the ratio of the total area of the openings of the ozone discharging spaces opening into the cylindrical ozone discharging spaces to the area of the ozone discharging space is determined, pressure loss in ozone in the ozone discharging space can be reduced, and the pressure difference between the pressure of the ozone in the discharge space of each ozonizing unit and the pressure of the ozone in the ozone discharging space can be limited to the least extent. Consequently, the source gas is able to flow through the discharge spaces of the ozonizing units at a substantially constant flow rate.

Ozone-resistant O rings may be interposed between the adjacent stacked ozonizing units to seal the joints of the ozonizing units in a gas-tight fashion.

When the joints are thus sealed, the source gas and the ozone do not leak from the discharge spaces and the ozone discharging space, and the ozone can efficiently be collected.

The ozonizing units are stacked, the following expression may be satisfied.

$$P_1 \times n_1 = P_2 \times n_2$$

Where $P_1$ is compressive force applied by the fastening means to the opposite ends of stud bolts extended through the stacked ozonizing units, $n_1$, is the number of the stud bolts, $n_2$ is the number of O rings sandwiched between the adjacent ozonizing units, and $P_2$ is compressive force applied to the O rings to make the O rings exercise their sealing effect.

In this ozonizing units, the O rings sandwiched between the adjacent ozonizing units are compressed properly for effective sealing, the sizes or the numbers of the stud bolts and nuts and the size or hardness of the O rings can selectively be determined.

Posts may be attached to the opposite ends of the stud bolts extending through the stacked ozonizing units or the holding plates at the opposite ends of the ozonizing units, the posts may be fixedly connected to sliding devices placed in a pressure vessel, and the sliding devices may be moved outside the pressure vessel when a cover covering the pressure vessel is opened.

This arrangement facilitates work for placing the stacked ozonizing units in and taking the same out of the pressure vessel, and reduces time necessary for assembling and maintenance.

The cooling structure, the electrode plate and the gas guide may be rectangular, and the terminals of the pair of electrodes serving as surface discharge electrodes, and the cooling water ports of the cooling structure may be disposed opposite to each other or the respective positions of the terminals and the ports may be spaced an angular interval of 90° apart from each other.

This arrangement simplifies and facilitates work for connecting wires to the terminals of the electrodes and connecting pipes to the cooling water ports.

A recess precisely fitting the electrode plate may be formed in a surface of the cooling structure in contact with a surface of the electrode plate not provided with the electrodes.

When the recess is formed in the cooling structure, the electrode plate can be fitted in the cooling structure, and the electrode plate and the cooling structure can easily be combined.

The surface of the recess of the cooling structure may be finished in a flatness of 50 μm or below and in a surface roughness of 0.8 a or below.

When the surface of the recess is thus finished, the entire surface of the recess can be brought into uniform, close contact with the electrode plate.

The recess of the cooling structure may be formed in a depth in the range of about ½ to ⅔ of the thickness of the electrode plate.

When the recess of the cooling structure is formed in such a depth, the surface of the electrode plate provided with the electrodes protrudes from the surface of the cooling structure provided with the recess and thereby a source gas supply space can be secured.

The gap between the electrode plate and the side wall of the recess of the cooling structure may be determined taking into consideration the respective coefficients of thermal expansion, temperature and the forming the electrode plate and the cooling structure and the size of the electrode plate, and may be in the range of 10 μm to 200 μm.

The gap of the size thus determined permits the thermal expansion and contraction of the electrode plate and the cooling structure relative to each other.

The cooling structure may be formed by welding a cover to a body part provided with the cooling water chamber, and reinforcing plates may be attached alternately to the inner surface of the body part and that of the cover so as to define a zigzag passage between a cooling water inlet port and a cooling water outlet port.

The reinforcing plates enhance the rigidity of the cooling structure and make cooling water flow effectively through the entire cooling water chamber.

The spacers for spacing out the electrode plate and the gas guide to form the discharge space over the surface of the electrode plate provided with the electrodes may be formed of an ozone-resistant metal.

The spacers can easily be manufactured and the discharge space can easily be formed.

The spacers for spacing out the electrode plate and the gas guide to form the discharge space over the surface of the electrode plate provided with the electrodes may be formed of an ultraviolet-resistant, ozone-resistant insulating material.

The spacers can easily be manufactured and the discharge space can easily be formed.

The spacers may be a plurality of elongate, flat plates arranged at equal intervals so as to form a uniform discharge space.

When such elongate, flat plates are employed as the spacers, a uniform discharge space can be formed and the area of a discharge surface can be increased to the greatest possible extent.

The spacers may be a plurality of circular, flat plates of a small diameter arranged at equal intervals so as to form a uniform discharge space.

When such circular, flat plates are employed as the spacers, a uniform discharge space can be formed and the area of a discharge surface can be increased to the greatest possible extent.

The spacers may be a plurality of small, rectangular, flat plates arranged at equal intervals so as to form a uniform discharge space.

When such rectangular, flat plates are employed as the spacers, a uniform discharge space can be formed and the area of a discharge surface can be increased to the greatest possible extent.

The gas guide for forming the discharge space in the ozonizing unit may be made of a dielectric material.

The gas guide made of the dielectric material prevents abnormal discharge between the surface electrodes and the gas guide, and ensures stable surface discharge.

A plurality of ridges may be formed at equal intervals in the gas guide by machining to use the same as spacers for forming an discharge space of a uniform width.

The gas guide provided with the ridges enables the formation of a uniform discharge space and increasing the surface discharge area to the greatest possible extent.

The gas guide provided with the ridges serving as spacers facilitates work for assembling the ozonizing unit.

A plurality of circular projections of a small diameter arranged at equal intervals may be formed in the gas guide by machining, and the circular projections may be used as spacers for forming the discharge space in a uniform width.

The gas guide provided with the circular projections enables the formation of a uniform discharge space and increasing the surface discharge area to the greatest possible extent.

The gas guide provided with the circular projections serving as spacers facilitates work for assembling the ozonizing unit.

A plurality of small, rectangular projections arranged at equal intervals may be formed in the gas guide by machining, and the rectangular projections may be used for forming the discharge space in a uniform width.

The gas guide provided with the rectangular projections enables the formation of a uniform discharge space and increasing the surface discharge area to the greatest possible extent.

The gas guide provided with the rectangular projections serving as spacers facilitates work for assembling the ozonizing unit.

The spacers may be bonded to the gas guide made of a dielectric material by a chemical bonding method, an adhesive bonding method or a mechanical bonding method.

The gas guide provided with the spacers thus bonded thereto enables the formation of a uniform discharge space and increasing the surface discharge area to the greatest possible extent.

The gas guide provided with the spacers facilitates work for assembling the ozonizing unit.

In the ozonizing unit, the elastic member sandwiched between the gas guide and the holding plate may be formed of an ozone-resistant rubber.

The dielectric substrate of the electrode plate and the dielectric gas guide can be held and fixed by the resilience of the elastic member formed of the ozone-resistant rubber. The ozone-resistant rubber is inexpensive and can form members in any desired shapes In the ozonizing unit, the elastic member sandwiched between the gas guide and the holding plate may be an ozone-resistant spring.

The dielectric substrate of the electrode plate and the dielectric gas guide can be held and fixed by the resilience of the spring.

The elastic member may be formed in an annular shape and fitted in a groove formed in the holding plate so as to be uniformly pressed against a surface of the gas guide.

When the annular elastic member is thus pressed against the surface of the gas guide, the dielectric substrate of the electrode plate and the dielectric gas guide can be held and fixed by a uniform resilience.

The bolted parts of the holding plate combining the ozonizing units, and the corresponding bolted parts of the cooling structure, or the corresponding bolted parts of the holding plates may be provided with bolt guides.

When those bolted parts are provided with the bolt guides, the gas guide is not brought into direct contact with the holding plate, and the dielectric substrate of the electrode plate and the dielectric gas guide are prevented from braking when holding and fixing the same.

The compression ratio of the elastic member, the hardness of the rubber, and the shape and dimensions of the elastic member may properly be determined so that the following expression is satisfied.

$$P>F>W$$

where F is holding force by which the electrode plate and the gas guide are held and fixed indirectly by the holding plate, P is allowable static load that may be exerted on the dielectric substrate of the electrode plate and the dielectric gas guide, and W is force dependent on the weights and frictional properties of the electrode plate and the gas guide, and acceleration that may be exerted on the electrode plate and the gas guide.

When the elastic member satisfies the foregoing condition, the dielectric substrate of the electrode plate will not be broken by the holding force for holding the ozonizing unit, and the electrode plate, the spacers and the gas guide indirectly held and fixed will not be moved relative to each other by accelerations that may acts thereon during transportation, which improves the quality of the ozonizing unit.

The holding plate disposed on the elastic member placed on the back surface of the gas guide may be used jointly as a common holding plate by the adjacent ones of the stacked ozonizing units.

Since the holding plate is used jointly by the adjacent ozonizing units, the number of the component parts of the ozone generator can be reduced and man-hour necessary for assembling the ozone generator can be saved, and the ozone generator can be constructed in a small, compact structure.

The surface discharge ozonizing unit may be combined with at least one of an ultraviolet irradiation device, a hydrogen peroxide producing device, a catalytic decomposing device, a radiation generating device, an ultrasonic generating device or a pH adjusting device.

When the ozonizing unit is combined with at least one of those devices, the oxidizing ability of ozone generated by the ozonizing unit is enhanced, and the an ozone generator having a high added value can be constructed.

The ozone generator may include at least one of a gas supply system for supplying a source gas containing oxygen, a gas absorbing system capable of absorbing moisture or gases other than oxygen contained in the source gas and a contact system capable of bringing generated ozone into contact with either water or a gas.

Impurities contained in the source gas can be removed, the ozone can be water-treated or gas-treated, and a compact, efficient ozone generator having a high added value can be constructed.

The ozone generator may be provided with at least one of an activated charcoal filtration device using activated charcoal, a sand filtration device using sand and a membrane filtration device using filtering membranes, and ozone processing water or an ozone processing gas used for processed ozone may be passed through a cleaning device, or water or a gas cleaned by the cleaning device may be brought into contact with ozone.

The ozone generator may further be provided with an effluent ozone processing device for processing unused ozone brought into contact with water.

The ozone generator provided with the effluent ozone processing device is able to recover unused ozone and forms a safe, efficient ozone-processing system.

According to the present invention, an oznizer is provided with a plurality of electrode plates combined with a single cooling structure.

Since this ozonizing unit is provided with the plurality of electrode plates combined with the single cooling structure, the ozonizing unit having a large capacity can easily be constructed in a compact construction effectively using space.

According to the present invention, an ozonizing unit comprises a plurality of electrode plates, cooling structures disposed between the adjacent electrode plates, gas guides disposed between the adjacent electrode plates, and holding plates, and has an ozone discharging space extending through the holding plates.

This ozonizing unit does not need any parts for forming a source gas supply passage, and an ozone discharging and collecting structure can easily be simplified.

According to the present invention, an ozonizing unit comprises at least a pair of cooling structure each having a cooling water chamber, an electrode plate having a dielectric substrate and at least a pair of electrodes serving as surface discharge electrodes and arranged at a predetermined interval on one surface of the dielectric substrate, and placed on one surface of one of the cooling structure facing the other cooling structure, and spacers placed between the cooling structures.

This ozonizing unit does not need any pats, such as gas guides and holding plates, and is able to use an available space effectively. Therefore, the capacity of the ozonizing unit can easily be increased, and the ozonizing unit can be constructed in a compact construction and is able to form an inexpensive ozone generator.

According to the present invention, an ozonizing unit comprises electrode plates, and cooling structures fastened together at positions thereon outside the perimeters of the electrode plates by fastening means.

The electrode plates of this ozonizing unit can indirectly be held, and the ozonizing unit can be constructed by simply and easily combining the cooling structures and the electrode plates.

According to the present invention, an ozonizing unit comprises a plurality of electrode plates combined with a single cooling structure.

This ozonizing unit having the plurality of electrode plates combined with the single cooling structure is able to use an available space effectively, and can easily be constructed in a large capacity and in a compact construction.

According to the present invention, an ozonizing unit comprises a plurality of electrode plates, and cooling structures interposed between the adjacent electrode plates, and has an ozone discharging space formed through each cooling structure.

In this ozonizing unit, an ozone discharging and collecting structure can be simplified and can easily be formed.

According to the present invention, an ozonizing unit comprises a plurality of electrode plates arranged in a stack, each electrode plate has a dielectric substrate and a pair of electrodes disposed on one of the surfaces of the dielectric substrate.

Since the electrode plates each having the dielectric substrate and the pair of electrodes are stacked, the ozonizing unit can be constructed in a compact construction.

According to the present invention, an ozonizing unit comprises an electrode plate including a dielectric substrate, a linear hot electrode disposed on the front side of the dielectric substrate, a linear stray electrode (floating electrode) disposed on the front side of the dielectric substrate, and a back electrode disposed on the back side of the dielectric substrate to apply a voltage across the linear hot electrode and the back electrode.

In this ozonizing unit, since the stray electrode is disposed on the front side of the dielectric substrate in combination with the hot electrode, an electric field of a high intensity can be created in a discharge space for high ozone generating performance.

According to the present invention, the back electrode is formed over the entire back surface of the dielectric substrate.

Therefore, discharge occurs in the entire region of the surface of the dielectric substrate.

According to the present invention, an ozonizing unit has a dielectric substrate, a hot electrode disposed on the front side of the dielectric substrate, a stray electrode disposed on the front side of the dielectric substrate, and a dielectric layer covering the hot electrode and the stray electrode.

The dielectric layer covering the hot electrode and the stray electrode prevents the deterioration of the hot electrode and the stray electrode.

According to the present invention, an ozonizing unit has a dielectric substrate, a pair of hot electrodes disposed on the front side of the dielectric substrate, and two stray electrodes disposed between the pair of hot electrodes.

In this ozonizing unit, the two stray electrodes disposed on the front side of the dielectric substrate enhances the intensity of an electric field created in a discharge space, which contributes greatly to ozone generation.

According to the present invention, an ozonizing unit has a dielectric substrate, and a linear back electrode disposed on the back side of the dielectric substrate.

In this ozonizing unit, the linear back electrode creates a high-intensity electric field locally on the back side of the dielectric substrate, which contributes greatly to ozone generation.

According to the present invention, an ozonizing unit has a circular dielectric substrate, a hot electrode, and a stray electrode, in which the hot electrode and the stray electrode are formed in the shape of concentric circles or a spiral.

In this ozonizing unit, the hot electrode and the stray electrode formed in the shape of concentric circles or a spiral enhance the intensity of an electric field created in a discharge space extending on the front side of the dielectric substrate, which contributes greatly to ozone generation.

According to the present invention, an ozonizing unit comprises a dielectric substrate, a linear hot electrode disposed on the front side of the dielectric substrate, a linear back electrode disposed on the back side of the dielectric substrate along a direction intersecting the hot electrode to apply a voltage across the hot electrode and the back electrode.

Since the hot electrode disposed on the front side of the dielectric substrate and the back electrode disposed on the back side of the dielectric substrate extend along intersecting directions, respectively, the intensity of an electric field is increased in a region corresponding to the intersection of the directions can be improved.

According to the present invention, an ozonizing unit comprises a dielectric substrate, a back electrode disposed on the back side of the dielectric substrate, and a linear stray electrode disposed on the front side of the dielectric substrate along a direction intersecting the back electrode.

Since the stray electrode disposed on the front side of the dielectric substrate and the back electrode disposed on the back side of the dielectric substrate extend along intersecting directions, respectively, the intensity of an electric field is increased in a region corresponding to the intersection of the directions can be improved. According to the present invention, an ozone generator comprises a dielectric substrate, a linear hot electrode disposed on the front side of the dielectric substrate, and an additional electrode disposed on the front side of the dielectric substrate to apply a voltage across the hot electrode and the additional electrode.

Since the ozone generator is not provided with any back electrode on the back side of the dielectric substrate, the expansion of an electric field into a region behind the dielectric substrate can be prevented so that the intensity of the electric field on the front side of the dielectric substrate is high. Accordingly, ozone concentration can be increased and discharge efficiency can be improved.

BRIEF DESCRIPTION OF THE DRAWINGS

The above and other objects, features and advantages of the present invention will become more apparent from the following description taken in connection with the accompanying drawings, in which:

FIG. 1 is a plan view of an ozonizing unit in embodiment 1-1 of a first embodiment according to the present invention;

FIG. 2 is a sectional view of the ozonizing unit shown in FIG. 1;

FIG. 3 is a sectional view of an ozonizing unit in embodiment 1-2 according to the present invention;

FIG. 4 is a sectional view of the ozonizing unit in embodiment 1-2 according to the present invention;

FIG. 14 is a plan view of a cooling structure;

FIG. 15 is a sectional view of the cooling structure shown in FIG. 14;

FIG. 25 is a plan view of an ozonizing unit in embodiment 1-11 according to the present invention;

FIG. 26 is a sectional view of the ozonizing unit in embodiment 1-11;

FIG. 27 is a plan view of an ozonizing unit in embodiment 1-12 according to the present invention;

FIG. 31 is a plan view of a surface discharge ozonizing unit;

FIG. 32 is a sectional view of the surface discharge ozonizing unit shown in FIG. 31;

FIG. 33 is a conceptional view of a silent discharge ozonizing unit;

FIG. 34 is a partly cutaway perspective view of a surface discharge ozonizing unit in a second embodiment according to the present invention;

FIG. 38 is a side elevation of an ozone generator in embodiment 3-1 of a third embodiment according to the present invention;

FIG. 39 is a plan view of the ozone generator shown in FIG. 38;

FIG. 41 is a sectional view of an ozone generator in embodiment 3-2 of the third embodiment;

FIG. 42 is a typical front elevation of the ozone generator shown in FIG. 41;

FIG. 43 is a sectional view of an ozone generator in embodiment 3-3 of the third embodiment;

FIG. 44 is a sectional view of an ozone generator in embodiment 3-4 of the third embodiment;

FIG. 45 is a sectional view of an ozone generator in embodiment 3-5 of the third embodiment;

FIG. 46 is a sectional view of an ozone generator in embodiment 3-6 of the third embodiment;

FIG. 50 is a fragmentary perspective view of an ozone generator in embodiment 4-1 of a fourth embodiment according to the present invention;

FIG. 51 is a sectional view of an ozone generator in embodiment 4-2 of the fourth embodiment;

FIG. 53 is a view of an ozone generator in embodiment 4-4 of the fourth embodiment;

FIG. 56 is a view of an ozone generator in embodiment 4-7 of the fourth embodiment;

FIG. 58 is a view of an ozone generator in embodiment 4-9 of the fourth embodiment; and FIG. 59 is a view of an ozone generator in embodiment 4-10 of the fourth embodiment.

DESCRIPTION OF THE PREFERRED EMBODIMENTS

First Embodiment

Basic Principle

Figure 5:
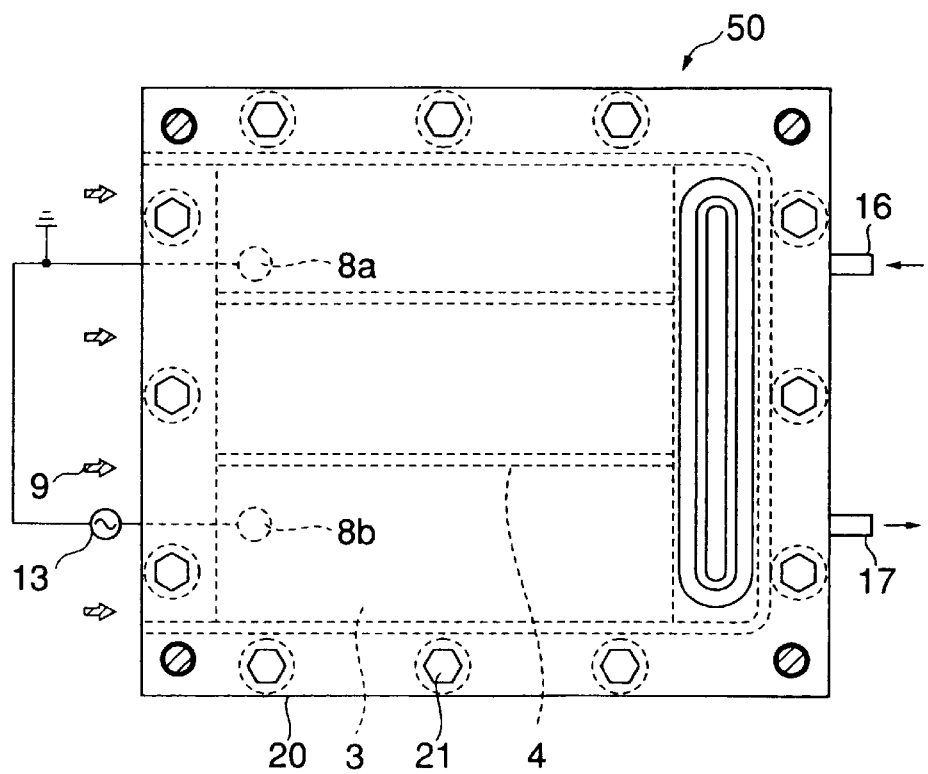
FIG. 5 is a plan view of an ozonizing unit in embodiment 1-3 according to the present invention.

FIG. 33 is a conceptional view of discharge unit included in a general ozonizing unit which produces silent discharge by opposite electrodes. Referring to FIG. 33, electrodes $1a$ and $1b$ are disposed opposite to each other, and dielectric substrates $2a$ and $2b$ are attached to surfaces of the electrodes $1a$ and $1b$ facing each other, respectively, so as to form a discharge space 6. A source gas 9 is supplied into the discharge space 6 and a power source 13 applies a high voltage across the electrodes $1a$ and $1b$ to generate ozone 10 by silent discharge.

The performance of the ozone generator of this kind is greatly dependent on the width G' of the discharge space 6. Difficulties in dimension management and error management are expected in fabricating the ozonizing unit particularly when the width G' of the discharge space 6 is small. Accordingly, unstable performance is the problem that resides in this ozonizing unit.

Recently, surface discharge ozonizing units have prevalently been used because of their facility in the management of the width of the discharge space and their high efficiency.

FIG. 31 is a plan view of a discharge unit included in a surface discharge ozonizing unit, and FIG. 32 is a sectional view of the discharge unit shown in FIG. 31.

Referring to FIGS. 31 and 32, the surface discharge ozonizing unit has an electrode plate 3 having a dielectric substrate 2 of glass or ceramic material, and a surface discharge electrode set (creeping discharge electrode set) 1 of a pair of linear electrodes $1a$ and $1b$ having linear electrode elements formed at predetermined intervals by screen printing or the like on one of the surfaces of the dielectric substrate 2. A gas guide 5 is disposed opposite to the surface discharge electrode set 1 of the electrode plate 3 and is spaced from the electrode plate 3 by spacers 4 to form a discharge space 6 of a width G'. The electrode plate 3 is disposed with the surface thereof opposite the surface thereof provided with the surface discharge electrode set 1 in contact with a cooling structure 7.

The pair of linear electrodes $1a$ and $1b$ formed on the dielectric substrate 2 are covered with a dielectric layer 18. The linear electrodes $1a$ and $1b$ are connected to terminals $8a$ and $8b$, respectively. A high voltage is applied across the terminals $8a$ and $8b$. The terminals $8a$ and $8b$ are not covered with the dielectric layer 18. The gas guide 5 is provided with a source gas inlet 11 through which a source gas is supplied into the discharge space 6, and an ozone outlet 12 through which ozone 10 is discharged. The spacers 4 surround the surface discharge electrode set 1 to define the discharge space 6 and to seal the discharge space 6 so that ozone 10 is discharged only through the ozone outlet port 12.

In the surface discharge ozonizing unit thus constructed, a high voltage is applied across the terminals $8a$ and $8b$ by the power source 13 to produce surface discharge by the surface discharge electrode set 1. Consequently, the source gas 9 supplied through the source gas inlet 11 into the discharge space 6 is ozonized to generate ozone 10. The ozone 10 is discharged through the ozone outlet 12. Cooling water 15 is supplied at a predetermined flow rate through an inlet port 16 into the cooling chamber 14 of the cooling structure 7. The cooling water 15 flows out through an outlet port 17.

Embodiment 1-1

A surface discharge ozonizing unit 50 in embodiment 1-1 will be described hereinafter.

FIG. 1 shows the surface discharge ozonizing unit 50 in embodiment 1-1, FIG. 2(a) is a sectional view of the surface discharge ozonizing unit 50 shown in FIG. 1 and FIG. 2(b) is a view of an electrode plate included in the surface discharge ozonizing unit.

Referring to FIGS. 1, 2(a) and 2(b), the surface discharge ozonizing unit 50 comprises an electrode plate 3 having a dielectric substrate 2 of glass or ceramic material, and a surface discharge electrode set 1 of a pair of linear electrodes $1a$ and $1b$ having linear electrode elements formed at predetermined intervals by screen printing or the like on one of the surfaces of the dielectric substrate 2, a gas guide 5 disposed opposite to the surface discharge electrode set 1 of the electrode plate 3 and spaced from the electrode plate 3 by spacers 4 to form a discharge space 6, and a cooling structure 7 in contact with a surface of the dielectric substrate 2 on the opposite side of the surface of the same provided with the surface discharge electrode set 1.

As shown in FIG. 2(b), the pair of linear electrodes $1a$ and $1b$ formed on the dielectric substrate 2 is covered entirely with a dielectric layer 18. Terminals $8a$ and $8b$ are formed at the respective ends of the linear electrodes $1a$ and $1b$, respectively. A high voltage is applied across the terminals $8a$ and $8b$. The gas guide 5 is formed of a dielectric material, such as glass or a ceramic material.

Elastic members $19a$ and $19b$ are disposed on a surface of the gas guide 5 on the opposite side of the electrode plate 3.

A holding plate 20 is placed on the gas guide 5 so as to sandwich the elastic members 19a and 19b between the gas guide 5 and the holding plate 20. The holding plate 20 and the cooling structure 7 are fastened together by a plurality of stud bolts (fastening means) 21 at positions outside the perimeters of the electrode plate 3 coated with the dielectric layer 18, the spacers 4 for spacing the gas guide 5 from the electrode plate 3 to form the discharge space 6, and the gas guide 5 so that the electrode plate 3, the spacers 4 and the gas guide 5 may not directly be compressed between the holding plate 20 and the cooling structure 7. Bolt guides 22, through which the stud bolts 21 are extended, are interposed between peripheral parts of the holding plate 20 and the cooling structure 7 so that the holding plate 20 may not come into direct contact with the gas guide 5 and a predetermined gap is formed between the gas guide 5 and the holding plate 20. Consequently, the electrode plate 3, the spacers 4 and the gas guide 5 are held indirectly between the cooling structure 7 and the holding plate 20 by the resilience of the elastic members 19a and 19b.

The elastic members 19a and 19b are formed of an ozone-resistant rubber or the same are ozone-resistant springs. The elastic members 19a and 19b are arranged in annular shapes so that a compressive pressure may uniformly be applied to the surface of the gas guide 5. The elastic members 19a and 19b are fitted in grooves 20a formed in the inner surface of the holding plate 20.

The electrode plate 3 having the dielectric substrate 2 and the gas guide 5 made of a dielectric material are inferior in mechanical strength to metal members. Therefore, the compression ratio and the hardness of the elastic members 19a and 19b, or the shapes, dimensions and spring constants of the elastic members 19a and 19b are determined so that the following expression is satisfied.

$$P > F > W \tag{1}$$

where F is holding force by which the electrode plate 3 and the gas guide 5 are held and fixed indirectly, P is allowable static load exerted by the dielectric substrate of the electrode plate 3 and the dielectric gas guide 5, and W is force resulting from the weights and frictional properties of the electrode plate 3 and the gas guide 5 and acceleration that may be exerted on the electrode plate 3 and the gas guide 5.

When the electrode plate 3 and the gas guide 5 are thus held and fixed indirectly, the electrode 3 and the gas guide 5 are not broken by the holding force, and the same are not dislocated relative to the holding plate 20 when the ozonizing unit 50 is moved.

As shown in FIGS. 1 and 2, a cylindrical ozone discharging space 23 is formed in central parts of the electrode plate 3, the gas guide 5, the cooling structure 7 and the holding plate 20 of the ozonizing unit 50. The peripheral parts of the electrode plate 3 and the gas guide 5 are spaced by a distance equal to the width G of the discharge space 6 corresponding to the thickness of the spacers 4 to supply the source gas 9 through all the sides of the ozonizing unit 50. When the source gas 9 supplied through all the sides of the ozonizing unit 50 flows through the discharge space 6, the source gas 9 is exposed to surface discharge and ozone 10 is generated. The ozone 10 is discharged through the discharge space 23 and is collected.

The diameter D of the ozone discharging space 23 is determined so that the flow rates of the source gas 9 and the ozone 10 in the discharge space 6 are substantially constant when a plurality of ozonizing units similar to the ozonizing unit 50 are stacked, which will be described later. Although it is preferable that the ozone discharging space 23 has the shape of a circular cylinder in view of facility in machining the electrode plate 3 and the gas guide 5, the same may be formed in the shape of a quadrangular prism.

At least one of the elastic members 19a and 19b disposed between the gas guide 5 and the holding plate 20 in the vicinity of the ozone discharging space 23 is capable of sealing function and is formed of an ozone-resistant rubber to prevent the leakage of the source gas 9 and the ozone 10.

The operation of the ozonizing unit 50 will be described hereinafter.

A high voltage is applied across the terminals 8a and 8b connected to the linear electrodes 1a and 1b by the power source 13 to produce surface discharge by the surface discharge electrode set 1. When exposed to surface discharge, the source gas 9 undergoes a chemical reaction and ozone 10 is generated. The ozone is discharged into the ozone discharging space 23 and are collected from the ozone discharge space 23. Reaction heat generated in the discharge space 6 is dissipated into the cooling water 15 flowing through the cooling chamber 14 of the cooling structure 7. The cooling water 15 is supplied at a predetermined flow rate through the inlet port 16 into the cooling chamber 14 and is discharged from the cooling chamber 14 through the outlet port 17.

It is preferable to form the electrode plate 3, the gas guide 5 and the cooling structure 7 in rectangular shapes in a plane, respectively, to determine definitely the positional relation between the electrode plate 3, the gas guide 5 and the cooling structure 7, i.e., the positional relation between the terminals 8a and 8b, the inlet port 16 and the outlet port 17, the electrode plate 3, the gas guide 5 and the cooling structure 7 may be formed in polygonal shapes or circular shapes, respectively, in view of facilitating the manufacture of those components. The terminals 8a and 8b, and the inlet port 16 and the outlet port 17 for the cooling water 15 are disposed at positions opposite to each other or separated by an angular interval of 90° from each other to avoid troublesome work for connecting pipes to the inlet port 16 and the outlet port 17, and to facilitate assembling work.

In embodiment 1-1, the electrode plate 3, the spacers 4 and the gas guide 5 can be held and fixed indirectly without deteriorating the characteristic represented by ozone generation using surface discharge, and the integrated ozonizing unit 50 can simply and easily be constructed.

The resilience of the elastic members 19a and 19b corresponding to the holding force F is determined properly by selectively determining the compression ratio, the hardness or the spring constant, the shape and the dimensions of the elastic members 19a and 19b. Therefore, the appropriate holding force F can be exerted uniformly to the electrode plate 3 and the gas guide 5 in order that the dielectric substrate 2 of the electrode plate 3 and the dielectric gas guide may not be broken. Since the bolt guides 22 prevents the direct contact of the holding plate 20 with the gas guide 5, the breakage of the dielectric substrate 2 of the electrode plate 3 and the dielectric gas guide 5 can be prevented.

Since the gas guide 5 is dielectric, abnormal discharge will not occur between the surface discharge electrode set 1 and the gas guide 5 and stable surface discharge is available.

The source gas 9 is supplied through all the sides of the ozonizing unit 50 and the ozone 10 is discharged into the ozone discharging space 23 formed in a central part of the ozonizing unit 50. Therefore, any parts for forming a supply passage for supplying the source gas 9 are not necessary, and the ozone 10 can simply and easily be collected. Since at least either the elastic member 19a or the elastic member 19b is capable of a sealing function, the source gas 9 and the ozone 10 are unable to leak from the discharge space 6 and the ozone discharging space 23, and the ozone can efficiently be collected.

Since the terminals 8a and 8b, and the inlet port 16 and the outlet port 17 for the cooling water 15 are separated definitely from each other, a wide space is available for assembling work, trouble some connecting assembling work can be avoided, and man-hour for assembling can be saved.

Embodiment 1-2

An ozonizing unit 50 in embodiment 1-2 will be described hereinafter.

The ozonizing unit 50 in embodiment 1-2 is shown in FIGS. 3 and 4 in sectional views, in which pats like or corresponding to those of embodiment 1-1 shown in FIGS. 1 and 2 are designated by the same reference characters and the description thereof will be omitted.

Referring to FIGS. 3 and 4, an electrode plate 3 has a dielectric substrate 2 of glass or ceramic material, and a surface discharge electrode set 1 of a pair of linear electrodes 1a and 1b having linear electrode elements formed at predetermined intervals by screen printing or the like on one of the surfaces of the dielectric substrate 2. A gas guide 5 is disposed opposite to the surface discharge electrode set 1 of the electrode plate 3 and spaced from the electrode plate 3 by spacers 4 to form a discharge space 6. A surface of dielectric substrate 2 of the electrode plate 3 not provided with the surface discharge electrode set 1 is in contact with one of the surfaces of a cooling structure 7. A electrode plate 3, spacers 4 for forming a discharge space 6 and a gas guide 5, are disposed on the other surface of the cooling structure 7. Thus, the two discharge spaces 6 are formed on the opposite sides of the cooling structure 7, respectively, symmetrically with respect to the cooling structure 7. Thus, an ozonizing unit 50 is constructed. The second ozonizing unit similar in construction to the first ozonizing unit is disposed on the other surface of the cooling structure 7. The ozonizing unit 50 has the two discharge spaces 6 of the same shape on the opposite surfaces of the cooling structure 7.

Holding plates 20 are placed on outer surfaces of the gas guides 5 so as to sandwich elastic members 19a and 19b between the gas guides 5 and the holding plates 20, respectively. A source gas 9 is supplied into the discharge spaces 6 and ozone 10 generated in the discharge spaces 6 is discharged by the same methods as those employed in embodiment 1-1.

As shown in FIG. 3, the holding plates 20 are fastened together by a plurality of stud bolts (fastening means) 21 at positions outside the perimeters of the electrode plates 3, the spacers 4 for spacing the gas guides 5 from the electrode plates, the gas guides 5 and the cooling structure 7 so that the electrode plates 3, the spacers 4, the gas guides 5 and the cooling structure 7 may not directly be compressed between the holding plates 20.

As shown in FIG. 4, the holding plates 20 are fastened together by the stud bolts 21 to hold the electrode plates 3, the spacers 4 and the gas guides 5 indirectly between the holding plates 20 and not to apply pressure directly to the electrode plates 3, the spacers 4 and the gas guides 5.

Bolt guides 22, through which the stud bolts 21 are extended, are interposed between peripheral parts of the holding plates 20 so that the holding plates 20 may not come into direct contact with the gas guides 5.

In embodiment 1-2, the electrode plates 3, the spacers 4 and the gas guides 5, and the same two discharge spaces 6 can be formed on the opposite sides of the cooling structure 7, respectively. Therefore, the ozonizing unit 50 can be constructed in an efficient, compact construction, the number of component parts, man-hour for assembling work can be saved and the costs can be reduced.

Embodiment 1-3

Figure 6:
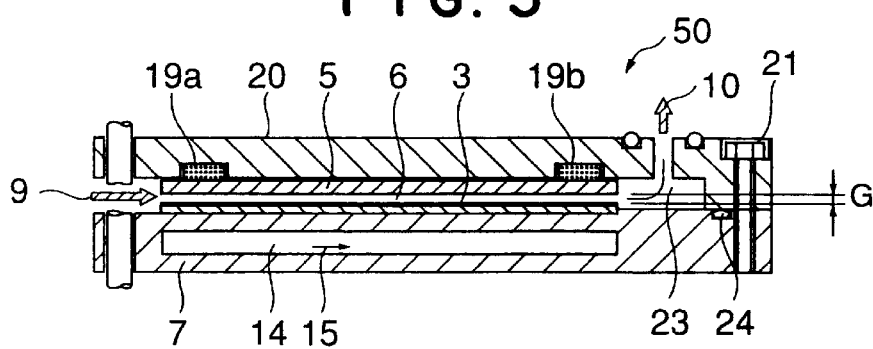
FIG. 6 is a sectional view of an ozonizing unit having a cooling structure and an electrode plate disposed on one of the surfaces of the cooling structure.
Figure 7:
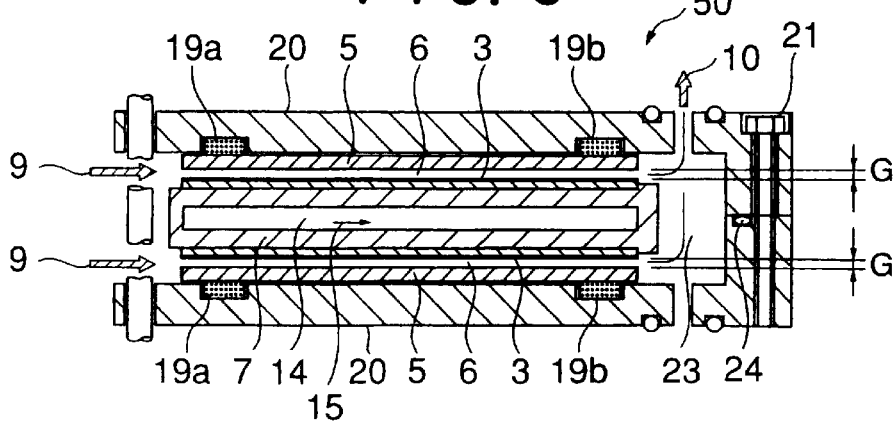
FIG. 7 is a sectional view of an ozonizing unit having a cooling structure, and a pair of electrode plates disposed on the opposite surfaces of the cooling structure, respectively.

An ozonizing unit 50 in embodiment 1-3 will be described hereinafter with reference to FIG. 5 showing the ozonizing unit 50 in a plan view, FIG. 6 showing a construction having one ozonizing unit disposed on one side of a cooling structure in a sectional view and FIG. 7 showing a construction having two ozonizing units disposed on the opposite sides of a cooling structure 7 in a sectional view, in which parts like or corresponding to those of embodiment 1-1 shown in FIGS. 1 and 2 are designated by the same reference characters and the description thereof will be omitted.

Referring to FIGS. 5 to 7, a holding plate 20 is provided in its one end part with an ozone discharging space 23 having the shape of a quadrangular prism. A source gas supply opening of a width equal to that of an electrode plate 3 and a height equal to the width of a discharge space 6 corresponding to the thickness of spacers 4 is formed in one side of the ozonizing unit 50 opposite a side near the ozone discharging space 23 to supply a source gas 9 only through the side opposite the side near the ozone discharging space 23. The width of the discharge space 6 is equal to the thickness of the spacers 4.

Three sides of the ozonizing unit 50 other than the side provided with the source gas supply opening are sealed by an ozone-resistant packing 24 to prevent the leakage of the source gas and ozone 10.

While the source gas 9 supplied through the source gas supply opening into the discharge space 6 is flowing through the discharge space 6, the ozone 10 is generated by surface discharge. The ozone 10 is discharged into the ozone discharging space 23 and is collected.

Since the source gas 9 is supplied only through the source gas supply opening formed in the one side of the ozonizing unit 50 and having the width corresponding to that of the electrode plate 3, the flow rate of the source gas can easily be kept constant and surface discharge can be stabilized. Any parts for forming a supply passage for supplying the source gas 9 are not necessary, and the ozone 10 can simply and easily be collected. The source gas 9 and the ozone 10 are unable to leak from the discharge space 6 and the ozone discharging space 23, and the ozone 10 can efficiently be collected.

The electrode plate 3, the spacers 4 and the gas guide 5 can be held and fixed indirectly without deteriorating the characteristic represented by ozone generation using surface discharge, and the integrated ozonizing unit 50 can simply and easily be constructed in an efficient, compact construction.

Embodiment 1-4

Figure 8:
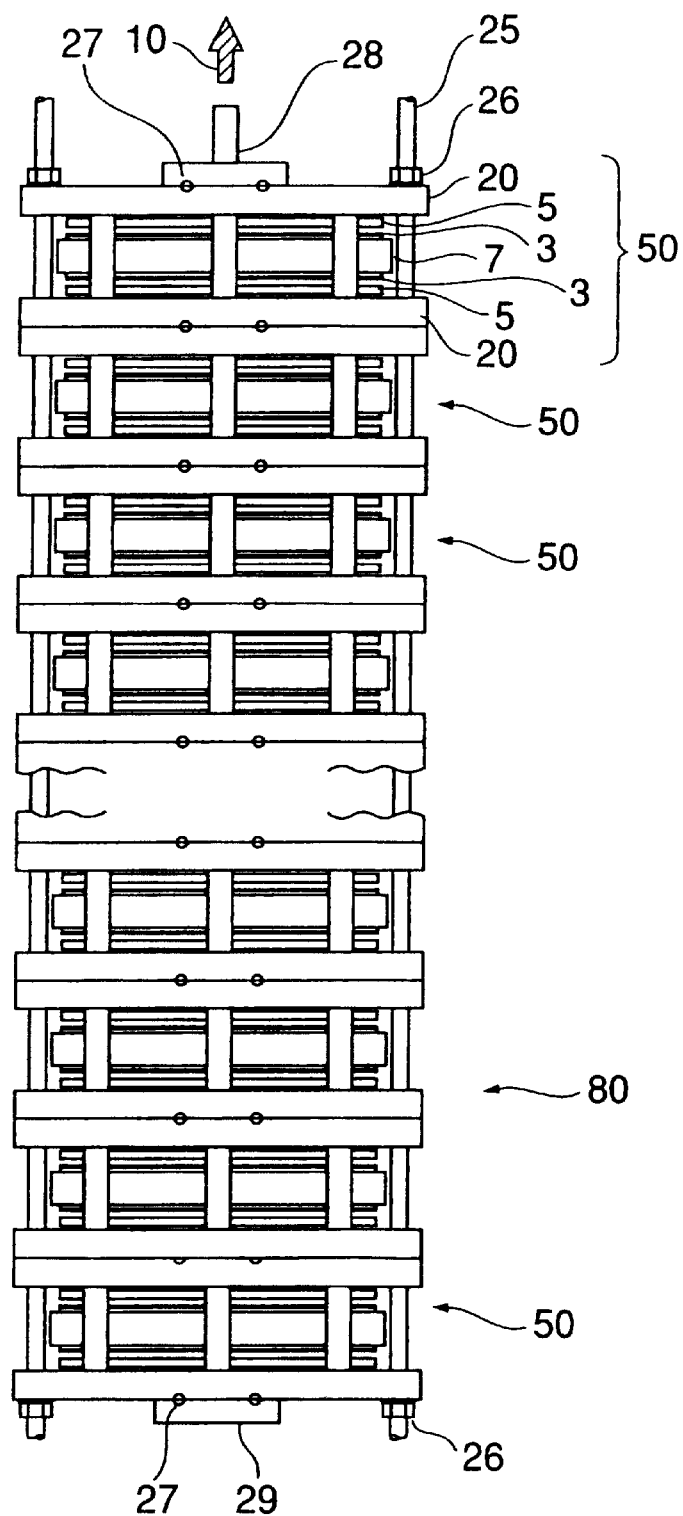
FIG. 8 is a front elevation of an ozone generator in embodiment 1-4 according to the present invention.

A surface discharge ozone generator 80 in embodiment 1-4 according to the present invention will be described hereinafter with reference to FIGS. 8 and 9, in which parts like or corresponding to those of embodiment 1-1 shown in FIGS. 1 and 2 will be designated by the same reference characters and the description thereof will be omitted.

Referring to FIGS. 1 and 2, the surface discharge ozone generator 80 is constructed by stacking a plurality of ozonizing units 50 similar to the ozonizing unit 50 in any one of embodiments 1-1 to 1-3. For instance, if the ozone generating capacity of the surface discharge ozone generator 80 is 1 kg/h, and the ozone generating capacity of the ozonizing unit 50 is 50 g/h, the number of the ozonizing units 50 included in the ozone generator 80 is twenty.

Each of the ozonizing units 50 is provided with a plurality of through holes. The ozone generator 80 is constructed by stacking a necessary number of the ozonizing units 50, extending stud bolts 25 through the through holes of the ozonizing units 50, and putting nuts 26 on the opposite ends of the stud bolts 25 to fasten the ozonizing units 50 together. The stud bolts 25 and the nuts 26 serve as fastening means.

Each ozonizing unit 50 is provided with an ozone discharging space 23. When the ozonizing units 50 are stacked, the ozone discharging spaces 23 of the ozonizing units 50 are connected continuously in a single common ozone passage. A source gas 9 is supplied to each ozonizing unit 50, ozone 10 generated by surface discharge in the ozonizing units 50 is discharged into the common ozone passage, and the ozone 10 is collected through an ozone outlet 28 formed at one end of the common ozone passage.

The other end of the common ozone passage is closed by a blind plate 29. Ozone-resistant O rings 27 are placed between the adjacent ozonizing units 50 in a region near the ozone discharging space 23, between the ozone outlet 28 and the ozonizing unit 50 contiguous with the ozone outlet 28 and between the blind plate 29 and the ozonizing unit 50 contiguous with the blind plate 29 to prevent the leakage of the ozone 10 from the ozone generator 80.

When constructing the ozone generator 80 by stacking up the ozonizing units 50, the relation between the ozone generating capacity of the ozonizing units 50 and that of the ozone generator 80 is determined taking into consideration techniques required by fabricating work and costs.

For instance, assuming that the ozone generating capacity of the ozone generator 80 is 100 g/h, the ozone generator 80 needs two ozonizing units 50 if the ozone generating capacity of the latter is 50 g/h, one ozonizing unit 50 if the ozone generating capacity of the latter is 100 g/h, or four ozonizing unit 50 if the ozone generating capacity of the latter is 25 g/h. The relation between the respective ozone generating capacities of the ozone generator 80 and the ozonizing units 50 is determined taking into consideration techniques required by assembling work and costs.

The stacked ozonizing units 50 of the ozone generator 80 must be fastened together by the stud bolts 25 and the nuts 26 by a fastening force determined by multiplying a compressive force by which each of the O rings interposed between the adjacent ozonizing units 50 must be compressed to exercise its sealing performance satisfactorily by the number of the O rings 27. The respective sizes and numbers of the stud bolts 25 and the nuts 26 are determined selectively so as to meet the following expression.

$$P_1 \times n_1 = P_2 \times n_2 \quad (2)$$

Where $P_1$ is fastening force exerted by each stud bolt 25 and the nuts 26 put on the stud bolt 25, $n_1$ is the number of the stud bolts 25, $P_2$ is force necessary to compress each O ring 27 so that the O ring 27 is able to exercise its sealing ability, and $n_2$ is the number of the O rings 27.

The fastening force $P_1$ to be exerted by each stud bolt 25 and the nuts 26 put on the stud bolt 25 is dependent necessarily on the size of the stud bolt 25 and a torque to be exerted on the nuts when putting the nuts 26 on the stud bolt 25 specified for the stud bolt 25.

Figure 9:
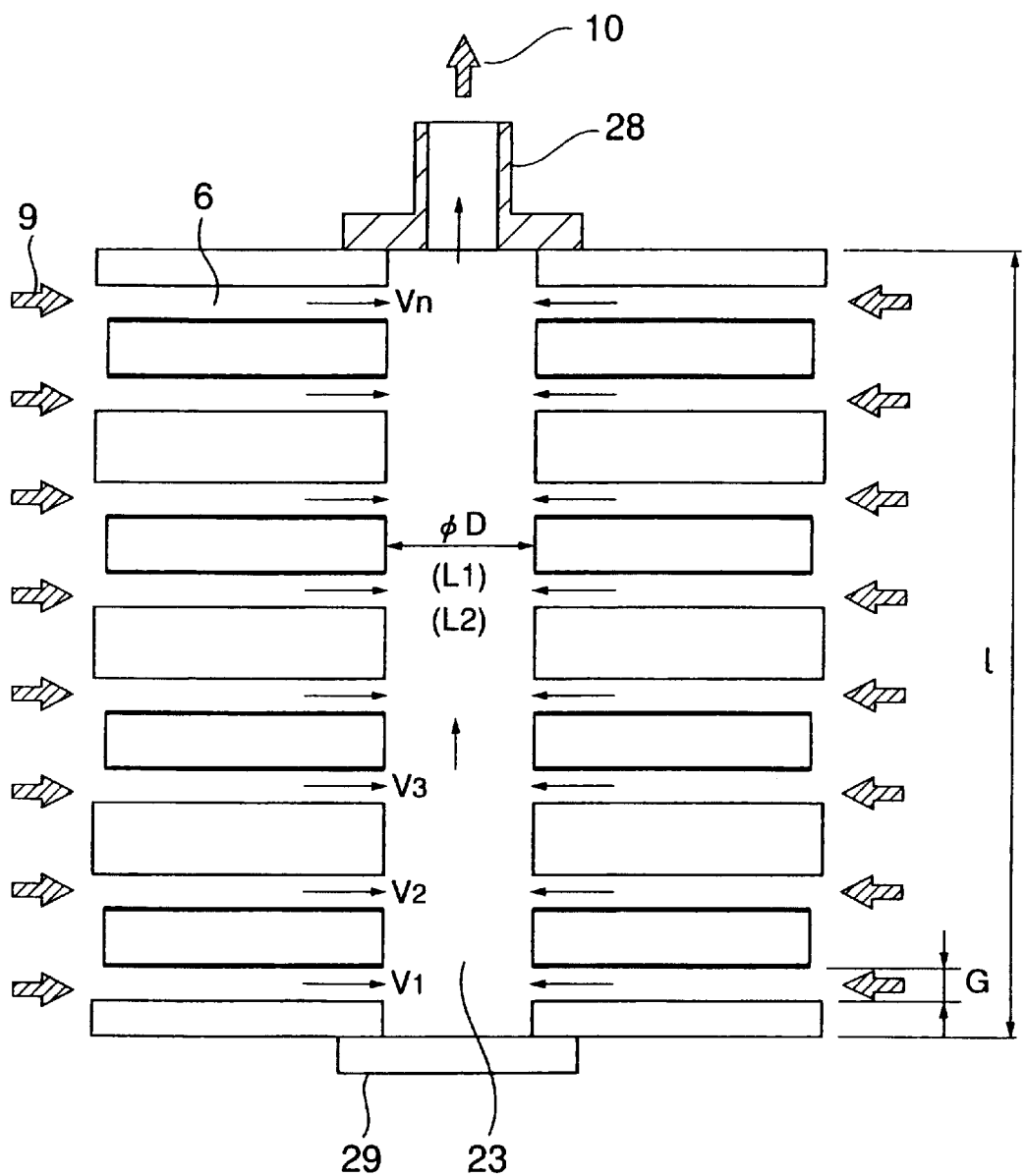
FIG. 9 is a typical sectional view of the ozone generator shown in FIG. 8.

FIG. 9 is a typical sectional view the ozone generator 80. The source gas 9 is supplied into the discharge spaces 6 of the stacked ozonizing units 50 and is exposed to surface discharge therein. Ozone 10 generated in the discharge spaces 6 is discharged into the ozone discharging spaces 23. The ozone 10 flows through the common ozone passage of a length 1 consisting of the continuous arrangement of the ozone discharging spaces 23 and is collected through the ozone outlet 28. The resistance of the common ozone passage causes a pressure loss in the ozone 10 as the ozone 10 flows through the common ozone passage. Therefore, there is a difference between the flow rate of the gas in the discharge space 6 near the ozone outlet 28 and that of the gas in the discharge space 6 near the blind plate 29. Thus, gas flows through the discharge spaces 6 of the ozonizing units 50 at different flow rates.

The relation between the flow rates of the gas in the discharge spaces 6 of the stacked ozonizing units 50 is expressed qualitatively by:

$$V_1 < V_2 < V_3 \ldots < V_n$$

where $V_1$, $V_2$, $V_3$, . . . and $V_n$ are flow rates of the gas in the discharge spaces 6 of the stacked ozonizing units 50. The difference between the flow rate of the gas in the ozonizing unit 50 near the ozone outlet 28 and that of the gas in the ozonizing unit 50 near the blind plate 29 increases as the length 1 increases. The gas flows through the discharge spaces 6 of the stacked ozonizing units 50 at different flow rates, respectively, because the pressures in the ozone discharging spaces 23 of the stacked ozonizing units 50 are different from each other.

The respective sizes of an opening of the discharge space 6 of each ozonizing unit 50 opening into the ozone discharging space 23, and the cylindrical common ozone passage are determined so that ozone discharging space ratio α, namely, the ratio of the sectional area of the cylindrical common ozone passage to the total area of the openings of all the discharge spaces 6, is not smaller than two to make the gas flows through the discharge spaces 6 of the stacked ozonizing units 50 at equal flow rates. For instance, the openings of the discharge spaces 6 and the cylindrical common ozone passage are designed to meet the dimensional relation expressed by expressions shown below when the ozone generated by supplying source gas into the discharge spaces 6 of the integrally stacked ozonizing units 50 and exposing the same to surface discharge in the discharge spaces 6 of the ozonizing units 50 is discharged into the cylindrical common ozone passage.

$$A_1 = n \times \pi \times D \times G \quad (3)$$

$$A_2 = \pi \times (D/2)^2 \quad (4)$$

$$\alpha = (A_2/A_1) \geq 2 \quad (5)$$

where n is the number of the discharge spaces 6, G is the width of the discharge spaces, D is the diameter of the cylindrical common ozone passage, A1 is the total area of openings of the discharge spaces 6 opening into the cylindrical common ozone passage, A2 is the sectional area of the cylindrical common ozone passage and α is the ozone discharging space ratio.

When the common ozone passage has the shape of a quadrangular prism, the foregoing dimensional relation expressed by Expressions (3), (4) and (5) is expressed by:

$$A_1 = n \times \pi \times L_1 \times L_2 \times G \quad (6)$$

$$A_2 = L_1 \times L_2 \quad (7)$$

$$\alpha = (A_2/A_1) \geq 2 \quad (8)$$

where $L_1$ and L2 are the width and length, respectively, of a section of the common ozone passage. The value of $\alpha \geq 2$ is determined experimentally or empirically.;

The ozone generator 80 of a large ozone generating capacity can easily be constructed in a compact construction by stacking the necessary number of the ozonizing units 50, and the common ozone passage can be formed by the successive arrangement of the ozone discharging spaces 23 of the stacked ozonizing units 50. Therefore, the ozone 10 can easily be collected, the component parts of the ozone generator 80 can be simplified. The ozonizing units 50 can be standardized and the standardized ozonizing units 50 enhance the cost-effectiveness of the ozone generator 80.

Since the O ring 27 is interposed between the adjacent ozonizing units 50, the source gas 9 and the ozone 10 never leak from the discharge spaces 6 and the ozone discharging spaces 23, and hence the ozone 10 can efficiently be collected. The size or the number of the stud bolts 25, and the size and hardness of the O rings 27 are determined selectively and properly.

The pressure loss in the ozone 10 in the common ozone passage can be reduced and the pressure difference between the discharge space 6 of each ozonizing unit 50 and the common ozone passage can be suppressed to the least extent by forming the opening of the discharge space 6 and the ozone discharge space 23 of each ozonizing unit 50 in dimensions meeting the condition: $\alpha \geq 2$. Accordingly, the gas flows through the discharge spaces 6 of the stacked ozonizing units 50 at substantially equal flow rates.

Embodiment 1-5

Figure 10:
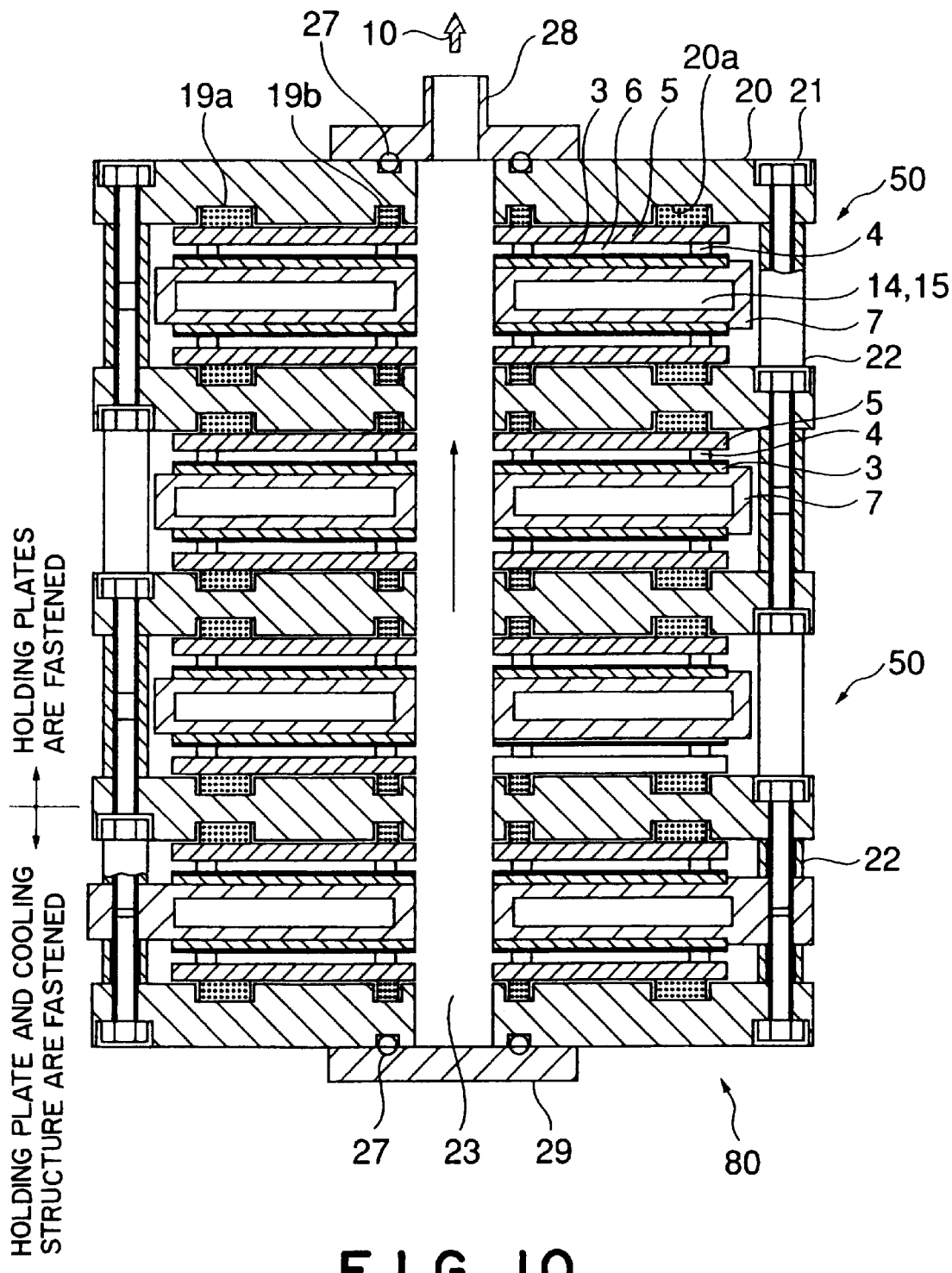
FIG. 10 is a sectional view of an ozone generator in embodiment 1-5 according to the present invention.

A surface discharge ozone generator 80 in embodiment 1-5 will be described with reference to FIG. 10. As shown in FIG. 10, the ozone generator 80 is constructed by stacking a plurality of ozonizing units 50 similar to one of those shown in FIGS. 1 to 7. Each ozonizing unit 50 comprises a cooling structure 7, a pair of electrode plates 3 placed on the opposite surfaces of the cooling structure 7, respectively, gas guides disposed opposite to the electrode plates 3, respectively, and spacers disposed between the electrode plates 3 and the corresponding gas guides 5, respectively to form discharge spaces 6.

As shown in FIG. 10, holding plates 20 are disposed through elastic members 19a and 19b on the outer surfaces of the gas guides 5 of each ozonizing unit 50, respectively. One of the holding plates 20 of each ozonizing unit 50 serves as one of the holding plates 20 of the adjacent ozonizing unit 50.

The elastic members 19a and 19b are fitted in grooves 20a formed in the opposite surfaces of each holding plate 20. The holding plates 20 of the stacked ozonizing units 50, or the holding plate 20 and the cooling structures 7 of the stacked ozonizing unit 50 are fastened together by a plurality of stud bolts 21.

Since the holding plates 20 can jointly be used by the adjacent ones of the stacked ozonizing units 50, so that the number of component parts is reduced and man-hour for assembling the ozone generator 80 can be saved.

Embodiment 1-6

Figure 11:
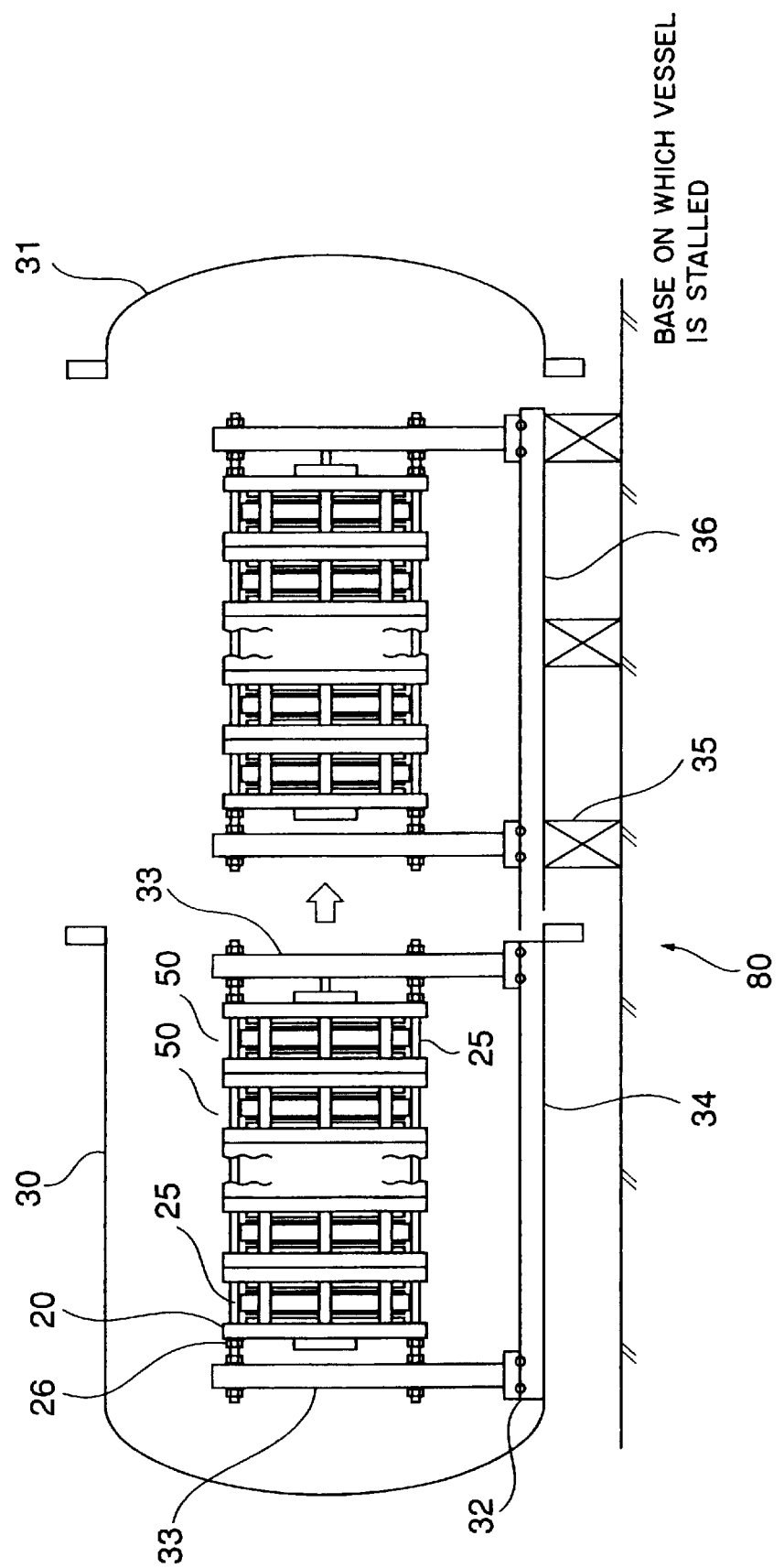
FIG. 11 is a front elevation of an ozone generator in embodiment 1-6 contained in a pressure vessel.

A surface discharge ozone generator 80 in embodiment 1-6 will be described with reference to FIG. 11. As shown in FIG. 11, the ozone generator 80 is constructed by stacking a plurality of ozonizing units 50 similar to one of those shown in FIGS. 1 to 7. Posts 33 are connected to the opposite ends of stud bolts 25 fastening together the stacked ozonizing units 50 or holding plates 20 at the opposite ends of the ozone generator 80, and carriages 32 are joined to the lower ends of the posts 33, respectively. The ozone generator 80 thus supported on the posts 33 is contained in a pressure vessel 30. Guide rails 34 are laid on the bottom of the pressure vessel 30. The carriages 32 slides along the guide rails 34. A lid 31 closing the pressure vessel 30 is opened and the ozone generator 80 is moved along the guide rails 34 to take the same out of the pressure vessel 30.

Each carriage 32 is a rolling carriage comprising a base and bearings or a sliding carriage comprising a base and sliding members made of a low-frictional material such as a fluorocarbon resin.

Guide rails 36 are laid along the extensions of the guide rails 34 on a frame 35 installed on the base on which the pressure vessel 30 is installed. The frame 35 supporting the guide rails 36 is removed when the ozone generator 80 is operated. The frame 35 is located at the position shown in FIG. 11 when taking the ozone generator 80 out of the pressure vessel 30 and inserting the same into the latter. The ozone generator 80 constructed by stacking the ozonizing units 50 can smoothly and easily be moved into and out of the pressure vessel 30, which reduces time necessary for assembling or maintenance.

Embodiment 1-7

A surface discharge ozonizing unit 50 in embodiment 1-7 will be described hereinafter with reference to FIGS. 12 and 13, in which parts like or corresponding to those of embodiment 1-1 shown in FIGS. 1 and 2 are designated by the same reference characters and the description thereof will be omitted.

Figure 12:
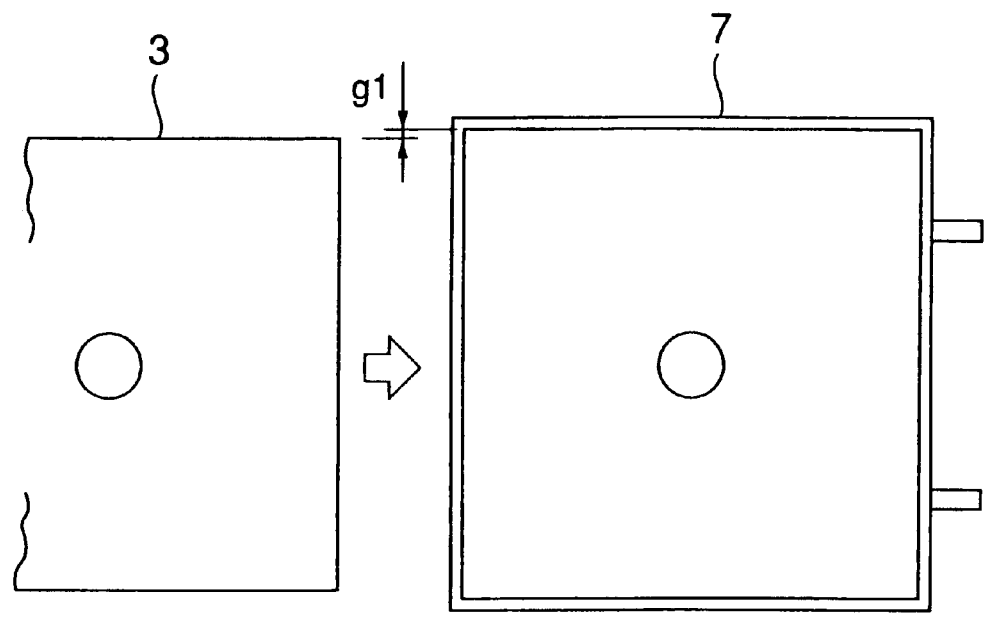
FIG. 12 is a plan view of a cooling structure included in embodiment 1-7 according to the present invention.
Figure 13:
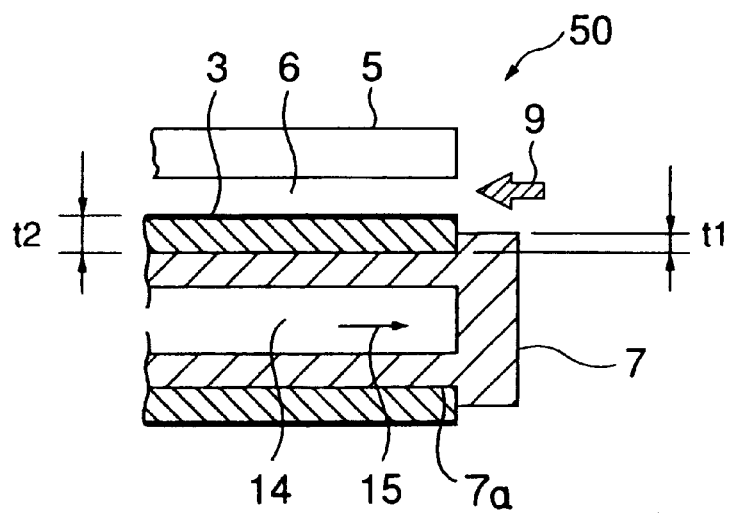
FIG. 13 is an enlarged, fragmentary sectional view of the cooling structure shown in FIG. 12.

Referring to FIGS. 12 and 13, an electrode plate 3 has a dielectric substrate 2, and a surface discharge electrode set 1 on formed on one surface of the dielectric substrate 2. The electrode plate 3 is with, on the opposite side of the surface discharge electrode set 1, in contact with a cooling structure 7. A recess 7a precisely fitting the electrode plate 3 is formed in a surface of the cooling structure 7 with which the dielectric substrate 2 is in contact to facilitate work for combining the electrode plate 3 and the cooling structure 7.

The surface of the recess 7a of the cooling structure 7 is finished in a flatness of 50 $\mu$m or below and in a surface roughness of 0.8 a or below in order that entire surface of the electrode plate 3 may be in uniform, close contact with the surface of the cooling structure 7.

The depth t1 of the surface of the recess 7a from the surface of the cooling structure 7, namely, the depth t1 of the recess 7a of the cooling structure 7, is in the range of ½ to ⅔ of the thickness to the electrode plate 3. When the electrode plate 3 is fitted in the recess 7a of the cooling structure 7, part of the electrode plate 3 on the side of the surface discharge electrode set 1 protrudes from the surface of the cooling structure 7 to secure a space through which a source gas 9 is supplied.

The dielectric substrate 2 of the electrode plate 3, and the cooling structure 7 formed of a metal have different coefficients of thermal expansion, respectively. Therefore, the electrode plate 3 and the cooling structure 7 are designed so that the gap g1 between the electrode plate 3 and the side wall of the recess 71 of the cooling structure 7 is in the range of 10 $\mu$m to 200 $\mu$m to secure a clearance between the electrode plate 3 and the side wall of the recess 7a permitting the expansion of the electrode plate 3 relative to the cooling structure 7 due to rise in its temperature caused by surface discharge.

The gap $g_1$ is determined on the basis of the respective thermal properties and shapes of the dielectric substrate 2 and the cooling structure 7, and data obtained through experiments taking into consideration temperature rise due to surface discharge and the shape of the electrode plate 3.

FIG. 14 is a plan view of the cooling structure 7 and FIGS. 15(*a*) and 15(*b*) are sectional views taken in FIG. 14.

The cooling structure 7 is formed of a metal, such as a stainless steel or aluminum. Since the cooling structure 7 is combined with the electrode plate 3, the cooling structure 7 is formed in a rectangular or circular flat shape. The cooling structure 7 is internally provided with a cooling chamber 14 to cool the electrode plate 3 by absorbing heat generated by surface discharge produced on the electrode plate 3. The cooling structure 7 is provided with a cooling water inlet port 16 through which cooling water is supplied into the cooling water chamber 14 and a cooling water outlet port 17 through which cooling water is discharged from the cooling water chamber 14.

The cooling structure 7 has a body part 37 provided with the cooling water chamber 14 formed by machining, and a cover 38 attached to the body part 37. The cover 38 may be welded to the body part 37 or may be fastened to the body part 37 with bolts. The fastening structure is determined taking into consideration techniques required by fabricating work or costs.

Reinforcing plates 39 and 40 are attached alternately to the inner surface of the body part 37 and that of the cover 38 so as to define a zigzag passage between the cooling water inlet port 16 and the cooling water outlet port 17. For example, the reinforcing plates 39 are attached to the cover 38, and the reinforcing plates 40 are attached to the body part 37. Cooling water flows through the zigzag passage in the cooling water chamber 14.

Since the recess 7a conforming to the shape of the electrode plate 3 is formed in the surface of the cooling structure 7 and the recess 7a is finished in an optimum surface accuracy and optimum dimensions, the electrode plate 3 and the cooling structure 7 can precisely be combined and the electrode plate 3 can effectively be cooled.

Since the cooling structure 7 has the body part 37 and the cover 38, the cooling chamber 14 can easily be defined.

Since the reinforcing plates 39 and 40 are disposed alternately in the cooling water chamber 14, the rigidity of the cooling structure 7 is enhanced to withstand the pressure of the cooling water 15 that flows through the cooling water chamber 14. The reinforcing plates 39 and 40 define the zigzag passage to make the cooling water 15 flow effectively through the entire region of the cooling water chamber 14, so that heat generated by surface discharge produced by the electrode plate 3 can effectively be dissipated.

Embodiment 1-8

Embodiment 1-8 according to the present invention will be described hereinafter.

Figure 16:
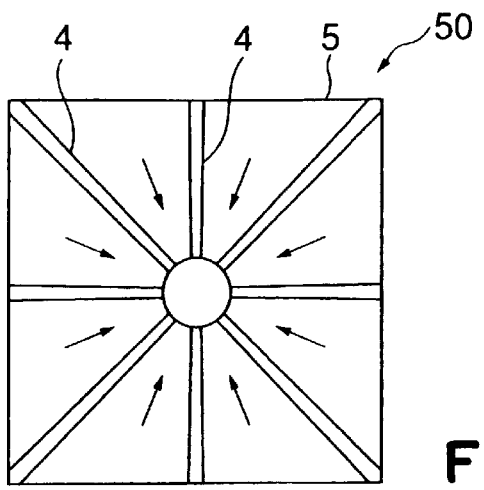
FIG. 16 is a plan view of spacers included in embodiment 1-8 according to the present invention.
Figure 17:
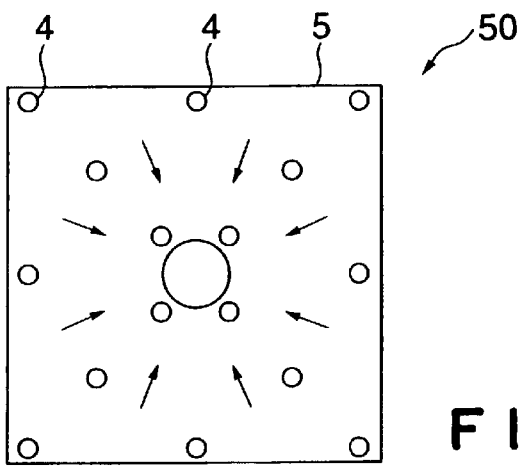
FIG. 17 is a plan view of spacers in a modification.
Figure 18:
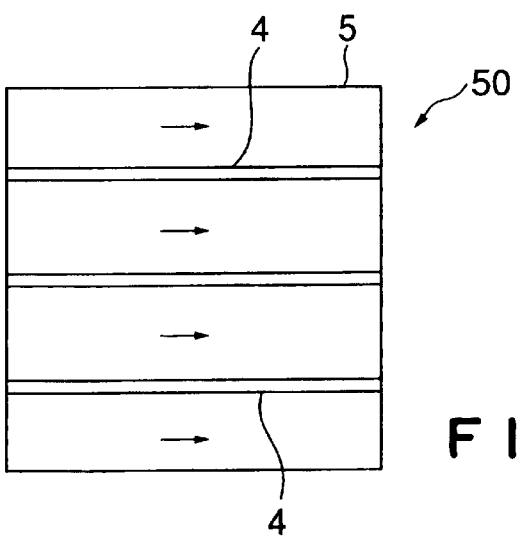
FIG. 18 is a plan view of spacers in a modification.

FIGS. 16 to 18 are plan views showing the shapes and arrangement of spacers 4 for a surface discharge ozonizing unit. Parts of this embodiment like or corresponding to those of the first embodiment shown in FIGS. 1 and 2 are designated by the same reference characters and the description thereof will be omitted.

Referring to FIGS. 16 to 18, spacers 4 interposed between an electrode plate 3 and a gas guide 5 to form a discharge space 6 are made of an ozone-resistant metal or an ozone-resistant or ultraviolet-resistant insulating material, and have a thickness corresponding to the width G of the discharge space 6.

A plurality of spacers 4 are disposed at equal intervals between the electrode plate 3 and the gas guide 6 so as to form the discharge space in a uniform thickness and to secure a maximum surface discharge area on the electrode plate 3.

For instance, as shown in FIG. 16, the spacers 4 has the shape of an elongate flat plate and are arranged at equal angular intervals so as to extend radially from an ozone discharging space 23. As shown in FIG. 17, spacers 4 may be circular flat plates of a small diameter distributed in the discharge space 6 at equal intervals. The spacers 4 may be small rectangular flat plates instead of the circular flat plates shown in FIG. 17.

FIG. 18 shows a construction in which a source gas 9 is supplied from one direction, and ozone 10 is collected from an ozone discharging space 23 formed on a side opposite a side from which the source gas 9 is supplied. In the construction shown in FIG. 18, spacers 4 are elongate flat plates and are arranged at equal intervals in the entire discharge space 6. In FIG. 18, small circular flat plates or small rectangular flat plates may be arranged at equal intervals in the entire discharge space 6.

An optimum value is determined selectively for the width G of the discharge space 6 on the basis of the relation between time necessary for ozone to be diffused and time for which ozone stays in the discharge space 6. In most cases, the width G is 2 mm or below.

In the surface discharge ozone generator, the accuracy of the width G, as compared with that in the silent discharge ozone generator using opposite electrodes, is not very important owing to the characteristic of surface discharge.

Figure 19:
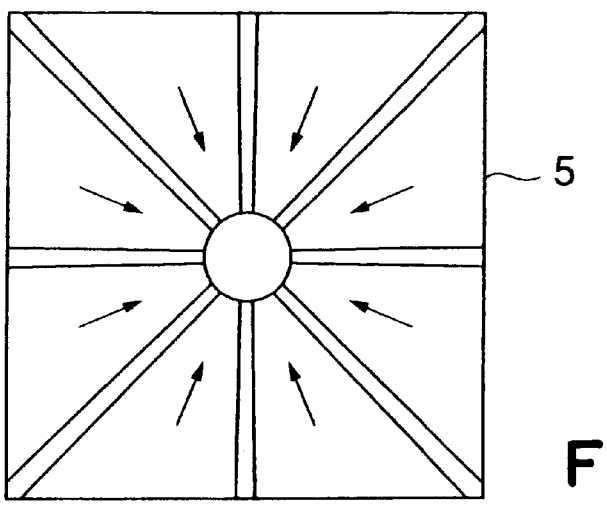
FIG. 19 is a plan view of spacers in a modification.
Figure 20:
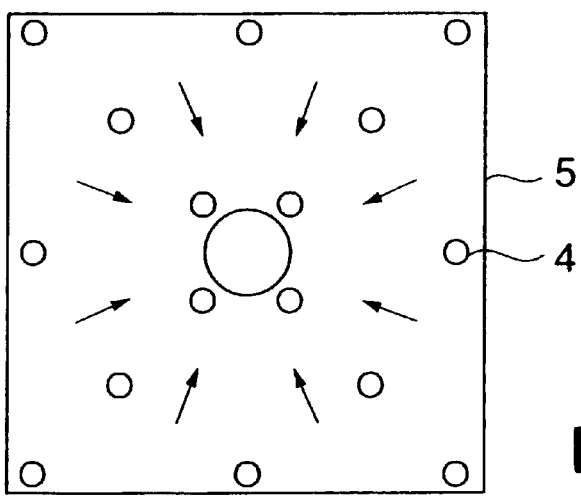
FIG. 20 is a plan view of spacers in a modification.
Figure 21:
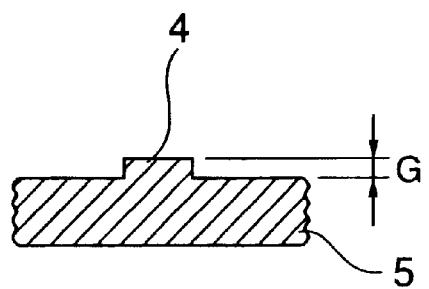
FIG. 21 is an enlarged fragmentary sectional view of spacers.

FIGS. 19 and 20 are plan views showing spacers 4 formed integrally with a gas guide 5, and FIG. 21 is an enlarged sectional view of a part of a gas guide 5 integrally provided with spacers 4.

The spacers 4 are formed integrally with the gas guide by machining a surface of the gas guide made of a dielectric material facing the discharge space 6 to form projections which serve as the spacers 4.

A gas guide 5 integrally provided with spacers 4 in another embodiment may be formed by bonding the spacers 4 of an ozone-resistant metal or an ultraviolet-resistant or ozone-resistant insulating material to a surface of the gas guide 5 made of a dielectric material facing the discharge space 6 by a chemical bonding method, an adhesive bonding method or a mechanical bonding method.

The projections formed in the gas guide 5, and the spacers 4 bonded to the gas guide 5, similarly to those of the foregoing embodiments, are formed in the shape of an elongate flat plate and are arranged at equal angular intervals so as to extend radially from the ozone discharging space 23. The projections of the gas guide 5 may be small circular flat plates arranged at equal intervals in the entire discharge space 6.

In the embodiment according to the present invention, the plurality of spacers 4 are formed by processing a thin sheet of a metal or an insulating material and are arranged at equal intervals so as to form the discharge space 6 in a uniform width G. Thus, a surface discharge surface of a maximum area can be formed in the discharge space 6. Those spacers 4 can readily be manufactured.

In the surface discharge ozone generator, the accuracy of the width G, as compared with that in the silent discharge ozone generator using opposite electrodes, is not very important owing to the characteristic of surface discharge. Therefore, dimension control and error control are easy when manufacturing the ozone generator, man-hour for assembling can be saved and costs can be reduced.

Surface discharge does not affect ozone generating characteristic even if the tolerance of the thickness of the spacers 4 is not controlled severely.

The formation of the spacers 4 integrally with the gas guide 5 by forming the projections on the gas guide 5 or by bonding the spacers 4 to the gas guide 5 further facilitates the formation of the discharge space 6 and simplifies work for assembling the ozone generating unit.

Embodiment 1-9

Embodiment 1-9 will be described hereinafter.

Figure 22:
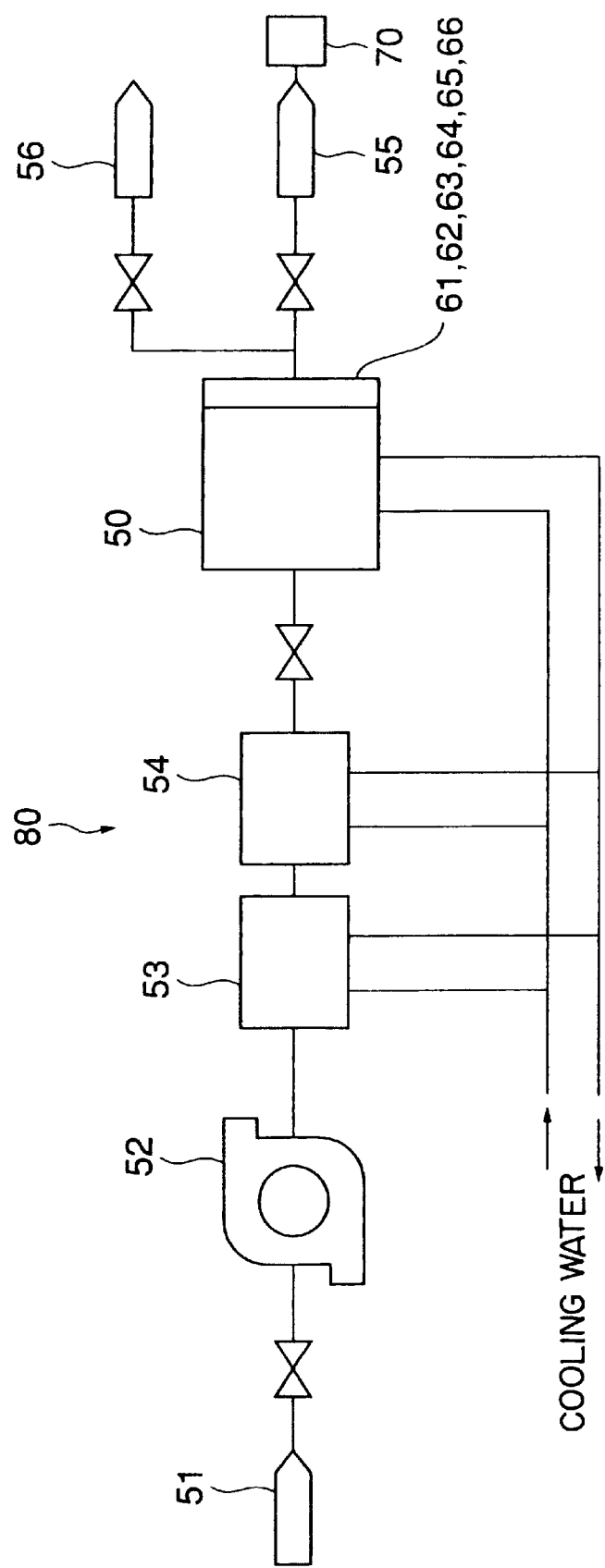
FIG. 22 is a block diagram of an ozone generator in embodiment 1-9 according to the present invention.

Referring to FIG. 22 showing an ozone generator according to the present invention in a block diagram, air, i.e., a source gas, supplied by an air supply header 51 is pressurized and supplied to an air cooling unit 53 by an air blower 52. The air cooling unit 53 cools the air at −5° C. to condense and remove moisture from the air. The cooled air is dried by an adsorbing unit 54 provided with an adsorber to produce dry air having a dew pint of −60° C. The dry air is supplied to the surface discharge ozonizing unit 50 in one of embodiments 1-1 to 1-8.

The high-voltage power source 13 (FIG. 1) supplies electric power of a predetermined magnitude to the surface discharge ozonizing unit 50, and the concentration of generated ozone is regulated. The ozonizing unit 50 generates ozone in a high concentration and supplies the ozone to an ozone header pipe 55. Ozonized air is injected into water or a contaminated gas to decompose contaminants.

The surface discharge ozonizing unit 50 is combined with an ultraviolet irradiation device 61, a hydrogen peroxide producing device 62, a catalytic decomposing device 63, a radiation generating device 64, an ultrasonic generating device 65 and a pH adjusting device 66 to construct an ozone generator 80.

Hydrogen peroxide gas can be produced by the electrolysis of ammonium hydrogen sulfate or by adding dilute sulfuric acid to sodium peroxide or the like. In this embodiment, the hydrogen peroxide producing device 62 produces by processing a hydrogen peroxide solution available on the market. The hydrogen peroxide producing device 62 is combined with the surface discharge ozonizing unit, hydrogen peroxide is mixed with ozone, and a mixture of hydrogen peroxide and ozone is brought into contact with an object to be processed, such as water or a gas.

The ultraviolet irradiation device 61 has a low-pressure mercury lamp or an excimer lamp and emits ultraviolet rays of a wavelength around 200 nm. It is desirable to irradiate a processing object when the processing object is brought into contact with ozone.

The catalytic decomposing device 63 uses a metal oxide of aluminum, titanium, manganese or iron. Titanium is particularly desirable because titanium does not dissolve in water to be processed and is capable of being used as a catalyst for photodegradation reaction.

The radiation generating device 64 is a device that generates X-rays by bombarding a metal target with high-velocity electrons or a Co-60 radiation device. The source gas is ozonized after being irradiated with the radiation.

The ultrasonic generating device 65 generates ultrasonic waves of several kilohertz by a transducer and applies the ultrasonic waves to generated ozone.

Since the ultraviolet irradiation device 61 and the ultrasonic generating device 65 are compact, the ultrasonic irradiation device 61 and the ultrasonic generating device 65 may be incorporated into the surface discharge ozone generator.

The ultraviolet irradiation device 61, the hydrogen peroxide producing device 62, the catalytic decomposing device 63, the radiation generating device 64, the ultrasonic generating device 65 and the pH adjusting device 66 enhance the oxidizing ability of ozone and contribute to the generation of hydroxyl radicals to decompose organic substances into carbon dioxide gas and water.

The ozone generator 80 thus constructed is capable of enhancing ozone-processing ability and is an ozone generator having a high added value.

The ozone generator 80 has an ozone reaction tank 70 in addition to the gas supply device that supplies a source gas containing oxygen and the adsorbing device 54 that adsorbs the component gases of the source gas excluding oxygen.

The generated ozone is brought into contact with at least either water or a gas in the ozone reaction tank 70. The source gas may be either oxygen gas or air. When the source gas needs to be pressurized, the blower 52 or an air compressor, not shown is employed. When the source gas need not be pressurized, a fan may be employed.

The adsorbing device 54 adsorbs moisture contained in the source gas to provide a dry source gas. When oxygen gas is used as the source gas, nitrogen and impurity gases are removed by adjusting pressure and only oxygen is supplied. The cooling device 53 promotes the moisture adsorbing performance of the adsorbing device 54.

The ozone reaction tank 70 that brings ozone with a gas or a liquid is a mixing diffuser ejector. The ozone reaction tank 70 is capable of not only processing water for deodorization, decoloration and sterilization, but also of processing gases for deodorization, NOx/SOx elimination and dioxin elimination.

The ozone generator in this embodiment is capable of removing impurities from the source gas, of treating water or a gas with ozone, is small in construction and has a high added value.

Embodiment 1-10

Embodiment 1-10 according to the present invention will be described hereinafter.

Figure 23:
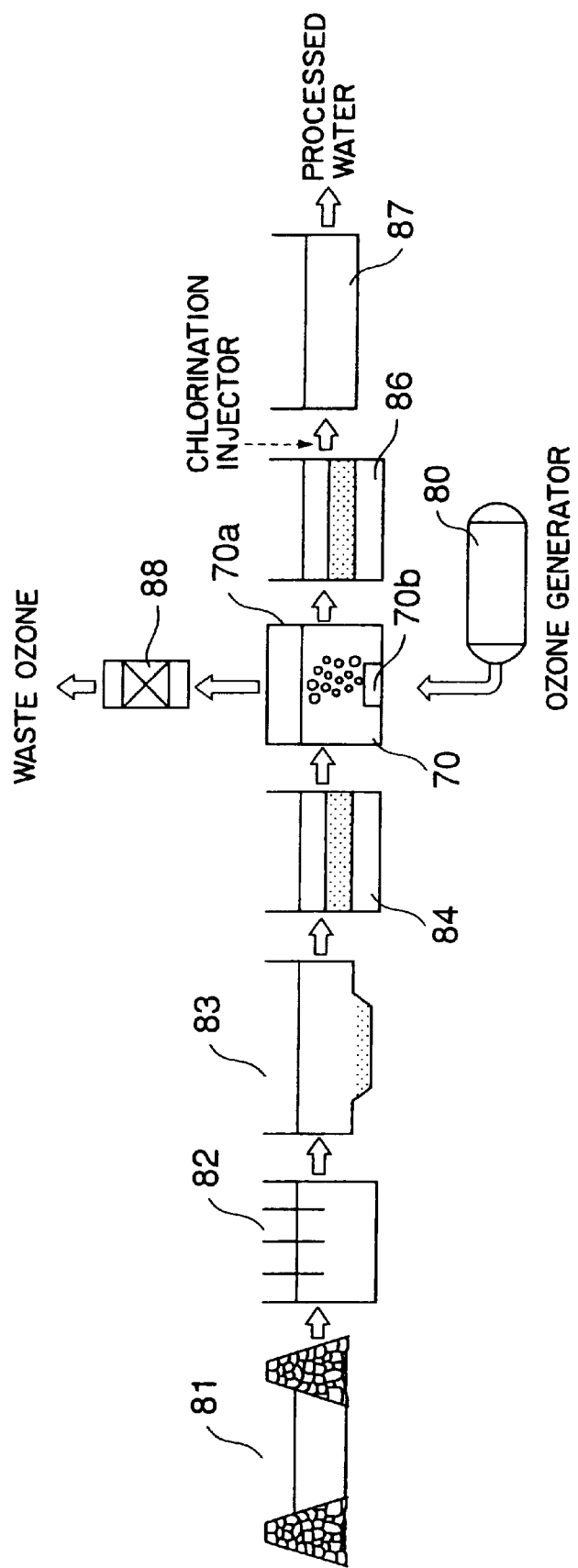
FIG. 23 is a pictorial view of an advanced service water processing system including an ozone generator in embodiment 1-10 according to the present invention.
Figure 24:
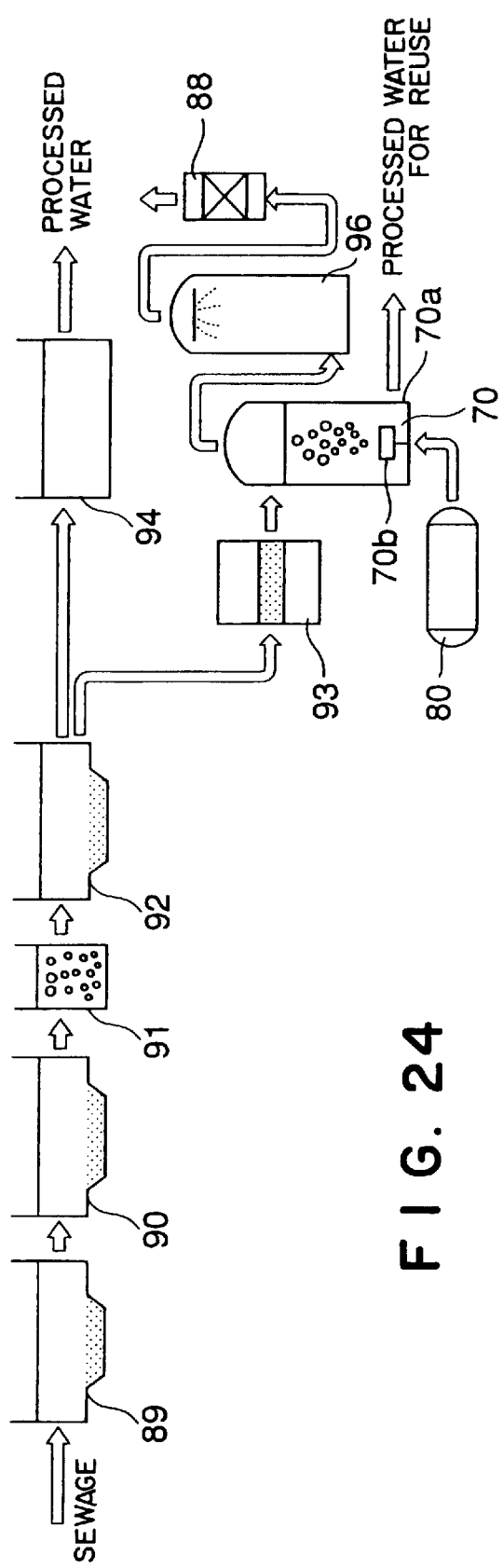
FIG. 24 is a pictorial view of an advanced sewage processing system including an ozone generator.

FIG. 23 shows an ozone-processing system, i.e., an advanced service water processing system, employing the ozone generator of the present invention, and FIG. 24 shows an ozone-processing system, i.e., an advanced sewage processing system, employing the ozone generator of the present invention.

Referring to FIG. 23, river water 81 is processed successively in a mixing basin 82, a sedimentation basin 83, a sand filtration basin 84, an ozone reaction tank (contact device) 70, an activated charcoal filtration tank 86, chlorination injector and a distributing reservoir 87. The ozone generator 80 shown in FIG. 22 is connected to the ozone reaction tank 70. Waste ozone discharged from the ozone reaction tank 70 is discharged through a waste ozone decomposing tower 88.

Referring to FIG. 24, sewage is treated successively in a sand basin 89, an initial sedimentation basin 90, a deaerator tank 91, a final sedimentation basin 92 and a chlorination tank 94. Part of the processed water delivered from the final sedimentation basin 92 is treated in a sand filtration tank 93 and an ozone reaction tank 70 and the thus processed water is reused. The ozone generator 80 shown in FIG. 22 is connected to the ozone reaction tank 70. Waste ozone discharged from the ozone reaction tank 70 is discharged through a defoaming tower 96 and a waste ozone decomposing tower 88.

Thus, the ozone-processing system includes the ozone generator shown in FIG. 22.

In FIGS. 23 and 24, the activated charcoal filtration tank 86 removes organic substances by adsorption, and the sand filtration tank 93 separates solid matters from water. The system shown in FIG. 23 may be provided with a membrane filtration device in addition to the activated carbon filtration tank 86, and the system shown in FIG. 24 may be provided with a membrane filtration device in addition to the sand filtration tank 93. The membrane filtration device separates fine particles or dissolved organic matters from water.

The ozone reaction tank 70 has a contact basin 70a and diffusing pipes 70b uniformly arranged in the contact basin 70a. Ozone injected into water contained in the contact basin 70a dissolves in the water. Part of the ozone may be subjected to a membrane treatment to deal with microorganisms.

The waste ozone not reacted for ozone-processing is delivered to the waste ozone decomposing tower 88 packed with activated charcoal and a catalyst. The ozone is adsorbed by the activated charcoal and is decomposed by the agency of the catalyst. The waste ozone may be decomposed by heat, may be returned to the ozone reaction tank 70 to reuse the same or may be brought into contact with contaminated water or a polluted gas.

Ozone may be supplied to processed water processed by a purifying system including the activated charcoal filtration tank 86, the sand filtration tank 93 and the membrane filtration tank or water processed by ozone may be supplied to the purifying system. Ozone may be supplied not only to water to be processed but also a gas to be processed.

The system in this embodiment is capable of efficiently and simply removing impurities to improve the odor and color of water remarkably. The ozone-processing system is safe, efficient and capable of advanced eater or gas purification.

Embodiment 1-11

Embodiment 1-11 will be described with reference to FIGS. 25 and 26, in which parts like or corresponding to those of the embodiment 1-1 shown in FIGS. 1 and 2 are designated by the same reference characters and the description thereof will be omitted.

Referring to FIGS. 25 and 26, a surface discharge ozonizing unit 50 comprises at least two electrode plates 3 each having a dielectric substrate 2 and a pair of linear electrodes 1*a* and 1*b*, spacers 4 and a gas guide 5. The electrode plates 3, the spacers 4 and the gas guide 5 are held through elastic members 19*a* and 19*b* by a holding plate 20.

The electrode plates 3 are held in contact with a surface of a cooling structure 7 to constitute an ozonizing unit 50. The size and the number of the electrode plates 3 are selectively determined taking into consideration the size of the ozonizing unit 50, the number of the ozonizing units to be stacked, layout and the overall size of an ozone generator.

For instance, if the ozone generating capacity of one electrode plate 3 is 50 g/h and four electrode plates 3 are held on one cooling structure 7 to construct one ozonizing unit 50, the ozone generating capacity of the ozonizing unit 50 is 200 g/h=50 g/h×4.

A cylindrical ozone discharging space 23 is formed in a central part of the assembly of the plurality of electrode plate 3, the cooling structure 7, the gas guide 5 and the holding plate 20. The electrode plates 3 and the gas guide 5 are spaced a width G corresponding to the thickness of the spacers 4 apart from each other to supply a source gas 9 through all the sides of the ozonizing unit 50. A discharge space of a width equal to the width G is secured by the spacers 4.

The source gas 9 supplied through all the sides of the ozonizing unit 50 is exposed to surface discharge while the same flows through the discharge space 6 and ozone 10 is generated. The ozone 10 is discharged into and collected from the central ozone discharging space 23.

The sectional area and the diameter D of the ozone discharging space 23 is determined so that, when a plurality of ozonizing units similar to the ozonizing unit 50 are stacked, the source gas 9 and the ozone 10 flow at substantially equal velocities through the discharge spaces 6 of the plurality of stacked ozonizing units.

At least one of the elastic members 19*a* and 19*b* held between the gas guide 5 and the holding plate 20 in the vicinity of the ozone discharging space 23 is made of an ozone-resistant rubber to provide the same with a sealing capability to prevent the leakage of the ozone 10.

In this embodiment, the plurality of electrode plates 3 are arranged on the single cooling structure 7. Therefore, the ozonizing unit 50 uses an available space effectively and can be constructed in a large ozone generating capacity and in a compact construction. The source gas 9 is supplied through all the sides of the ozonizing unit 50 and the ozone is discharged into the ozone discharging space 23 formed in a central part of the ozonizing unit 50. Accordingly, any parts for forming a passage through which the source gas 9 is supplied are not necessary, and an ozone discharging and collecting structure is simplified and can easily be constructed.

Embodiment 1-12

Embodiment 1-12 according to the present invention will be described with reference to FIGS. 27, 28(*a*) and 28(*b*), in which parts like or corresponding to those of the embodiment 1-1 shown in FIGS. 1 and 2 are designated by the same reference characters and the description thereof will be omitted.

Figure 28:
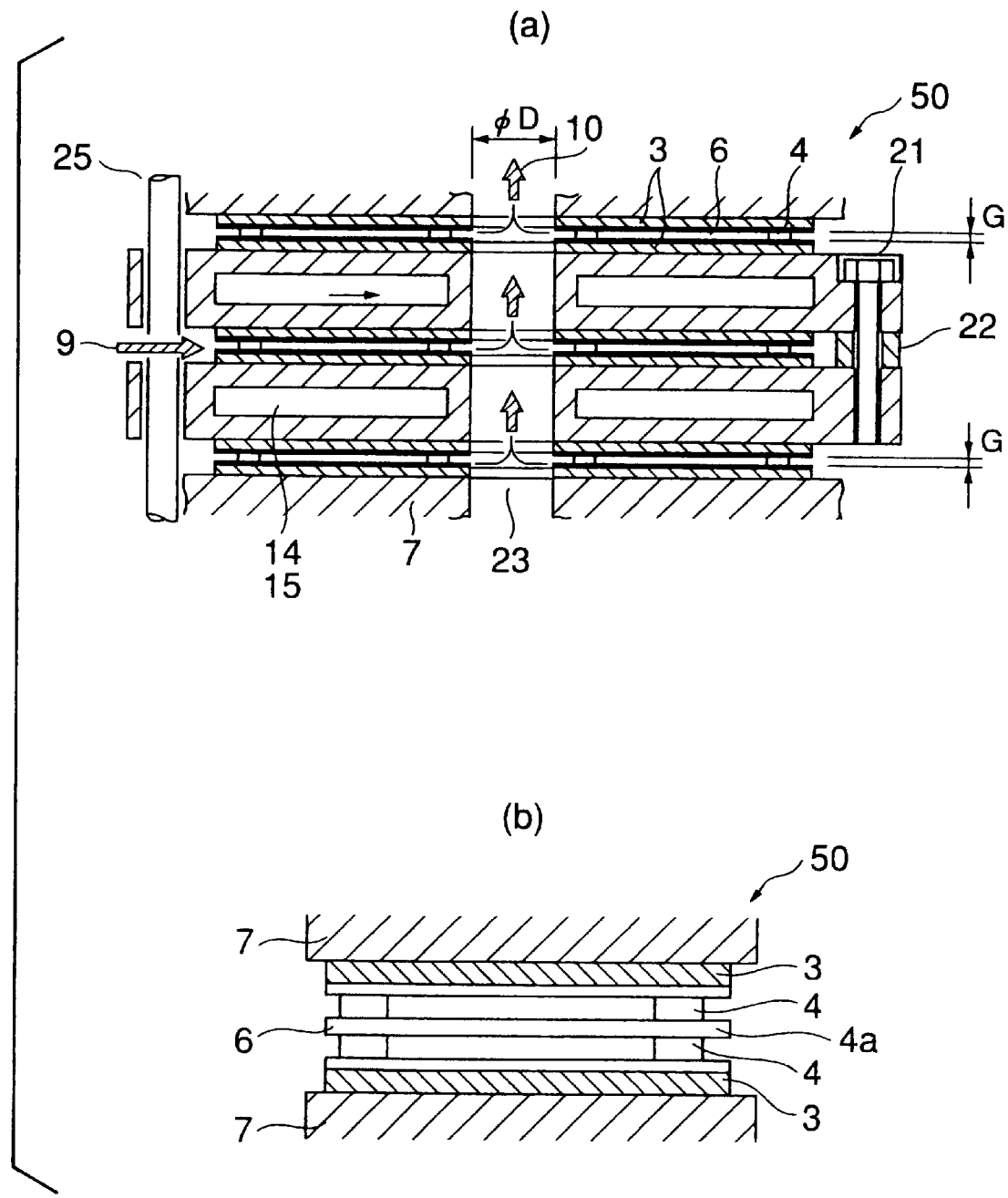
FIG. 28 is a sectional view of the ozonizing unit in embodiment 1-12.

Referring to FIGS. 27 and 28(*a*), each of electrode plates 3 has a dielectric substrate 2, and a surface discharge electrode set 1 having a pair of linear electrodes 1*a* and 1*b* formed at predetermined intervals by screen printing or the like on one of the surfaces of a dielectric substrate 2. The electrode plates 3 are placed on surfaces of at least one pair of cooling structures 7 facing each other with the other surfaces of the dielectric substrate 2 not provided with the surface discharge electrode set 1 in contact with the surfaces of the cooling structure 7, respectively, to form an ozonizing unit 50.

The pair of linear electrodes 1*a* and 1*b* formed on the dielectric substrate 2 are covered entirely with a dielectric layer 18. Terminals 8*a* and 8*b* are formed at ends of the linear electrodes 1*a* and 1*b*, respectively. The terminals 8*a* and 8*b* are not covered with the dielectric layer 18.

Spacers 4 are interposed between the surfaces of the dielectric substrates 2 provided with the surface discharge electrode sets 1 and placed on the surfaces of the adjacent cooling structure 7 facing each other, respectively, to form a discharge space 6. The electrode plates 3 are placed on the opposite surfaces of each of the cooling structures 7. The electrode plates 3, the spacers 4 and the cooling structures 7 are fastened together by a plurality of stud bolts 21 extended through portions of the cooling structures 7 outside the perimeters of the electrode plates 3 and through bolt guides 22 disposed between the cooling structures 7 to construct an ozonizing unit 50. A plurality of ozonizing units similar to the ozonizing unit 50 are stacked to construct an ozone generator having a large ozone generating capacity.

The width G of the discharge space 6 is defined by the spacers 4. The width G of the discharge space 6 is in the range of abut 0.5 to abut 2.0 mm to ensure the stable discharge characteristic of the surface discharge electrode sets 1 formed between the adjacent cooling structures 7.

A cylindrical ozone discharging space 23 is formed in central parts of the electrode plates 3 and the cooling structure 7. Spacers 4 are interposed between the adjacent electrode plates 3 so as to space peripheral parts of the adjacent electrode plates 3 apart by a width G corresponding to the thickness of the spacers 4 to supply a source gas 9 through all sides of the ozonizing unit 50.

The source gas supplied through all sides of the ozonizing unit 50 into the discharge spaces 6 is exposed to surface discharge as the source gas 9 flows through the discharge spaces 6 to generate ozone 10. The ozone 10 is discharged into the ozone discharging space 23 formed in a central part of the ozonizing unit 50 and is collected from the ozone discharging space 23.

The sectional area and the diameter D of the ozone discharging space 23 is determined so that, when a plurality of ozonizing units similar to the ozonizing unit 50 are stacked, the source gas 9 and the ozone 10 flow at substantially equal velocities through the discharge spaces 6 of the plurality of stacked ozonizing units.

Although it is preferable that the ozone discharging space 23 has the shape of a circular cylinder in view of facility in machining, the same may be formed in the shape of a quadrangular prism.

In the ozonizing unit 50 in this embodiment, the electrode plates 3 can easily be held, the discharge spaces 6 are formed without using any gas guides, and the electrode plates 3 can be held without using any holding parts, such as holding plates. Thus the ozonizing unit 50 uses an available space effectively. Accordingly, the ozonizing unit 50 having a large ozone generating capacity can easily be constructed in a compact construction at low costs.

The source gas 9 is supplied through all sides of the ozonizing unit 50 and the ozone 10 is collected from the ozone discharging space 23 formed in the central part of the ozonizing unit 50. Therefore, any parts for forming a source gas supply passage are not necessary and an ozone discharging and collecting structure is simplified and can easily be constructed.

A glass plate 4a may be interposed between the electrode plates 3 placed on the respective surfaces of the adjacent cooling structure 7 facing each other, and spacers 4 may be interposed between the electrode plates 3 and the glass plate 4a as shown in FIG. 28(b).

Embodiment 1-13

Embodiment 1-13 according to the present invention will be described with reference to FIGS. 29 and 30, in which parts like or corresponding to those of embodiment 1-1 shown in FIGS. 1 and 2 are designated by the same reference characters and the description thereof will be omitted.

Figure 29:
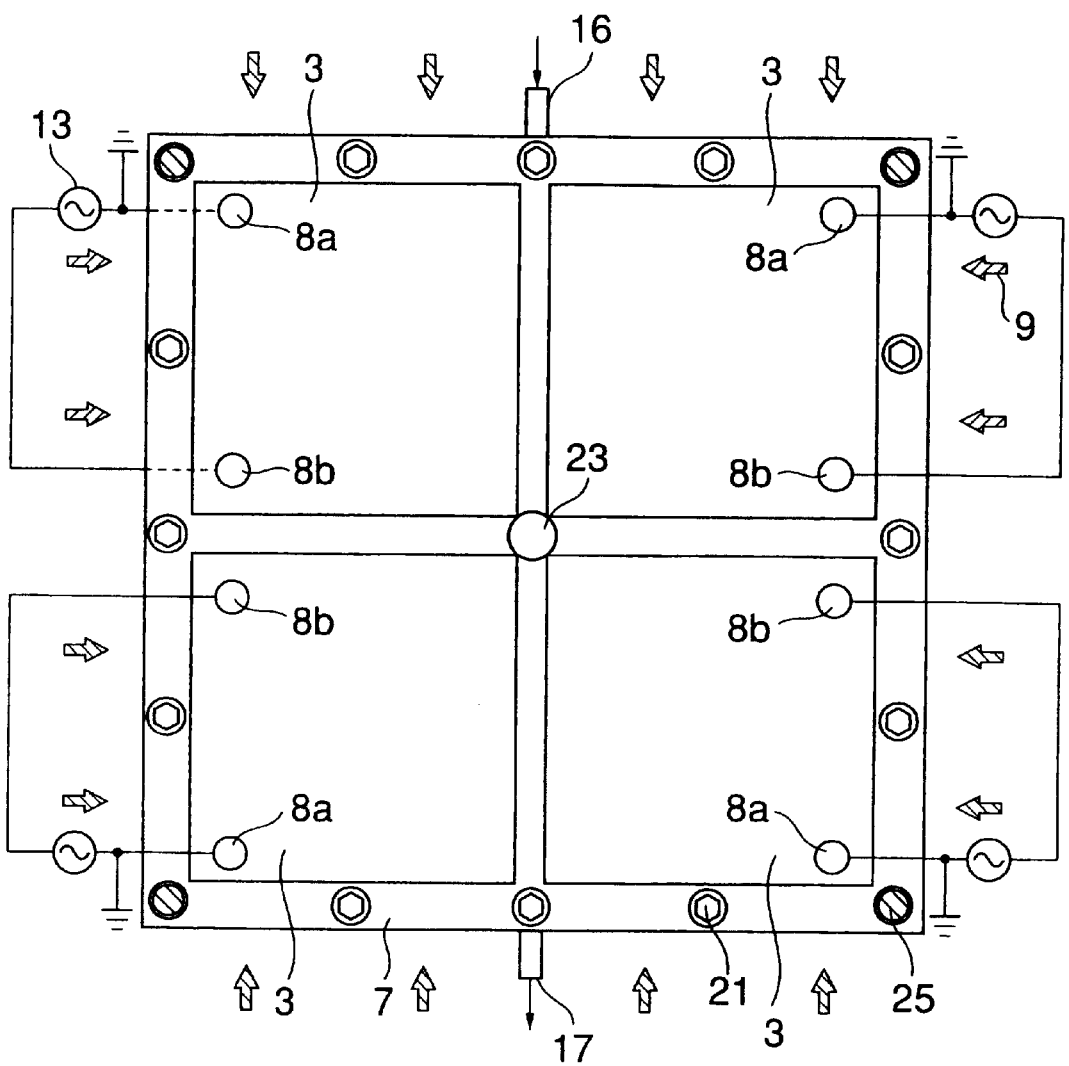
FIG. 29 is a plan view of an ozonizing unit in embodiment 1-13 according to the present invention.
Figure 30:
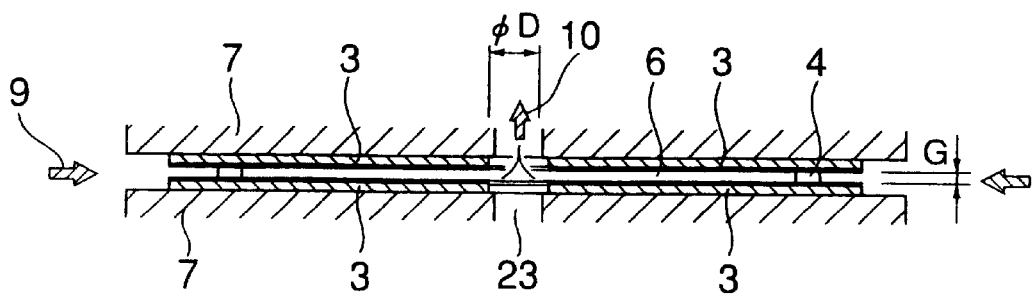
FIG. 30 is a sectional view of the ozonizing unit in embodiment 1-13.

Referring to FIGS. 29 and 30, an ozonizing unit 50 comprises, as essential components, a pair of cooling structures 7 and electrode plates 3 each having a surface discharge electrode set 1 and placed in contact with the cooling structures 7. The electrode plates 3 are placed on the surfaces of the cooling structures 7 with their surface discharge electrode sets 1 facing each other, and spacers are interposed between the same electrode plates 3 to form a discharge space 6 between the electrode plates 3.

At least two electrode plates 3 is held in contact with one of the surfaces of each cooling structure 7 to form the ozonizing unit 50. The size and the number of the electrode plates 3 are selectively determined taking into consideration the size of the ozonizing unit 50, the number of ozonizing units to be stacked, layout and the overall size of the ozonizing unit 50.

For instance, if the ozone generating capacity of each electrode plate 3 is 50 g/h and the four electrode plates 3 are held on each cooling structure 7, the ozone generating capacity of one ozonizing unit is 200 g/h=50 g/h×4. Thus, an ozonizing unit having a large ozone generating capacity can easily be constructed.

A cylindrical ozone discharging space 23 is formed in central parts of the electrode plates 3 and the cooling structures 7. Spacers 4 are interposed between the adjacent electrode plates 3 so as to space peripheral parts of the adjacent electrode plates 3 apart by a width G corresponding to the thickness of the spacers 4 to supply a source gas 9 through all sides of the ozonizing unit 50.

The source gas supplied through all sides of the ozonizing unit 50 into the discharge spaces 6 is exposed to surface discharge as the source gas 9 flows through the discharge spaces 6 to generate ozone 10. The ozone 10 is discharged into the ozone discharging space 23 formed in a central part of the ozonizing unit 50 and is collected from the ozone discharging space 23.

The sectional area and the diameter D of the ozone discharging space 23 is determined so that, when a plurality of ozonizing units similar to the ozonizing unit 50 are stacked, the source gas 9 and the ozone 10 flow at substantially equal velocities through the discharge spaces 6 of the plurality of stacked ozonizing units.

Although it is preferable that the ozone discharging space 23 has the shape of a circular cylinder in view of facility in machining, the same may be formed in the shape of a quadrangular prism.

Since the plurality of electrode plates 3 are placed on each cooling structure 7 in the ozonizing unit 50 in this embodiment, an available space can effectively be used. Accordingly, the ozonizing unit 50 having a large ozone generating capacity can easily be constructed in a compact construction. Structures for supplying the source gas and for discharging and collecting the ozone can be simplified and can easily be constructed.

Since the two discharge spaces of the same construction are formed on the opposite sides of the cooling structure, the ozonizing unit can be constructed in an efficient, compact construction.

An ozone generator having a large ozone generating capacity can be constructed by stacking the plurality of standard ozonizing units consisting of the same standard parts. The carriages supporting the ozonizing units facilitate work for placing the stacked ozonizing units in and taking the same out of the pressure vessel, and reduces time necessary for assembling and maintenance.

The cooling structure, the spacers or the gas guide makes efficient cooling possible, simplifies construction, facilitates work for assembling and management, reduces the number of component parts and assembling man-hours.

The surface ozonizing unit can be used in combination with peripheral devices including an ultraviolet irradiation device, a gas supply device and an adsorbing device to constitute an ozone generator having a high added value. The ozone generator can be applied to the advanced purification of service water, sewage or gases.

Second Embodiment

A second embodiment of the present invention will be described hereinafter. FIGS. 34 to 37 show ozonizing units embodying the present invention.

Figure 35:
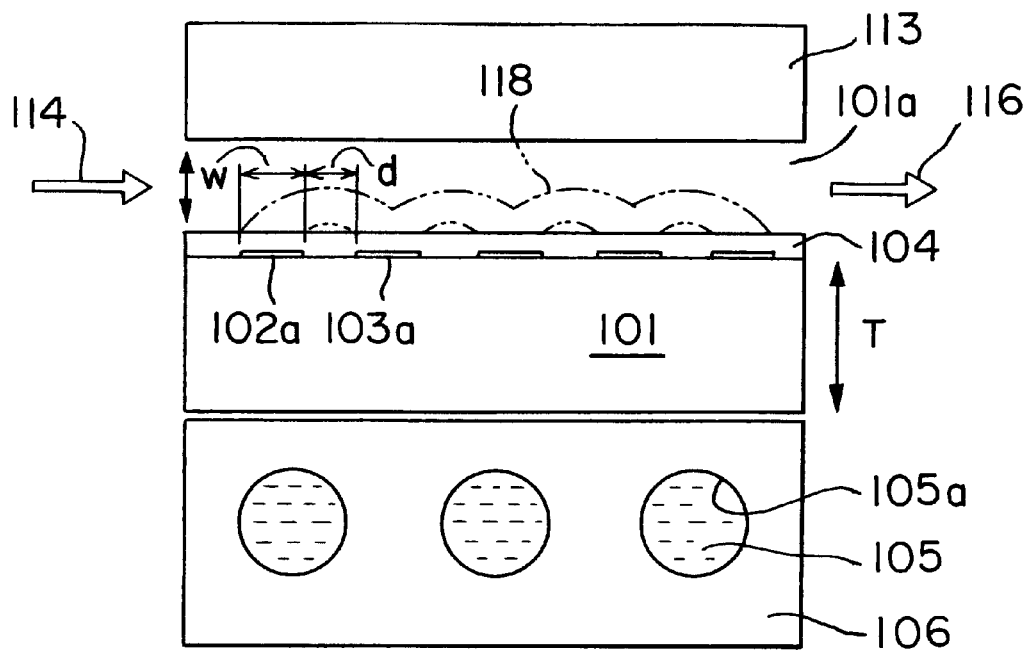
FIG. 35 is a view of assistance in explaining the arrangement of electrodes.

Referring to FIGS. 34 and 35, an ozonizing unit comprises a rectangular dielectric substrate 101 of glass, a pair of electrodes 102 and 103.

A second embodiment of the present invention will be described hereinafter. FIGS. 34 to 37 show ozonizing units embodying the present invention.

Referring to FIGS. 34 and 35, an ozonizing unit comprises a rectangular dielectric substrate 101 of glass, a pair of electrodes 102 and 103 formed on one of the surfaces of the dielectric substrate 101 by printing a conductive material, such as a silver paste, by screen printing or the like, and a dielectric layer 104 formed on the surface of the dielectric substrate 101 so as to cover the electrodes 102 and 103. The electrode 102 has a plurality of linear electrode elements 102a, and the electrode 103 has a plurality of linear electrode elements 103a. The dielectric substrate 101 and the pair of electrodes 102 and 103 constitute an electrode plate (101, 102, 103).

A heatsink (cooling structure) 106 made of a metal and provided with cooling tubes 105a through which cooling water 105 flows is disposed in close contact with the other surface of the dielectric substrate 101. Wiring lines 107 formed of the same material and by the same method as the electrodes 102 and 103 are connected to the pair of electrodes 102 and 103, respectively. Parts of the wiring lines 107 project outside from the dielectric substrate 101 to form terminals 108 not covered with the dielectric layer 104. Free end parts of wires 110 connected to an ac power supply 109 are connected to the terminals 108 by elastic connecting clips 111, respectively.

A packing 112 is placed on the surface of the dielectric substrate 101 on which the electrodes 102 and 103 are formed so as to surround the electrodes 102 and 103. A gas guide 113 is placed on the packing 112 to form a discharge space 101a. The gas guide 113 is provided with a gas inlet 115 trough which a source gas 114 is supplied into the discharge space 101a, and a gas outlet 117 through which ozone 116 generated in the discharge space 101a is discharged outside.

As shown in FIGS. 34 and 35, a high voltage is applied to the electrodes 102 and 103 by the ac power supply 109 to produce surface discharge 118 on the surface of the dielectric layer 104. Oxygen contained in the source gas is ozonized by the surface discharge 118 to generate ozone.

The linear electrode elements 102a and 103a forming the pair of electrodes 102 and 103 are arranged at intervals d in the range of 50 to 100 $\mu$m. The linear electrode elements 102a and 103a have a width W. When a high voltage is applied to the pair of electrodes 102 and 103 by the ac power supply 109, an electric field of a high intensity is created over the dielectric layer 104, and surface discharge 118 is produced between the linear electrode elements 102a and 103a as shown in FIG. 35.

The operation of the embodiment thus constructed will be described hereinafter.

A source gas 114 is supplied through the gas inlet 115 into the discharge space 101a, and a high voltage is applied across the pair of electrodes 102 and 103 by the ac power supply 109. An electric field of a high intensity is created on the surface of the dielectric layer 104 and surface discharge 118 is produced between the linear electrode elements 102a and 103a. Since the pair of electrodes 102 and 103 are covered with the dielectric layer 104, the pair of electrodes 102 and 103 are not damaged by sputtering due to the surface discharge 118. Consequently, the ozonizing unit is able to achieve a stable operation.

When the source gas 114 is exposed to the surface discharge 118, oxygen molecules $O_2$ are dissociated into oxygen atoms O as expressed by Expression (1) by electrons e generated by discharge. Then, the oxygen atoms O bond to oxygen molecules $O_2$ to generate ozone $O_3$ as expressed by Expression (2).

(1)

(2)

In Expression (2), $O_2^*$ represents oxygen molecules $O_2$ obtained surplus energy generated when $O+O_2\rightarrow O_3$ occurred.

During the surface discharge 118, the dissociation of ozone $O_3$ into oxygen molecules $O_2$ expressed by Expressions (3) and (4) occurs.

(3)

(4)

Ozone 116 thus generated in the discharge space 101a flows outside through the gas outlet 117.

It is desirable that the electrons e have high energy to generate ozone in a high concentration. The energy of the electrons e can be controlled by selectively determining the construction and the size of the electrodes. When the width W of the linear electrode elements 102a and 103a of the pair of electrodes 102 and 103 is 200 $\mu$m or below, ozone can be generated in a high concentration. It is particularly desirable that the width W is 100 Mm or below.

The surface discharge 118 is caused by power supplied by the ac power supply 109. Therefore, it is possible that abnormal discharge is produced between the dielectric substrate 101 and the heatsink 106 due to an electric field created on the back surface of the dielectric substrate 101. Such abnormal discharge can be prevented by forming the dielectric substrate 101 in a thickness T greater than the intervals d between the linear electrode elements 102a and 103a of the pair of electrodes 102 and 103 to suppress the creation of an electric field on the back surface of the dielectric substrate 101.

Incidentally, surface discharge 118 is produced on the surface of the dielectric layer 104. It is most efficient to cool the dielectric substrate 101 to dissipate heat generated by surface discharge 118 efficiently. The dielectric substrate 101 be cooled with reliability by the heatsink 106 by cooling the heatsink 106 joined to the back surface of the dielectric substrate 101 with the cooling water 105 as shown in FIGS. 34 and 35. Since the dielectric substrate 101 is mounted on the heatsink 106 and the cooling water 105 flows through the cooling tubes 105a placed in the heat sink 106, the cooling water 105, i.e., a cooling medium, does not leak even if the dielectric substrate 101 is broken, which enhances the reliability of the ozonizing unit. Accordingly, the dielectric substrate 101 can efficiently be cooled by the cooling water 105 and the rise in the temperature of gases in the surface discharge 118 can be suppressed. Consequently, the thermal decomposition of ozone can be prevented and hence ozone can be generated in a high concentration.

When the dielectric substrate 101 is 60 cm on each side, the possible numbers of the linear electrode elements 102a of the electrode 102 and the linear electrode elements 103a of the electrode 103 are on the order of 1000. The wiring lines 107 connected to the electrodes 102 and 103 are formed on the dielectric substrate 101 of a material and by a method that are the same as those used for forming the electrodes 102 and 103. Stable voltage application can be achieved by using the wiring lines 107. The electrodes 102 and 103 can easily be insulated from each other by covering the same with the dielectric layer 104. A voltage can easily be applied across the pair of electrodes 102 and 103 by connecting free end parts of the wires 110 connected to the ac power supply 109 to the terminals 108 continuous with the wiring lines 107 and projecting outside from the edges of the dielectric substrate 101 and not covered with the dielectric layer 104 by the elastic connecting clips 111, which enhances reliability.

Figure 36:
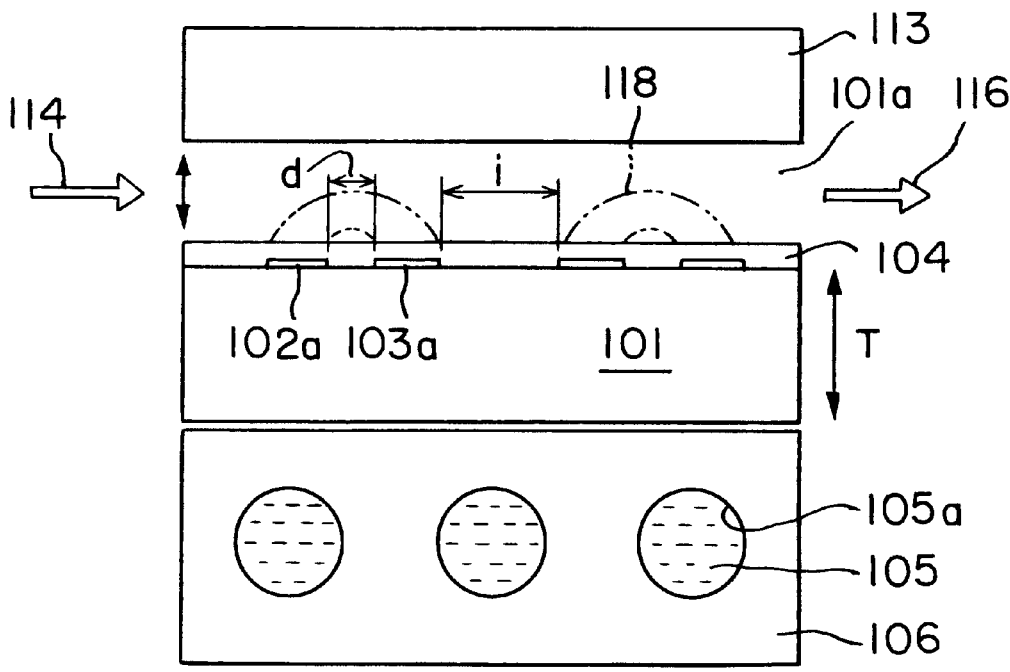
FIG. 36 is a view of a modification of the ozonizing unit according to the present invention.

An ozonizing unit in a first modification will be described with reference to FIG. 36, in which parts like or corresponding to those of the embodiment shown in FIGS. 34 and 35 are designated by the same reference characters and the description thereof will be omitted. The ozonizing unit in the first modification is substantially the same in construction as the embodiment shown in FIGS. 34 and 35. Referring to FIG. 36, the ozonizing unit in the first modification is provided with a pair of electrodes 102 and 103 respectively having linear electrode elements 102a and 103a. The linear electrode elements 102a and 103a are not arranged at equal intervals; the same are arranged at intervals d and intervals i greater than the intervals d.

A dielectric substrate 101 is formed in a thickness T greater than the smaller intervals d to prevent abnormal discharge as mentioned above.

An ozonizing unit in a second modification will be described with reference to FIG. 37, in which parts like or corresponding to those of the embodiment shown in FIGS. 34 and 35 are designated by the same reference characters and the description thereof will be omitted. The ozonizing unit in the second modification is substantially the same in construction as the embodiment shown in FIGS. 34 and 35.

Figure 37:
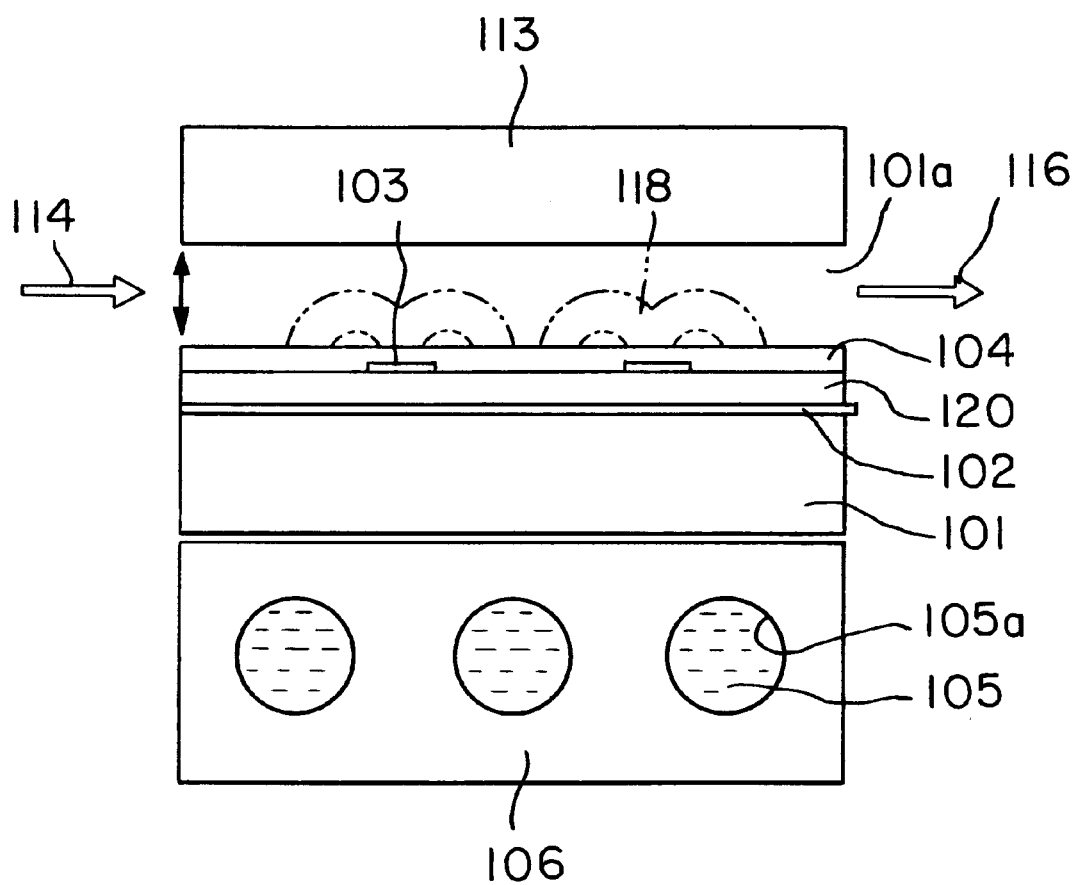
FIG. 37 is a view of another modification of the ozonizing unit according to the present invention.

Referring to FIG. 37, a first electrode 102 is formed on a surface of a dielectric substrate 101 of glass by printing a conductive material, such as a silver paste, by screen printing or the like. An intermediate dielectric layer 120 is formed so as to cover the first electrode 102. A second electrode 103 is formed on the intermediate dielectric layer 120. The second electrode 103 is covered with a dielectric layer 104.

When a high voltage is applied by an ac power supply 109 across the linear electrode elements 102a of the first electrode 102 and the linear electrode elements 103a of the second electrode 103, an electric field of a high intensity is created on the surface of the dielectric layer 104 and surface discharge is produced. Since both the first electrodes 102 and the second electrode 103 are covered with the dielectric layer 104, the electrodes 102 and 103 are not damaged by sputtering and have a long life and high reliability.

Faulty wiring can be prevented by charging the first electrode 102 at a ground potential or a low potential.

As is apparent from the foregoing description, according to the present invention, the electrodes having a large area can be formed in a high accuracy by screen printing or the like to produce surface discharge of a high capacity. Consequently, ozone can efficiently be generated in a high concentration. The reduction of the life of the electrodes due to sputtering can be prevented by covering the electrodes with the dielectric layer. Thus, the ozonizing unit is highly reliable.

Third Embodiment

A third embodiment of the present invention will be described hereinafter. FIGS. 38 to 41 show an ozone generator (gas-discharge apparatus) embodying the present invention.

Figure 40:
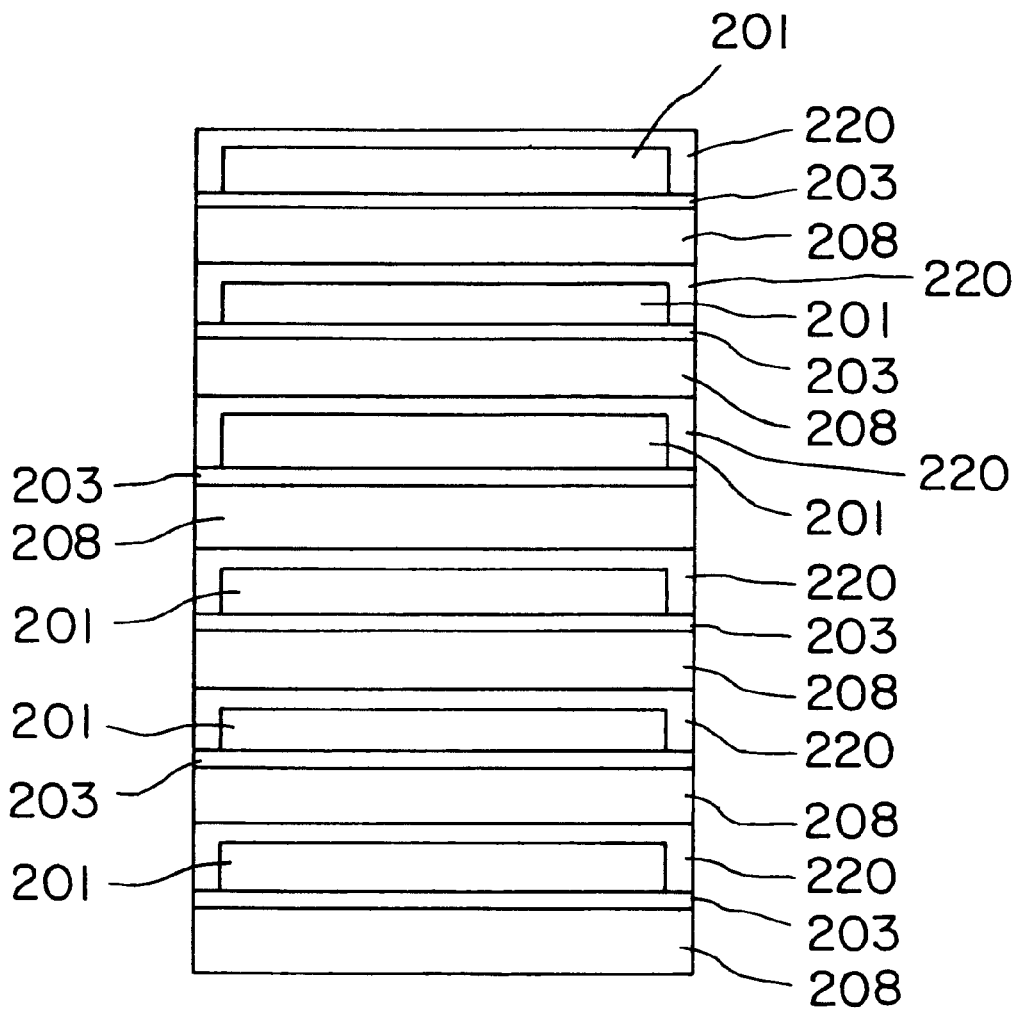
FIG. 40 is a typical front elevation of the ozone generator shown in FIG. 38.

Referring to FIGS. 38 to 41, an ozone generator (gas-discharge apparatus) comprises a plurality of stacked electrode plates (discharge members) 203. As shown in FIGS. 38 and 40, a sealing cover 220 is placed on a surface of each electrode plate 203, and a cooling structure (cooling heat exchanger) 208 is joined to the other surface, i.e., back surface, of each electrode plate 203.

Referring to FIGS. 38 and 39, each electrode plate 203 has a dielectric substrate 203a and a plurality of electrodes 202 arranged at predetermined intervals on the dielectric substrate 203a. The electrodes 202 are connected to an ac power supply 204.

A dielectric layer (insulating coating layer) 206 is formed on the dielectric substrate 203a so as to cover the electrodes 202. A voltage is applied by the ac power supply 204 across the electrodes 202 to produce surface discharge 205 on the dielectric layer 206.

As shown in FIGS. 38 and 39, the dielectric substrate 203a, the electrodes 202 and the dielectric layer 206 constitute the electrode plate 203. The sealing cover 220 has a recess 220a. When the sealing cover 220 is joined to the electrode plate 203, the recess 220a serve as a discharge space 201. The discharge space 201 communicates with a buffer space 209 defined by the electrode plate 203 and the sealing cover 220 by means of a gas passage 210. The gas passage 210 serves to make a gas flow from the buffer space 209 uniformly into the discharge space 201 for the efficient ozonization of the gas and for the uniform distribution of reaction heat generated by discharge in the discharge space 201.

The cooling structure 208 is provided internally with cooling medium tubes 207 through which a cooling medium flows.

An O ring 211 is compressed between the electrode plate 203 and the sealing cover 220 to seal the discharge space 201 in an airtight fashion. As shown in FIG. 38, the O ring 211 is disposed with its sealing surface in contact with the dielectric layer 206 formed on the dielectric surface 203a to absorb a thermal stress induced in the dielectric substrate 203a when the dielectric substrate 203a is caused to expand by heat and to maintain the airtight sealing of the discharge space 201.

Gas temperature T is controlled so as to meet the following expression so that the dielectric substrate 203a may not be broken due to thermal expansion and efficiency may not be reduced due to rise in gas temperature attributable to reaction heat generated by discharge.

$$T_{max} > T = T_1 + Q \times \{(d_1/k_1) + (d_2/k_2)\}$$

where $T_{max}$ is an upper limit gas temperature, $T_1$ is the temperature of the surface of the dielectric substrate 203a in contact with the cooling structure 208, Q is discharge power density (W/m$^2$), i.e., discharge power per unit area, $d_1$ is the thickness of the dielectric substrate 203a, $k_1$ is the heat conductivity of the dielectric substrate 203a, $d_2$ is the thickness of the dielectric layer 206, and $k_2$ is the thermal conductivity of the dielectric layer 206.

The operation of the ozone generator in this embodiment will be described hereinafter.

A source gas is supplied through the buffer space 209 and the gas passage 210 into the discharge space 201 and, at the same time, the ac power supply applies an ac voltage across the electrodes 202 to produce surface discharge 205 on the dielectric layer 206.

If the source gas is dry air, ozone is generated from the source gas in the discharge space 201 by the surface discharge 205.

The ozone generator in this embodiment can be formed in a small construction because the electrode plates 203 are stacked. Since the dielectric substrates 203a of the electrode plates 203 are cooled effectively by the cooling structures 208, reduction in discharge efficiency can be avoided.

When the source gas is poisonous or produces a poisonous gas by reaction, the plurality of stacked electrode plates 203 is contained in a pressure vessel to prevent the leakage of the source gas.

An ozone generator in a first modification of the ozone generator in the third embodiment will be described with reference to FIGS. 41 and 42, in which parts like or corresponding to those of the embodiment shown in FIGS. 38 to 40 are designated by the same reference characters and the description thereof will be omitted. As shown in FIGS. 41 and 42, the ozone generator in the first modification has a plurality of electrode plates 203 each having a dielectric substrate 203a, and cooling structures 208 interposed between the adjacent electrode plates 203. The ozone generator in the first embodiment is not provided with any components corresponding to the sealing covers 220.

As shown in FIG. 41, each cooling structure 208 is provided with a recess 208a to form a discharge space 201, a buffer space 209 and a gas passage 210 between the cooling structure 208 and the electrode plate 203.

An ozone generator in a second modification of the ozone generator in the third embodiment will be described with reference to FIG. 43, in which parts like or corresponding to those of the embodiment shown in FIGS. 38 to 40 are designated by the same reference characters and the description thereof will be omitted. As shown in FIG. 43, the ozone generator has a pair of electrode plate 203 each having a substrate 203a, a cooling structure 208, and sealing covers 220. The cooling structure 208 is sandwiched between the substrates 203a. The sealing covers 220 are joined to the upper surface of the upper electrode plate 203 and the lower surface of the lower electrode plate 203, respectively. Each sealing cover 220 has a recess 220a.

A discharge space 201, a buffer space 209 and a gas passage 210 are formed between the upper electrode plate 203 and the upper sealing cover 220. A discharge space 201, a buffer space 209 and a gas passage 210 are formed between the lower electrode plate 203 and the lower sealing cover 220.

An ozone generator in a third modification of the ozone generator in the third embodiment will be described with reference to FIG. 44, in which parts like or corresponding to those of the embodiment shown in FIGS. 38 to 40 are designated by the same reference characters and the description thereof will be omitted. As shown in FIG. 44, the ozone generator has a plurality of electrode plates 203 each having a substrate 203a, sealing covers 220 interposed between the adjacent electrode plate 203, respectively, and cooling medium tubes 207 extended through the substrates 203a, respectively. Thus, the substrate 203a has the function of a cooling structure. The ozone generator in the third modification is substantially the same in other respects as the ozone generator shown in FIGS. 38 to 40.

An ozone generator in a fourth modification of the ozone generator in the third embodiment will be described with reference to FIGS. 45 and 46, in which parts like or corresponding to those of the embodiment shown in FIGS. 38 to 40 are designated by the same reference characters and the description thereof will be omitted.

Referring to FIGS. 45 and 46, the ozone generator has a plurality of stacked electrode plates 203, sealing covers 220 disposed on the upper side of the electrode plates 203, respectively, and cooling structure 208 disposed on the lower side of the electrode plates 203, respectively. The ozone generator in the fourth modification is the same in construction as the embodiment shown in FIGS. 38 to 40.

Referring to FIGS. 45 and 46, each cooling structure 208 and each sealing cover 220 are joined together to define a discharge space 201, a buffer space 209 and a gas passage 210 by a recess formed in the sealing cover 220. The electrode plate 203 is disposed in the discharge space 201.

The electrode plate 203 disposed in the discharge space 201 defined by the cooling structure 208 and the sealing cover 220 may be a single component as shown in FIG. 45 or may be two components as shown in FIG. 46.

Figure 47:
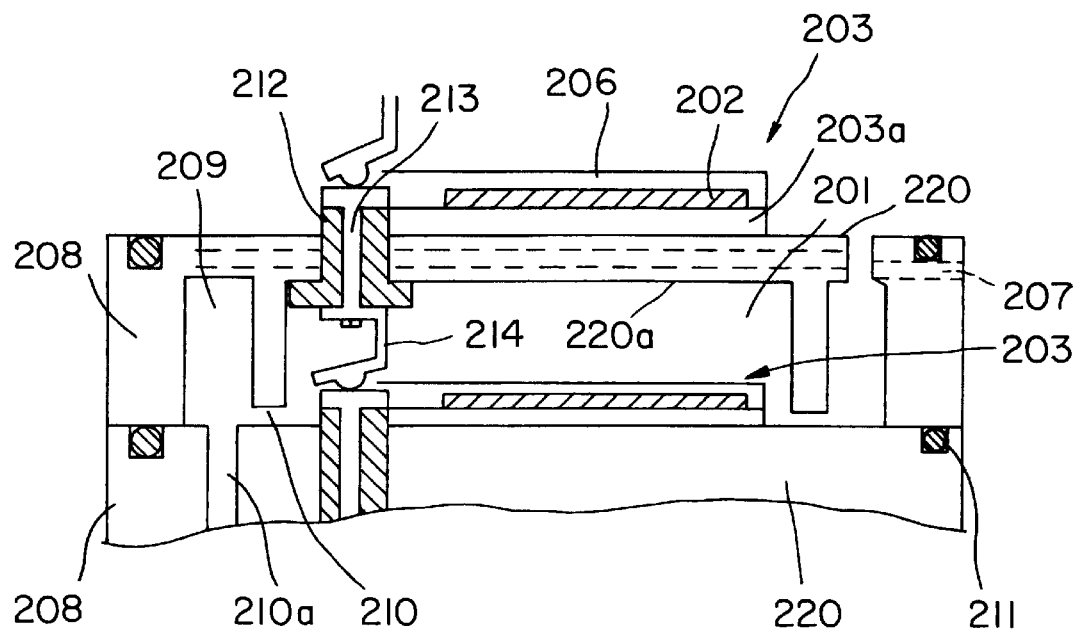
FIG. 47 is a sectional view of an ozone generator in embodiment 3-7 of the third embodiment.
Figure 48:
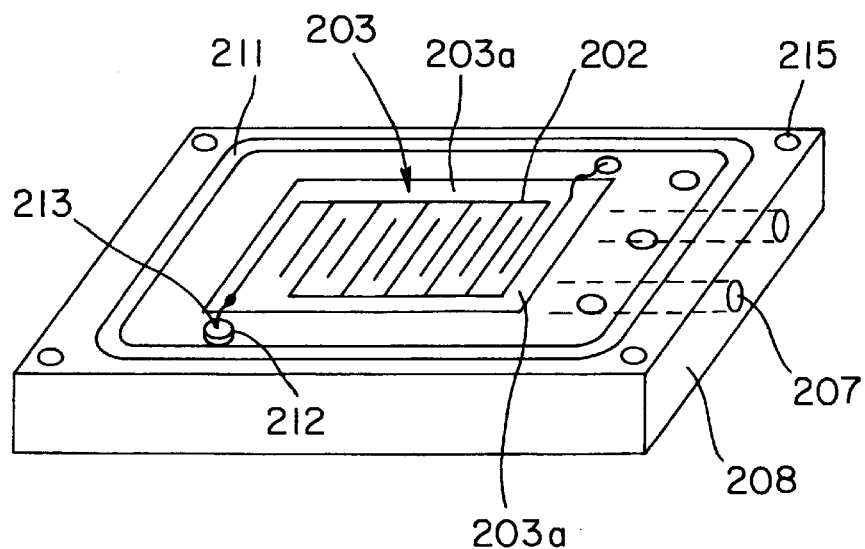
FIG. 48 is a perspective view of the ozone generator shown in FIG. 47.

An ozone generator in a fifth modification of the ozone generator in the third embodiment will be described with reference to FIGS. 47 and 48. As shown in FIGS. 47 and 48, the ozone generator has a plurality of stacked electrode plates 203, cooling structures 208 interposed between the adjacent electrode plates 203, respectively, and sealing covers 220 interposed between the adjacent electrode plates 203, respectively. A discharge space 201, a buffer space 209 and a gas passage 210 are defined by the sealing covers 220 disposed on the upper and the lower side of each electrode plate 203, respectively. Each sealing cover 220 has a recess 220a. The ozone generator in the fifth modification is substantially the same in other respects as the ozone generator shown in FIGS. 45 and 46.

As shown in FIGS. 47 and 48, the electrode plate 203 is placed in the discharge space 201 defined by the upper and the lower sealing cover 220.

The electrodes 202 of each of the stacked electrode plates 203 are connected by connecting lines 213 insulated by dielectric bushings 212 from the cooling structure 208 to the electrodes 202 of the electrode plates 203 disposed on the upper and the lower side, respectively, of the electrode plate 203.

Surface discharge 305 is produced along the surface of the electrode plate 203. A source gas is supplied into the discharge space 201 so as to be uniformly distributed over the surface of the electrode plate 203 through the buffer space 209 and the gas passage 210.

The gas supplied into the discharge space 201 flows through a connecting passage 210a formed in the cooling structure 208 into the buffer space 209 on the lower side. O rings 211 are compressed between the adjacent cooling structures 208, respectively, to seal the discharge spaces 201 in an airtight fashion.

Figure 49:
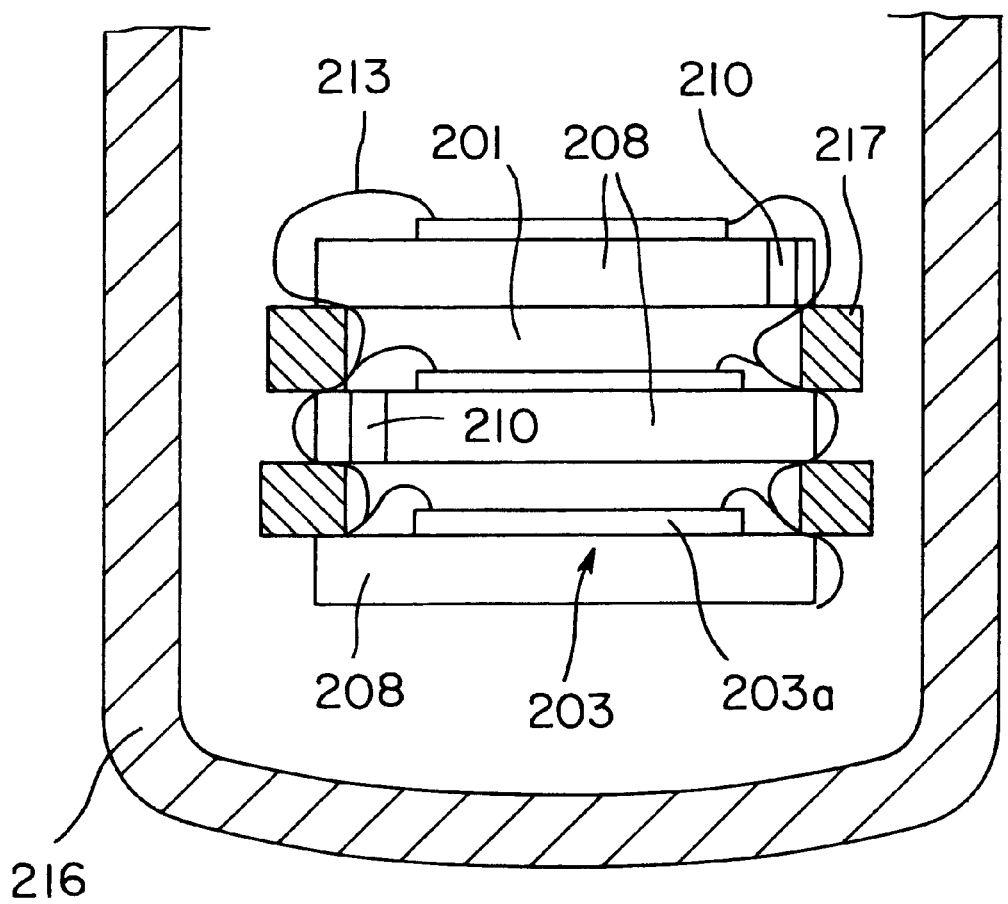
FIG. 49 is a sectional view of an ozone generator in embodiment 3-8 of the third embodiment.

An ozone generator in a sixth modification of the ozone generator in the third embodiment will be described with reference to FIG. 49. As shown in FIG. 49, the ozone generator has a plurality of electrode plates 203, cooling structures 208 interposed between the adjacent electrode plates 203, and spacers 217 interposed between the adjacent cooling structures 208. The ozone generator shown in FIG. 49 is substantially the same in other respects as the ozone generator shown in FIGS. 47 and 48.

As shown in FIG. 49, a discharge space 201 is formed between the adjacent cooling structures 208, and the electrode plate 203 is placed in the discharge space 201.

Connecting wires 213 connecting the respective electrodes 202 of the adjacent electrode plates 203 are held by the spacers 217.

As shown in FIG. 49, a structure constructed by thus stacking the electrode plates 203 and the cooling structures 208 is contained in a sealed pressure vessel 216.

Thus, the ozone generator is constructed in a compact construction and hence discharge efficiency can be improved.

Fourth Embodiment

Embodiment 4-1

An ozonizing unit in a fourth embodiment according to the present invention will be described with reference to FIG. 50.

Referring to FIG. 50, an ozonizing unit in embodiment 4-1 according to the present invention has a dielectric substrate 307, an electrode set of a hot electrode 301 and a stray electrode 302 formed on the front surface of the dielectric substrate 307, and a back electrode 305 formed on the back surface of the dielectric substrate 307.

The dielectric substrate 307, the hot electrode 301, the stray electrode 302 and the back electrode 305 constitute a electrode plate (307, 301, 302, 305).

The hot electrode 301 has linear electrode elements, and the stray electrode 302 has linear electrode elements. The respective electrode elements of the hot electrode 301 and the stray electrode 302 are arranged alternately in parallel to each other at predetermined intervals. The back electrode 305 is formed over the entire back surface of the dielectric substrate 307.

The back electrode 305 is cooled by cooling water 306 and is grounded. An ac power supply 304 is connected to the hot electrode 301 and the back electrode 305 to apply a high voltage across the hot electrode 301 and the back electrode 305.

The operation of the ozonizing unit will be described.

The ac power supply 304 applies a high voltage across the hot electrode 301 having the linear electrode elements, and the back electrode 305 to produce surface discharge 303 on the front surface of the dielectric substrate 307. Since the electrode elements of the hot electrode 301 and those of the stray electrode 302 are arranged alternately, an electric field of a high intensity is created on the front surface of the dielectric substrate 307, which enhances the intensity of surface discharge. A source gas is supplied so as to flow along the front surface of the dielectric substrate 307. Ozone is generated from the source gas by the surface discharge 303.

Since the electric field of a high intensity is created on the front surface of the dielectric substrate 307, the ozonizing unit generates ozone at a high ozone generating efficiency.

Embodiment 4-2

An ozonizing unit in embodiment 4-2 according to the present invention will be described with reference to FIG. 51.

Referring to FIG. 51, the ozonizing unit in embodiment 4-2 has an electrode plate having a dielectric substrate 307, a hot electrode 301 and a stray electrode 302 formed on the front surface of the dielectric substrate 307, and a back electrode 305 formed on the back surface of the dielectric substrate 307.

The hot electrode 301 has linear electrode elements, and the stray electrode 302 has linear electrode elements. The respective electrode elements of the hot electrode 301 and the stray electrode 302 are arranged alternately in parallel to each other at predetermined intervals. The back electrode 305 is formed over the entire back surface of the dielectric substrate 307.

A dielectric layer 308 is formed on the front surface of the dielectric substrate 307 so as cover the hot electrode 301 and the stray electrode 302.

The back electrode 305 is cooled by cooling water 306 and is grounded. An ac power supply 304 is connected to the hot electrode 301 and the back electrode 305 to apply a high voltage across the hot electrode 301 and the back electrode 305.

The ac power supply 304 applies a high voltage across the hot electrode 301 having the linear electrode elements, and the back electrode 305 to produce surface discharge 303 on the surface of the dielectric layer 308. Since the electrode elements of the hot electrode 301 and those of the stray electrode 302 are arranged alternately, an electric field of a high intensity is created on the front surface of the dielectric substrate 307, which enhances the intensity of surface discharge. Ozone is generated from a source gas by the surface discharge 303.

Since the electric field of a high intensity is created on the front surface of the dielectric substrate 307, the ozonizing unit generates ozone at a high ozone generating efficiency. The dielectric layer 308 covering the hot electrode 301 and the stray electrode 302 protects the hot electrode 301 and the stray electrode 302 from deterioration.

Embodiment 4-3

Figure 52:
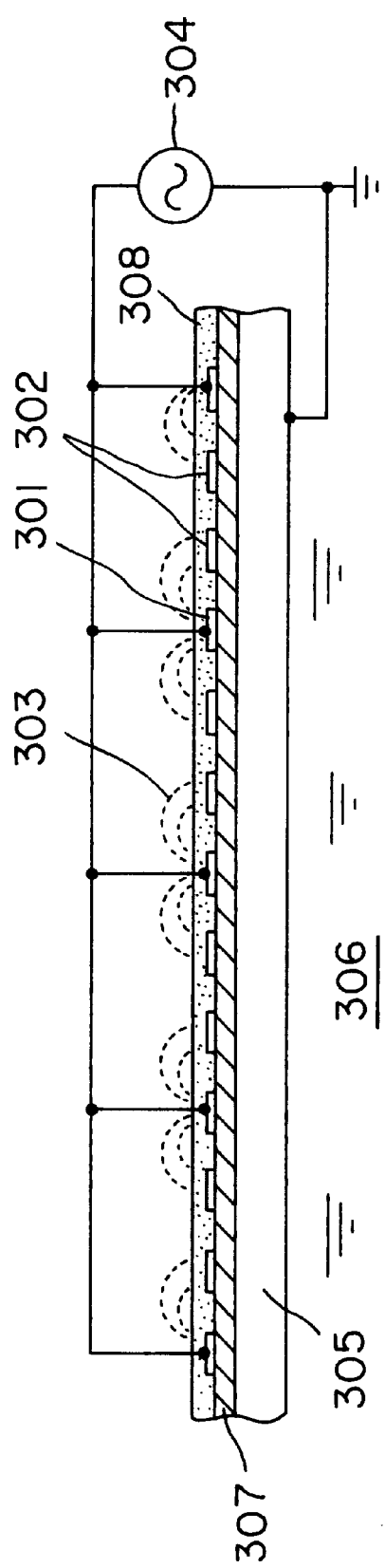
FIG. 52 is a sectional view of an ozone generator in embodiment 4-3 of the fourth embodiment.

An ozonizing unit in embodiment 4-3 according to the present invention will be described with reference to FIG. 52. As shown in FIG. 52, the ozonizing unit in embodiment 4-3 has an electrode plate having a dielectric substrate 307, a hot electrode 301 and a stray electrode 302 formed on the front surface of the dielectric substrate 307, and a back electrode 305 formed on the back surface of the dielectric substrate 307.

The hot electrode 301 has linear electrode elements, and the stray electrode 302 has linear electrode elements. The respective electrode elements of the hot electrode 301 and the stray electrode 302 are arranged in parallel to each other at predetermined intervals. The back electrode 305 is formed over the entire back surface of the dielectric substrate 307. A dielectric layer 308 is formed on the front surface of the dielectric substrate 307 so as cover the hot electrode 301 and the stray electrode 302.

The back electrode 305 is cooled by cooling water 306 and is grounded. An ac power supply 304 is connected to the hot electrode 301 and the back electrode 305 to apply a high voltage across the hot electrode 301 and the back electrode 305.

The ac power supply 304 applies a high voltage across the hot electrode 301 and the back electrode 305 to produce surface discharge 303 on the surface of the dielectric layer 308. Since the two electrode elements of the stray electrode 302 are disposed between the two adjacent electrode elements of the hot electrode 301, the two electrode elements of the stray electrode 302 are disposed on each side of the one electrode element of the hot electrode 301. Thus, stable discharge can be achieved. Ozone is produced from a source gas by the surface discharge 303.

Since the stable discharge can be produced, the ozonizing unit generates ozone at a high ozone generating efficiency.

Embodiment 4-4

An ozonizing unit in embodiment 4-4 according to the present invention will be described with reference to FIGS. 53(a), 53(b) and 53(c). As shown in FIG. 53, the ozonizing unit in embodiment 4-4 has an electrode plate having a dielectric substrate 307, a hot electrode 301 and a stray electrode 302 formed on the front surface of the dielectric substrate 307, and a back electrode 305 formed on the back surface of the dielectric substrate 307.

The hot electrode 301 has linear electrode elements, and the stray electrode 302 has linear electrode elements. The respective electrode elements of the hot electrode 301 and the stray electrode 302 are arranged alternately in parallel to each other at predetermined intervals. The back electrode 305 has linear electrode elements extended in a direction intersecting the linear electrode elements of the hot electrode 301 and the stray electrode 302.

A dielectric layer 308 is formed on the front surface of the dielectric substrate 307 so as cover the hot electrode 301 and the stray electrode 302. A protective plate 305a joined to the back surface of the back electrode 305 is cooled by cooling water 306. An ac power supply 304 is connected to the hot electrode 301 and the back electrode 305 to apply a high voltage across the hot electrode 301 and the back electrode 305. The back electrode 305 is grounded.

The ac power supply 304 applies a high voltage across the hot electrode 301 and the back electrode 305 to produce surface discharge 303 on the surface of the dielectric layer 308. Since the respective electrode elements of the hot electrode 301 and the stray electrode 302 are arranged alternately, an electric field of a high intensity is created on the front surface of the dielectric substrate 307, which enhances the intensity of discharge. Since the respective electrode elements of the hot electrode 301 and the back electrode 305 are extended along intersecting directions, respectively, the intensity of regions of the electric field corresponding to the two-level intersections of the electrode elements of the hot electrode 301 and the back electrode 305 can be enhanced. Ozone can be generated from a source gas by the surface discharge 303. Since the electric field of a high intensity can be created on the front surface of the dielectric substrate 307, the ozonizing unit generates ozone at a high ozone generating efficiency.

Embodiment 4-5

An ozonizing unit in embodiment 4–5 according to the present invention will be described with reference to FIG. 54.

Figure 54:
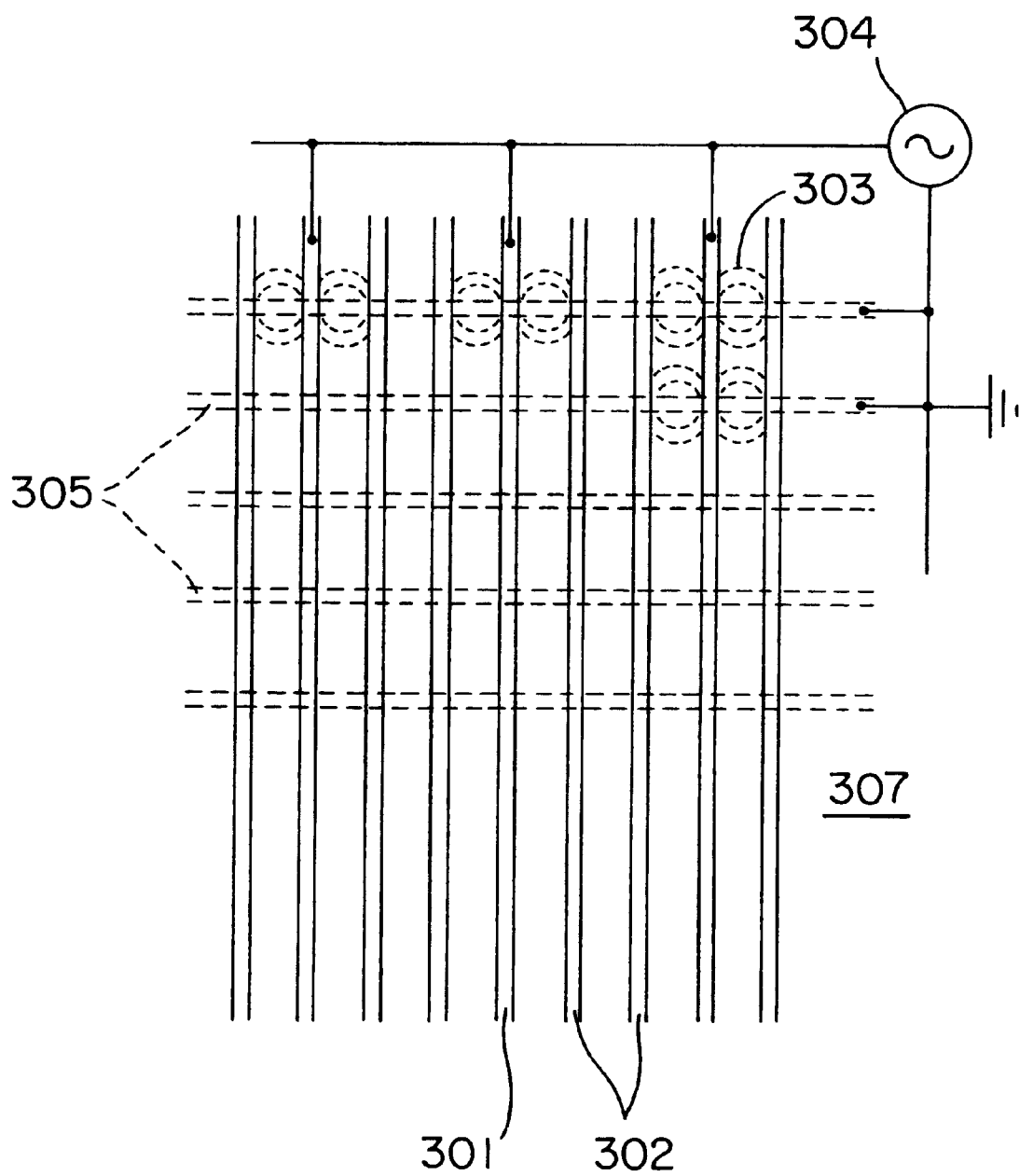
FIG. 54 is a diagrammatic view of an ozone generator in embodiment 4-5 of the fourth embodiment.

As shown in FIG. 54, the ozonizing unit in embodiment 4-5 has a dielectric substrate 307, and a hot electrode 301 and a stray electrode 302 formed on the front surface of the dielectric substrate 307. The hot electrode 301 has linear electrode elements and the stray electrode 302 has linear electrode elements. The two electrode elements of the stray electrode 302 are disposed between the adjacent electrode elements of the hot electrode 301. The ozonizing unit in embodiment 4-5 is substantially the same in other respects as the ozonizing unit in embodiment 4-4 shown in FIG. 53.

Since the two electrode elements of the stray electrode 302 are disposed between the adjacent electrode elements of the hot electrode 301, i.e., the two electrode elements of the stray electrode 302 is disposed on each side of the one electrode element of the hot electrode 301, stable discharge can be produced.

Embodiment 4-6

Figure 55:
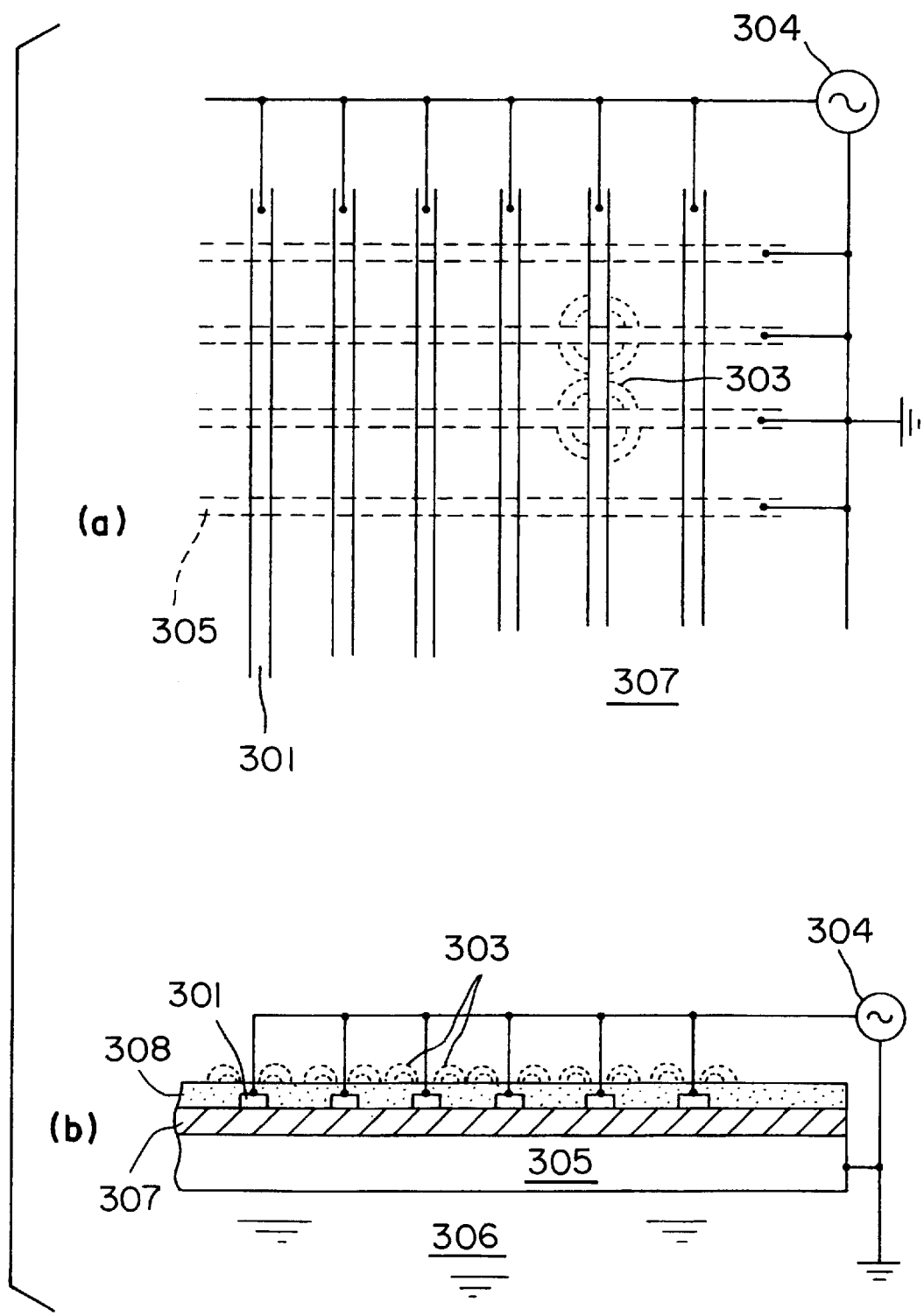
FIG. 55 is a view of an ozone generator in embodiment 4-6 of the fourth embodiment.

An ozonizing unit in embodiment 4-6 will be described with reference to FIGS. 55(a), 55(b) and 55(c). The ozonizing unit has an electrode plate having a dielectric substrate 307, a hot electrode 301 having linear electrode elements formed at equal intervals on the front surface of the dielectric substrate 307, and a back electrode 305 having linear electrode elements formed on the back surface of the dielectric substrate 307.

The hot electrode 301 formed on the front surface of the dielectric substrate 307 is covered with a dielectric layer 308. The back surface of the back electrode 305 is cooled by cooling water 306. An ac power supply 304 is connected to the hot electrode 301 and the back electrode 305 to apply a high voltage across the hot electrode 301 and the back electrode 305. The back electrode 305 is grounded. The respective electrode elements of the hot electrode 301 and the back electrode 305 are extended along intersecting directions, respectively.

Surface discharge 303 can be produced on the surface of the dielectric layer 308 by applying a high voltage across the hot electrode 301 and the back electrode 305 by the ac power supply 304. Since the intensity of regions of an electric field corresponding to the two-level intersections of the electrode elements of the hot electrode 301 and the back electrode 305 is enhanced, stable discharge can be produced. Ozone can be generated from a source gas by surface discharge 303.

Since stable discharge can be produced, the ozonizing unit generates ozone at a high ozone generating efficiency.

Embodiment 4-7

An ozonizing unit in embodiment 4-7 according to the present invention will be described with reference to FIGS. 56(a) and 56(b). As shown in FIGS. 56(a) and 56(b), the ozonizing unit has an electrode plate having a dielectric substrate 307, a hot electrode 301 and a stray electrode 302 formed on the surface of the dielectric substrate 307, and a back electrode 305 formed on the back surface of the dielectric substrate 307. The hot electrode 301 has parallel electrode elements formed at equal intervals. The stray electrode 302 has broken, parallel electrode elements. The back electrode 305 has parallel electrode elements extending in a direction intersecting the electrode elements of the hot electrode 301 and the stray electrode 302.

The hot electrode 301 and the stray electrode 302 formed on the front surface of the dielectric substrate are covered with a dielectric layer 308. The back surface of the back electrode 305 is cooled by cooling water 306. An ac power supply 304 is connected to the hot electrode 301 and the back electrode 305. The back electrode 305 is grounded. The one electrode element of the stray electrode 302 may be disposed between the two adjacent electrode elements of the hot electrode 301 as shown in FIG. 56(a) or the two electrode elements of the stray electrode 302 may be disposed between the two adjacent electrode elements of the hot electrode 301 as shown in FIG. 56(b).

Surface discharge 303 can be produced on the surface of the dielectric layer 308 by applying a high voltage across the hot electrode 301 and the back electrode 305 by the ac power supply 304. Since the respective electrode elements of the hot electrode 301 and the stray electrode 302 are arranged alternately, stable discharge can be produced. Since the intensity of regions of an electric field corresponding to the two-level intersections of the electrode elements of the hot electrode 301 and the back electrode 305 can locally be enhanced, the surface discharge 303 is stabilized and ozone can be generated from a source gas by the surface discharge 303. Since stable discharge can be produced, the ozonizing unit generates ozone at a high ozone generating efficiency.

Embodiment 4-8

Figure 57:
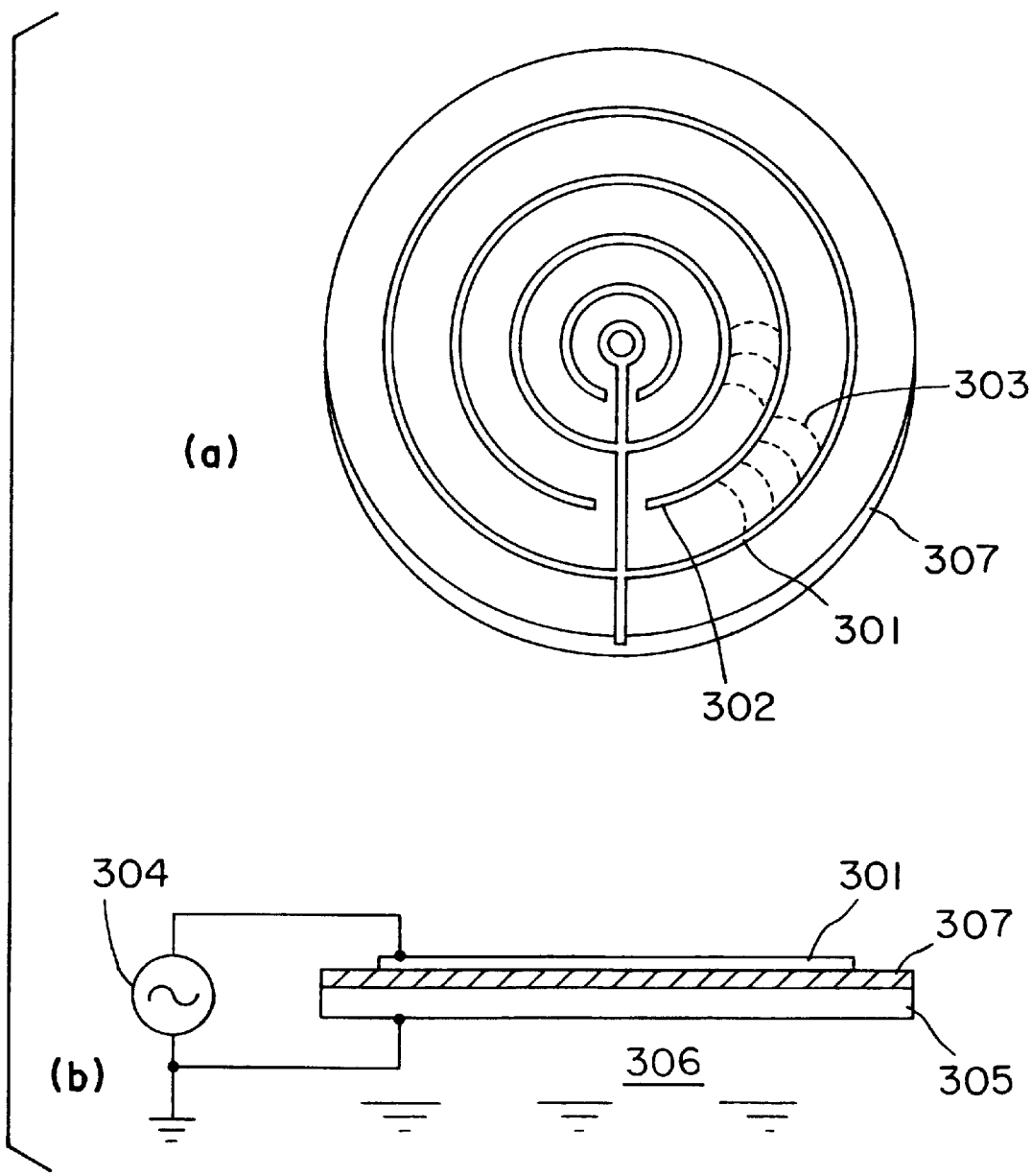
FIG. 57 is a view of an ozone generator in embodiment 4-8 of the fourth embodiment.

An ozonizing unit in embodiment 4-8 according to the present invention will be described with reference to FIGS. 57(a) and 57(b). As shown in FIGS. 57(a) and 57(b), the ozonizing unit has a circular dielectric substrate 307, a hot electrode 301 having electrode elements formed on the front surface of the dielectric substrate 307 in a pattern of concentric circles or a pattern of a spiral, a stray electrode 302 having electrode elements formed on the front surface of the dielectric substrate 307 in a pattern of concentric circles or a pattern of a spiral, and a back surface 305 formed on the entire back surface of the dielectric substrate 307.

The back surface of the back electrode 305 is cooled by cooling water 306. An ac power supply 304 is connected to the hot electrode 301 and the back electrode 305 to apply a high voltage across the hot electrode 301 and the back electrode 305. The back electrode 305 is grounded.

Surface discharge 303 can be produced on the front surface of the dielectric substrate 307 by applying a high voltage across the hot electrode 301 and the back electrode 305 by the ac power supply 304. Since the respective electrode elements of the hot electrode 301 and the stray electrode 302 are arranged alternately, an electric field of a high intensity is created on the front surface of the dielectric substrate 307, which enhances the intensity of discharge. Ozone can be generated from a source gas by the surface discharge 303.

Since an electric field of a high intensity can be formed on the front surface of the dielectric substrate 307, the ozonizing unit generates ozone at a high ozone generating efficiency.

Embodiment 4-9

An ozonizing unit in embodiment 4-9 will be described with reference to FIGS. 58(a), 58(b) and 58(c), in which parts like or corresponding to those of the ozonizing unit shown in FIGS. 57(a) and 57(b) are designated by the same reference characters and the description thereof will be omitted. As shown in FIGS. 58(a), 58(b) and 58(c), the ozonizing unit in embodiment 4-9 has a dielectric substrate 307, a hot electrode 310 and a stray electrode 302, and a dielectric layer 308 formed on the surface of the dielectric layer 307 so as to cover the hot electrode 301 and the stray electrode 302. The ozonizing unit in embodiment 4-9 is substantially the same in other respects as the ozonizing unit in embodiment 4-8.

Embodiment 4-10

An ozonizing unit in embodiment 4-10 will be described with reference to FIGS. 59(a) and 59(b). As shown in FIGS. 59(a) and 59(b), the ozonizing unit has a circular dielectric substrate 307, a hot electrode 301 having electrode elements formed on the front surface of the dielectric substrate 307 in a pattern of concentric circles or a pattern of a spiral, and a additional electrode 301a having electrode elements formed on the front surface of the dielectric substrate 307 in a pattern of concentric circles or a pattern of a spiral. The hot electrode 301 and the additional electrode 301a formed on the front surface of the dielectric substrate 307 are covered with a dielectric layer 308. The back surface of the dielectric substrate 307 is cooled by cooling water 306. An ac power supply 304 is connected to the hot electrode 301 and the additional electrode 301a to apply a high voltage across the hot electrode 301 and the additional electrode 301a.

Surface discharge 303 can be produced on the surface of the dielectric layer 308 by applying a high voltage across the hot electrode 301 and the additional electrode 301a by the ac power supply 304. Since the electrode elements of the additional electrode 301a are interposed between the adjacent electrode elements of the hot electrode 301, an electric field of a high intensity is created on the front surface of the dielectric substrate 307, which enhances the intensity of discharge. Ozone can be generated from a source gas by the surface discharge 303.

Since an electric field of a high intensity can be formed on the front surface of the dielectric substrate 307, the ozonizing unit generates ozone at a high ozone generating efficiency.

As is apparent from the foregoing description, according to the present invention, discharge efficiency is improved, the deterioration of the hot electrode can be prevented, and the ozonizing unit is highly reliable.

What is claimed is:

1. An ozonizing unit comprising an electrode plate including:
   a dielectric substrate;
   a pair of electrodes formed on one surface of the dielectric substrate,
   a dielectric layer formed on the surface of the dielectric substrate so as to cover the pair of electrodes; and
   a gas guide facing a surface of the electrode plate on the side of the pair of electrodes at a predetermined distance from the same surface, and a cooling structure fixedly joined to another surface of the electrode plate;
   wherein each of the pair of electrodes has linear electrode elements, and the respective electrode elements of the pair of electrodes are arranged alternately at a predetermined interval; and
   the ozonizing unit is adapted for causing a discharge between the pair of electrodes and for subjecting ozone source gas to the discharge to thereby generate ozone from the ozone source gas.

2. The ozonizing unit according to claim 1, wherein the thickness of the dielectric substrate is greater than the interval between the electrode elements.

3. The ozonizing unit according to 1, wherein the widths of the respective electrode elements of the pair of electrodes are 200 $\mu$m or less.

4. The ozonizing unit according to claim 1, wherein the pair of electrodes is disposed in an overlapping manner and an intermediate dielectric layer is interposed between the pair of electrodes.

5. An ozonizing unit according to claim 1 further comprising:
   a gas guide facing to and spaced through spacers from the surface of the electrode plate on the side of the pair of electrodes so as to form a discharge space into which a gas is supplied; and
   a cooling structure having a cooling water chamber and disposed on the other surface of the electrode plate on the opposite side of the surface of the same provided with the electrodes;
   wherein a holding plate is disposed through elastic members on a surface of the gas guide on the opposite side of the electrode plate, and the cooling structure and the holding plate are fastened together by fastening means at positions outside the electrode plate and the gas guide.

6. The ozonizing unit according to claim 5 further comprising: further electrode plates placed on the cooling structure.

7. The ozonizing unit according to claim 6, wherein an ozone discharging space extending through the cooling structure, the gas guide and the holding plate is formed between the plurality of electrode plates.

8. An ozonizing unit comprising:
   a cooling structure having a cooling water chamber;
   a pair of electrode plates disposed on the opposite surfaces of the cooling structure, each having a dielectric substrate, at least one electrode set comprising first and second electrodes having electrode elements formed at predetermined intervals on one surface of the dielectric substrate, and serving as surface discharge electrodes;
   a dielectric layer formed on the surface of the dielectric substrate so as to cover the electrode;
   gas guides disposed through spacers on the surfaces of the electrode plates provided with the electrode set so as to form discharge spaces, respectively; and
   holding plates disposed through elastic members on surfaces of the gas guides on the opposite side of the electrode plates, respectively;
   wherein the ozonizing unit is adapted for causing a discharge between the electrode set and for subjecting ozone source gas to the discharge to thereby generate ozone from the ozone source gas.

9. The ozonizing unit according to claim 8, wherein the pair of holding plates is fastened together by fastening means at positions outside the cooling structure, the pair of gas guides and the pair of electrode plates.

10. The ozonizing unit according to claim 8, wherein the pair of holding plates and the cooling structure are fastened together by fastening means at positions outside the pair of gas guides and the pair of electrode plates.

11. The ozonizing unit according to claim 5 or 8, wherein an ozone discharging space is formed in peripheral parts of the electrode plates and the gas guides, and ozone discharge holes are formed in the holding plates so as to be connected to the ozone discharging space.

12. The ozonizing unit according to claim 5 or 8, wherein a recess conforming to the shape of the electrode plate is formed in a surface of the cooling structure on the side of the electrode plate.

13. The ozonizing unit according to claim 5 or 8, wherein the spacers are made of an ozone-resistant metal.

14. The ozonizing unit according to claim 5 or 8, wherein the spacers are made of an ozone-resistant insulating material.

15. An ozone generator comprising a plurality of ozonizing units stacked one after another, each of said ozonizing units comprising:
   an electrode plate including a dielectric substrate, and a pair of electrodes formed on one surface of the dielectric substrate;
   a dielectric layer formed on the surface of the dielectric substrate so as to cover the pair of electrodes;
   a gas guide facing the surface of the electrode plate on the side of the pair of electrodes at a predetermined distance from the same surface so as to form a discharge space into which a gas is supplied;
   a cooling structure having a cooling water chamber and disposed on the other surface of the electrode plate opposite to the surface of the same provided with the pair of electrodes; and
   a holding plate placed through elastic members placed on a surface of the gas guide on the opposite side of the electrode plate;
   wherein the ozone generator is adapted for causing a discharge between the electrode set and subjecting ozone source gas to the discharge to thereby generate ozone from the ozone source gas.

16. A An ozone generator comprising a plurality of ozonizing units stacked one after another, each of said ozonizing units comprising:
   an electrode plate including a dielectric substrate, and a pair of electrodes formed on one surface of the dielectric substrate;
   a dielectric layer formed on the surface of the dielectric substrate so as to cover the pair of electrodes;
   a gas guide facing to the surface of the electrode plate on the side of the pair of electrodes at a predetermined distance from the same surface so as to form a discharge space into which a gas is supplied;
   a cooling structure having a cooling water chamber and disposed on the other surface of the electrode plate opposite to the surface of the same provided with the pair of electrodes; and
   a holding plate placed through elastic members placed on a surface of the gas guide on the opposite side of the electrode plate;
   wherein the ozone generator is adapted for a causing discharge between the electrode set and subjecting ozone source gas to the discharge to thereby generate ozone from the ozone source gas.

17. The ozone generator according to claim 15 or 16, wherein
   the holding plates of the ozonizing units at the opposite ends of the ozone generator are held on posts, the ozonizing units and the posts are disposed in a pressure vessel, and slide guides are laid inside and outside the pressure vessel so that the posts slides along the slide guides.

18. The ozone generator according to claim 16, wherein
   a cooling structure having a cooling water chamber is disposed between the ozonizing units, a pair of electrode plates, each including a dielectric substrate, and at least a pair of electrodes serving as surface discharge electrodes and having electrode elements formed at predetermined intervals on one surface of the dielectric substrate are placed on opposite surfaces of the cooling structure, and gas guides are disposed through spaces on the surfaces of the electrode plates provided with the pairs of electrodes so as to form discharge spaces into which a gas is supplied.

19. An ozonizing unit comprising:
   at least a pair of cooling structures, each having a cooling water chamber;
   a pair of electrode plates placed on surfaces of the cooling structure facing each other, and each having a dielectric substrate, and at least a pair of electrodes serving as surface discharge electrodes and having electrode elements arranged at equal intervals on one surface of the dielectric substrate;
   a dielectric layer formed on the surface of the dielectric substrate so as to cover the pair of electrodes; and
   a gas guide facing to the surface of the electrode plate on the side of the pair of electrodes at a predetermined distance from the same surface, and a cooling structure fixedly joined to the other surface of the electrode plate;
   wherein the ozonizing unit is adapted for causing discharge between the pair of electrodes and subjecting ozone source gas to the discharge to thereby generate ozone from the ozone source gas.

20. The ozonizing unit according to claim 19, wherein
   the cooling structures are fastened together at positions outside the electrode plates by fastening means.

21. The ozonizing unit according to claim 19 further comprising: further electrode plates placed on each of the cooling structures.

22. The ozonizing unit according to claim 21, wherein
   an ozone discharging space extending through the cooling structures is formed between the plurality of electrode plates.

23. An ozone generator comprising a plurality of electrode plates stacked one after another, each of the electrode plates having a dielectric substrate, a pair of electrodes formed on one surface of the dielectric substrate;
   a dielectric layer formed on the surface of the dielectric substrate so as to cover the pair of electrodes; and
   a gas guide facing the surface of the electrode plate on the side of the pair of electrodes at a predetermined distance from the same surface, and a cooling structure fixedly joined to the other surface of the electrode plate;
   wherein each of the pair of electrodes has linear electrode elements, and the respective electrode elements of the pair of electrodes are arranged alternately at a predetermined interval; and
   ozonizing generator is adapted for causing a discharge between the pair of electrodes and subjecting ozone source gas to the discharge to thereby generate ozone from the ozone source gas.

24. The ozone generator according to claim 23, wherein
   a cooling heat exchanger is interposed between the adjacent electrode plates, respectively.

25. The ozone generator according to claim 24, wherein
   a discharge space is formed between the cooling heat exchanger and the electrode plate.

26. The ozone generator according to claim 23, wherein a sealing member is disposed between the adjacent electrode plates to form a discharge space with each electrode plate.

27. The ozone generator according to claim 23, wherein a sealing member is disposed on one side of each electrode plate, a cooling heat exchanger is disposed on the other side of the electrode plate, and a discharge space enclosing the electrode plate is formed by the sealing member disposed on one side of the electrode plate and the cooling heat exchanger disposed on the other side of the electrode plate.

28. The ozone generator according to claim 23, wherein sealing members are disposed between the adjacent electrode plates, and a discharge space enclosing the electrode plate is formed by one sealing member disposed on one side of the electrode plate and the other sealing member disposed on the other side of the electrode plate.

29. The ozone generator according to claim 23, wherein the plurality of electrode plates are disposed in a pressure vessel.

\* \* \* \* \*